US011768377B2

(12) United States Patent
Edwin et al.

(10) Patent No.: US 11,768,377 B2
(45) Date of Patent: Sep. 26, 2023

(54) SYSTEMS AND METHODS FOR DISPLAY BINOCULAR DEFORMATION COMPENSATION

(71) Applicant: MAGIC LEAP, INC., Plantation, FL (US)

(72) Inventors: Lionel Ernest Edwin, Plantation, FL (US); Samuel A. Miller, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 256 days.

(21) Appl. No.: 16/511,478

(22) Filed: Jul. 15, 2019

(65) Prior Publication Data
US 2020/0018968 A1 Jan. 16, 2020

Related U.S. Application Data

(60) Provisional application No. 62/698,015, filed on Jul. 13, 2018.

(51) Int. Cl.
| | | |
|---|---|---|
| G02B 27/01 | (2006.01) | |
| F21V 8/00 | (2006.01) | |
| G06T 15/20 | (2011.01) | |

(52) U.S. Cl.
CPC ....... *G02B 27/0172* (2013.01); *G02B 6/0015* (2013.01); *G06T 15/20* (2013.01);
(Continued)

(58) Field of Classification Search
CPC ............. G02B 27/01; G02B 27/0101; G02B 27/0103; G02B 27/0149; G02B 27/017;
(Continued)

(56) References Cited

U.S. PATENT DOCUMENTS

| | | |
|---|---|---|
| 9,417,452 B2 | 8/2016 | Schowengerdt et al. |
| 9,612,403 B2 | 4/2017 | Abovitz et al. |
| | (Continued) | |

FOREIGN PATENT DOCUMENTS

WO WO 2018/048822 3/2018

OTHER PUBLICATIONS

PCT International Preliminary Report on Patentability for International Patent Appln. No. PCT/US19/41795, Applicant Magic Leap, Inc., dated Jan. 28, 2021 (7 pages).
(Continued)

*Primary Examiner* — Thomas K Pham
*Assistant Examiner* — Henry Duong
(74) *Attorney, Agent, or Firm* — Vista IP Law Group, LLP

(57) ABSTRACT

A display subsystem for a virtual image generation system used by an end user, comprises first and second waveguide apparatuses, first and second projection subassemblies configured for introducing first and second light beams respectively into the first and second waveguide apparatuses, such that at least a first light ray and at least a second light ray respectively exit the first and second waveguide apparatuses to display first and second monocular images as a binocular image to the end user, and a light sensing assembly configured for detecting at least one parameter indicative of a mismatch between the displayed first and second monocular images as the binocular image.

35 Claims, 38 Drawing Sheets

(52) U.S. Cl.
CPC .. *G02B 2027/011* (2013.01); *G02B 2027/014* (2013.01); *G02B 2027/0134* (2013.01); *G02B 2027/0138* (2013.01); *G02B 2027/0178* (2013.01)

(58) Field of Classification Search
CPC ............ G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 6/0015; G02B 2027/0138; G02B 2027/014; G02B 2027/0134; G02B 2027/0178; G02B 6/00; G02B 2027/0125; G02B 27/0081; G02B 2027/0127; G02B 2027/0129; G02B 2027/013; G02B 2027/0132; G02B 2027/0136; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G06T 15/20
USPC ......................................................... 359/630
See application file for complete search history.

(56) References Cited

U.S. PATENT DOCUMENTS

| | | | | |
|---|---|---|---|---|
| 2004/0252077 | A1* | 12/2004 | Terasaki | G02B 27/0176 348/E5.145 |
| 2010/0302276 | A1 | 12/2010 | Levola | |
| 2013/0300635 | A1 | 11/2013 | White et al. | |
| 2014/0002587 | A1 | 1/2014 | Aguren | |
| 2014/0375681 | A1 | 12/2014 | Robbins et al. | |
| 2015/0178939 | A1 | 6/2015 | Bradski et al. | |
| 2015/0205126 | A1 | 7/2015 | Schowengerdt | |
| 2015/0309264 | A1 | 10/2015 | Abovitz et al. | |
| 2015/0378165 | A1* | 12/2015 | Zheng | G02B 27/0179 359/633 |
| 2017/0091996 | A1 | 3/2017 | Wei et al. | |
| 2017/0097506 | A1 | 4/2017 | Schowengerdt et al. | |
| 2017/0122725 | A1 | 5/2017 | Yeoh et al. | |
| 2017/0124928 | A1 | 5/2017 | Edwin et al. | |
| 2017/0199384 | A1 | 7/2017 | Yeoh et al. | |
| 2017/0276948 | A1 | 9/2017 | Welch et al. | |
| 2017/0295362 | A1 | 10/2017 | Ravis | |
| 2018/0074578 | A1 | 3/2018 | Robbins et al. | |
| 2018/0048822 | A1 | 4/2018 | Bohn | |
| 2018/0098056 | A1 | 4/2018 | Bohn | |
| 2018/0341112 | A1 | 11/2018 | Yeoh et al. | |
| 2019/0187490 | A1 | 6/2019 | Dominguez et al. | |
| 2019/0197982 | A1 | 6/2019 | Chi et al. | |
| 2019/0222830 | A1 | 7/2019 | Edwin et al. | |
| 2019/0243448 | A1 | 8/2019 | Miller et al. | |
| 2019/0293941 | A1 | 9/2019 | Yeoh et al. | |
| 2020/0233213 | A1* | 7/2020 | Porter | G02B 27/0101 |
| 2021/0185193 | A1* | 6/2021 | Garafolo | G02C 9/02 |

OTHER PUBLICATIONS

PCT International Search Report and Written Opinion for International Patent Appln. No. PCT/US19/41795, Applicant Magic Leap, Inc., dated Nov. 8, 2019 (11 pages).

Extended European Search Report for EP Patent Appln. No. 19833833.7 dated Aug. 24, 2021.

Foreign Response for EP Patent Appln. No. 19833833.7 dated Mar. 21, 2022.

Foreign OA for CN Patent Appln. No. 201980046805.0 dated Oct. 21, 2022 (with English translation).

Foreign OA for JP Patent Appln. No. 2021-500729 dated May 1, 2023 (with English translation).

* cited by examiner

SYSTEMS AND METHODS FOR DISPLAY BINOCULAR DEFORMATION COMPENSATION

CROSS-REFERENCE TO RELATED APPLICATION(S)

The present disclosure claims priority to U.S. Provisional Application No. 62/698,015, filed on Jul. 13, 2018, entitled "SYSTEMS AND METHODS FOR DISPLAY BINOCULAR DEFORMATION COMPENSATION." This application incorporates by reference the entirety of each of the following patent applications and publications as though set forth in full: U.S. patent application Ser. No. 14/555,585, filed on Nov. 27, 2014, published on Jul. 23, 2015 as U.S. Publication No. 2015/0205126; U.S. patent application Ser. No. 15/274,823, filed Sep. 23, 2016, published on Mar. 30, 2017 as U.S. Patent Publication No. 2017/0091996; U.S. application Ser. No. 15/341,822, filed on Nov. 2, 2016, published on May 4, 2017 as U.S. Patent Publication No. 2017/0124928; U.S. patent application Ser. No. 15/341,760, filed on Nov. 2, 2016, published on May 4, 2017 as U.S. Patent Publication No. 2017/0122725; U.S. patent application Ser. No. 15/405,146, filed on Jan. 12, 2017, published on Jul. 13, 2017 as U.S. Patent Publication No. 2017/0199384; U.S. Provisional Patent Application No. 62/609,242, filed on Dec. 21, 2017; U.S. patent application Ser. No. 16/230,169, filed on Dec. 21, 2018, published on Jun. 27, 2019 as U.S. Patent Publication No. 2019/0197982; U.S. Provisional patent application Ser. No. 16/250,931, filed Jan. 17, 2019; U.S. Provisional patent application Ser. No. 16/251,017, filed on Jan. 17, 2019; U.S. Provisional Patent Application No. 62/698,015, filed on Jul. 13, 2018; U.S. application Ser. No. 16/225,961, filed on Dec. 19, 2018, published on Jun. 20, 2019 as U.S. Patent Publication No. 2019/0187490; U.S. patent application Ser. No. 16/030,713, filed on Jul. 9, 2018, published on Nov. 29, 2018 as U.S. Patent Publication No. 2018/0341112; U.S. patent application Ser. No. 16/437,229 filed on Jun. 11, 2019; and U.S. application Ser. No. 14/555,585 filed on Nov. 27, 2014, published on Jul. 23, 2015 as U.S. Publication No. 2015/0205126.

FIELD OF THE INVENTION

The present invention generally relates to systems and methods configured to facilitate interactive virtual or augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the end user.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. The human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display subsystem, the data being displayed can be updated to take the change in head pose (i.e., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display subsystem to view directly the light from real objects in the environment. The transparent element, often referred to as a "combiner," superimposes light from the display over the end user's view of the real world.

VR and AR systems typically employ a display subsystem having a projection subsystem and a display surface positioned in front of the end user's field of view and on which the projection subsystem sequentially projects image frames. In true three-dimensional systems, the depth of the display surface can be controlled at frame rates or sub-frame rates. The projection subsystem may include one or more optical fibers into which light from one or more light sources emit light of different colors in defined patterns, and a scanning device that scans the optical fiber(s) in a predetermined pattern to create the image frames that sequentially displayed to the end user.

In one embodiment, the display subsystem includes one or more planar optical waveguides that are generally parallel to the field of view of the user, and into which light from the optical fiber(s) is injected. One or more linear diffraction gratings are embedded within the waveguide(s) to change the angle of incident light propagating along the waveguide(s). By changing the angle of light beyond the threshold of total internal reflection (TIR), the light escapes from one or more lateral faces of the waveguide(s). The linear diffraction grating(s) have a low diffraction efficiency, so only a fraction of the light energy is directed out of the waveguide(s), each time the light encounters the linear diffraction grating(s). By out-coupling the light at multiple locations along the grating(s), the exit pupil of the display subsystem is effectively increased. The display subsystem may further comprise one or more collimation elements that collimate light coming from the optical fiber(s), and an optical input apparatus that optically couples the collimated light to, or from, an edge of the waveguide(s).

SUMMARY

This disclosure describes techniques to compensate for binocular deformation that occurs within a display device, such as a device that is a component of an AR or VR system.

At least some embodiments are directed to a display subsystem for a virtual image generation system used by an end user. The subsystem can include first and second waveguide apparatuses, first and second projection subassemblies configured for introducing first and second light beams respectively into the first and second waveguide apparatuses, such that at least a first light ray and at least a second light ray respectively exit the first and second waveguide apparatuses to display first and second monocular images as a binocular image to the end user, and a light sensing assembly configured for detecting at least one parameter indicative of a mismatch between the displayed first and second monocular images as the binocular image. Embodiments can optionally include one or more of the following aspects.

In some embodiments, each of the first and second projection subassemblies comprises one or more light sources configured for generating light, and an optical coupling assembly configured for collimating the light into the respective light beam, and coupling the respective light beam into the respective waveguide apparatus.

In some embodiments, each optical coupling assembly comprises a collimation element configured for collimating the respective light into the respective collimated light beam, and an in-coupling element (ICE) configured for optically coupling the respective collimated light beam into the respective waveguide apparatus.

In some embodiments, each of the first and second waveguide apparatuses comprises a planar optical waveguide into which the respective ICE is configured for optically coupling the respective collimated light beam as an in-coupled light beam, an orthogonal pupil expansion (OPE) element associated with the planar optical waveguide for splitting the respective in-coupled light beam into a plurality of orthogonal light beams, and an exit pupil expansion (EPE) element associated with the planar optical waveguide for splitting the plurality of orthogonal light beams into the light rays that exit the respective planar optical waveguide.

In some embodiments, the respective planar optical waveguide comprises a single substrate formed of a single pane of optically transparent material; the first and second waveguide apparatuses respectively have partially transparent display surfaces configured for being positioned in the field of view between the eyes of the end user and an ambient environment.

In some embodiments, the display subsystem further comprising a frame structure configured for being worn by the end user, wherein the first and second waveguide apparatuses are left and right eyepieces carried by the frame structure.

In some embodiments, the frame structure comprises a frame that carries the left and right eyepieces, and a bridge on which the light sensing assembly is affixed.

In some embodiments, the frame structure comprises left and right cantilevered arms extending from the bridge, the left eyepiece being affixed to the first cantilevered arm, and the second eyepiece being affixed to the second cantilevered arm.

In some embodiments, the light sensing assembly is optically coupled to the first and second waveguide apparatuses, but rigidly decoupled from the first and second waveguide apparatuses.

In some embodiments, each of the first and second waveguide apparatuses comprises an out-coupling element configured for optically coupling light from the respective first and second waveguide apparatuses to light sensing assembly, wherein the at least one detected parameter is derived from the light out-coupled from the first and second waveguide apparatuses.

In some embodiments, the light sensing assembly comprises two independent sensing arrangements configured for separately detecting the light out-coupled from the first and second waveguide apparatuses.

In some embodiments, the light sensing assembly comprises a single sensor configured for detecting the light out-coupled from the first and second waveguide apparatuses.

In some embodiments, the light sensing assembly comprises an optical waveguide apparatus configured for propagating the light out-coupled from the first and second waveguide apparatuses to the single sensor.

In some embodiments, the light sensing assembly comprises at least one non-imaging sensor, and the at least one detected parameter is indicative of an angle at which the at least first light ray exits the first waveguide apparatus, and an angle at which the at least second light ray exits the second waveguide apparatus.

In some embodiments, the at least one detected parameter comprises intensities of two light rays respectively representative of the at least first light ray and the at least second light ray; the two representative light rays respectively exit the first and second waveguide apparatuses outside of a field of view of the end user.

In some embodiments, the light sensing assembly comprises at least one imaging sensor, and the at least one detected parameter comprises first and second representative virtual monocular images respectively generated by the first and second waveguide apparatuses.

In some embodiments, the first and second representative virtual monocular images are identical copies of the first and second virtual monocular images displayed to the end user.

In some embodiments, the first and second representative virtual monocular images are test virtual monocular images separate from the first and second virtual monocular images displayed to the end user.

In some embodiments, the test virtual monocular images are displayed by the respective first and second waveguide apparatuses outside of the field of view of the end user.

At least some embodiments are directed to a virtual image generation system that includes the display subsystem, which may optionally include one or more of these aspects, and a control subsystem configured for correcting a mismatch between the first and second monocular images based on the at least one parameter detected by the light sensing assembly. Embodiments can optionally include one or more of the following aspects.

In some embodiments, the virtual image generation system further comprises memory configured for storing a calibration profile for the first and second waveguide apparatuses, and the control subsystem is configured for correcting the mismatch between the first and second monocular images by modifying the stored calibration profile.

In some embodiments, the virtual image generation system further comprises memory configured for storing a three-dimensional scene, wherein the control subsystem is configured for rendering a plurality of synthetic image frames of the three-dimensional scene, and the display subsystem is configured for sequentially displaying the plurality of image frames to the end user.

At least some embodiments are directed to a virtual image generation system for use by an end user, the system comprising left and right eyepieces, left and right projection subassemblies configured for projecting light into the left and right eyepieces, such that left and right monocular images are displayed as a binocular image to the end user, a light sensing assembly configured for detecting at least one parameter indicative of a mismatch between the displayed left and right monocular images as the binocular image, a frame structure configured for being worn by the end user, the frame structure configured for respectively positioning the left and right eyepieces in front of the eyes of the end user, and a control subsystem configured for correcting a mismatch between the left and right monocular images based on the at least one detected parameter detected by the light sensing assembly. Embodiments can optionally include one or more of the following aspects.

In some embodiments, each of the left and right projection subassemblies comprises one or more light sources configured for generating light, and an optical coupling assembly configured for collimating the light into the respective light beam, and coupling the respective light beam into the respective eyepiece.

In some embodiments, each optical coupling assembly comprises a collimation element configured for collimating the respective light into the respective collimated light beam, and an in-coupling element (ICE) configured for optically coupling the respective collimated light beam into the respective eyepiece.

In some embodiments, each of the left and right eyepieces comprises a planar optical waveguide into which the respective ICE is configured for optically coupling the respective collimated light beam as an in-coupled light beam, an orthogonal pupil expansion (OPE) element associated with the planar optical waveguide for splitting the respective in-coupled light beam into a plurality of orthogonal light beams, and an exit pupil expansion (EPE) element associated with the planar optical waveguide for splitting the plurality of orthogonal light beams into the light rays that exit the respective planar optical waveguide.

In some embodiments, the respective planar optical waveguide comprises a single substrate formed of a single pane of optically transparent material.

In some embodiments, the left and right projection subassemblies are carried by the frame structure, and the light sensing assembly is carried by the frame structure.

In some embodiments, the frame structure comprises a frame that carries the left and right eyepieces, and a bridge on which the light sensing assembly is affixed.

In some embodiments, the frame structure comprises left and right cantilevered arms extending from the bridge, the left eyepiece being affixed to the left cantilevered arm, and the right eyepiece being affixed to the right cantilevered arm.

In some embodiments, the light sensing assembly is optically coupled to the left and right eyepieces, but rigidly decoupled from the left and right eyepieces.

In some embodiments, each of the left and right eyepieces comprises an out-coupling element configured for optically coupling light from the respective left and right eyepieces to the light sensing assembly, wherein the at least one detected parameter is derived from the light out-coupled from the left and right eyepieces.

In some embodiments, the light sensing assembly comprises two independent sensing arrangements configured for separately detecting the light out-coupled from the left and right eyepieces.

In some embodiments, the light sensing assembly comprises a single sensor configured for detecting the light out-coupled from the left and right eyepieces.

In some embodiments, the light sensing assembly comprises an optical waveguide apparatus configured for propagating the light out-coupled from the left and right eyepieces to the single sensor.

In some embodiments, the light sensing assembly comprises at least one non-imaging sensor, and the at least one detected parameter is indicative of an angle at which a light ray exits the left eyepiece, and an angle at which a second light ray exits the right eyepiece.

In some embodiments, the at least one detected parameter comprises intensities of two light rays respectively representative of the first light ray and the second light ray.

In some embodiments, the representative light rays respectively exit the left and right eyepieces outside of a field of view of the end user.

In some embodiments, the light sensing assembly comprises at least one imaging sensor, and the at least one detected parameter comprises left and right representative virtual monocular images respectively generated by the left and right eyepieces.

In some embodiments, the left and right representative virtual monocular images are identical copies of the left and right virtual monocular images displayed to the end user.

In some embodiments, the left and right representative virtual monocular images are test virtual monocular images separate from the left and right virtual monocular images displayed to the end user.

In some embodiments, the test virtual monocular images are displayed by the respective left and right eyepieces outside of the field of view of the end user.

In some embodiments, the virtual image generation system further comprises memory configured for storing a calibration profile for the left and right eyepieces, and the control subsystem is configured for correcting the mismatch between the left and right monocular images by modifying the stored calibration profile.

In some embodiments, the virtual image generation system further comprises memory configured for storing a three-dimensional scene, wherein the control subsystem is configured for rendering a plurality of synthetic image frames of the three-dimensional scene, and the display subsystem is configured for sequentially displaying the plurality of image frames to the end user.

At least some embodiments are directed to a display system comprising: a pair of projection assemblies configured to emit light, the pair of projection assemblies comprising a first projection assembly and a second projection assembly; a pair of eyepieces comprising a first eyepiece optically coupled to the first projection assembly and a second eyepiece optically coupled to the second projection assembly; a sensing assembly comprising a pair of imaging sensors configured to capture images, the pair of imaging sensors comprising a first imaging sensor optically coupled to the first projection assembly by way of the first eyepiece, and a second imaging sensor optically coupled to the second projection assembly by way of the second eyepiece; and one or more processors in communication with the pair of projection assemblies and the pair of imaging sensors, the one or more processors configured to receive data representing images captured by the second imaging sensor, and control operation of the first projection assembly based at least in part on the data received from the second imaging sensor. Embodiments can optionally include one or more of the following aspects.

In some embodiments, the display system of claim 47, wherein the one or more processors are further configured to receive data representing images captured by the first imaging sensor, and control operation of the second projection assembly based at least in part on the data received from the first imaging sensor.

In some embodiments, to control operation of the first projection assembly based at least in part on the data received from the second imaging sensor, the one or more processors are configured to control operation of the first projection assembly based at least in part on the data received from the first and second imaging sensors.

In some embodiments, to control operation of the second projection assembly based at least in part on the data received from the first imaging sensor, the one or more processors are configured to control operation of the second projection assembly based at least in part on the data received from the first and second imaging sensors.

In some embodiments, the sensing assembly further comprises an elongated body physically coupled to the pair of imaging sensors.

In some embodiments, the first imaging sensor is physically coupled to a first distal portion of the elongated body and the second imaging sensor is physically coupled to a second distal portion of the elongated body.

In some embodiments, the first imaging sensor is physically coupled to the elongated body in lateral alignment with the second imaging sensor.

In some embodiments, the display system further comprises a housing structure, wherein the sensing assembly is mounted to an inner surface of the housing structure.

In some embodiments, the one or more processors are further configured to generate images of a virtual scene from a perspective of a first render camera, cause the first projection assembly to emit light representing images of the virtual scene as generated from the perspective of the first render camera, generate images of the virtual scene from a perspective of a second render camera, and cause the second projection assembly to emit light representing images of the virtual scene as generated from the perspective of the second render camera.

In some embodiments, to control operation of the first projection assembly based at least in part on the data received from the second imaging sensor, the one or more processors are configured to control one or more extrinsic parameters of the first render camera based at least in part on the data received from the second imaging sensor.

In some embodiments, the one or more processors are further configured to receive data representing images captured by the first imaging sensor, and control operation of the second projection assembly based at least in part on the data received from the first imaging sensor, wherein to control operation of the second projection assembly based at least in part on the data received from the first imaging sensor, the one or more processors are configured to control one or more extrinsic parameters of the second render camera based at least in part on the data received from the first imaging sensor.

At least some embodiments are directed to a head-mounted display system comprising: a housing structure; a pair of projection assemblies configured to emit light; a light sensing assembly mounted to an inner surface of the housing structure; a pair of eyepieces configured to optically couple the pair of projection assemblies to the sensing assembly; and one or more processors in communication with the pair of projection assemblies and the light sensing assembly, the one or more processors configured to control operation of the pair of projection assemblies based at least in part on data received from the light sensing assembly. Embodiments can optionally include one or more of the following aspects.

In some embodiments, each eyepiece in the pair of eyepieces comprises a respective waveguide apparatus, a respective in-coupling element configured to in-couple light emitted by a respective one of the pair of projection assemblies into the respective waveguide apparatus, and a respective out-coupling element configured to couple light from the respective one of the pair of projection assemblies guided within the respective waveguide apparatus out of the respective waveguide apparatus.

In some embodiments, a first portion of the respective out-coupling element is configured to couple light from the respective one of the pair of projection assemblies guided within the respective waveguide apparatus out of the respective waveguide apparatus toward a respective eye of a user, and a second portion of the respective out-coupling element is configured to couple light from the respective one of the pair of projection assemblies guided within the respective waveguide apparatus out of the respective waveguide apparatus toward the light sensing assembly.

In some embodiments, each eyepiece in the pair of eyepieces comprises a respective exit pupil expansion (EPE) element configured to split light from the respective one of the pair of projection assemblies guided within the respective waveguide apparatus into multiple light rays that exit the respective waveguide apparatus and are directed to a respective eye of a user.

In some embodiments, the light sensing assembly is rigidly decoupled from the pair of eyepieces.

With reference to FIG. 2, a display subsystem 20 can include one or more light sources 22 that generates light, an optical fiber 24 that emits the light, and a collimation element 26 that collimates the light exiting the distal end of the optical fiber 24 into a light beam 36. The display subsystem 20 further comprises a piezoelectric element 28 to or in which the optical fiber 24 is mounted as a fixed-free flexible cantilever, and drive electronics 30 electrically coupled to the piezoelectric element 22 to activate electrically stimulate the piezoelectric element 28, thereby causing the distal end of the optical fiber 24 to vibrate in a predetermined scan pattern that creates deflections 32 about a fulcrum 34, thereby scanning the collimated light beam 36 in accordance with the scan pattern.

The display subsystem 20 comprises a waveguide apparatus 38 that includes a planar optical waveguide 40 that is generally parallel to the field-of-view of the end user, a diffractive optical element (DOE) 42 associated with the planar optical waveguides 40, and in-coupling element (ICE) 42 (which takes the form of a DOE) integrated within the end of the planar optical waveguide 40. The ICE 42 in-couples and redirects the collimated light 36 from the collimation element 26 into the planar optical waveguide 40. The collimated light beam 36 from the collimation element 26 propagates along the planar optical waveguide 40 and intersects with the DOE 42, causing a portion of the light to exit the face of the waveguide apparatus 38 as light rays 46 towards the eyes of the end user that are focused at a viewing distance depending on the lensing factor of the planar optical waveguide 40. Thus, the light source(s) 22 in conjunction with the drive electronics 30 generate image data encoded in the form of light that is spatially and/or temporally varying.

The location of each pixel visualized by the end user is highly dependent on the angle of the light rays 48 that exit the planar optical waveguide 40. Thus, light rays 48 that exit the waveguide 40 at different angles will create pixels at different locations in the field of view of the end user. For example, if it is desired to locate a pixel at the top right of the field of view of the end user, a collimated light beam 36 may be input into the waveguide apparatus 38 at one angle, and if is desired to locate a pixel at the center of the field of view of the end user, the collimated light beam 36 may be input into the waveguide apparatus 38 at a second different angle. Thus, as the optical fiber 24 is being scanned in accordance with a scan pattern, the light beam 36 originating from the optical fiber 24 will be input into the waveguide apparatus 38 at different angles, thereby creating pixels at different locations in the field of view of the end user. Thus, the location of each pixel in the field of view of the end user is highly dependent on the angle of the light rays 48 exiting the planar optical waveguide 40, and thus, the locations of these pixels are encoded within the image data generated by the display subsystem 20.

Although the angle of the light beam 36 entering the waveguide apparatus 38, and thus, the angle of the light beam 36 entering the planar optical waveguide 40, will differ from the angles of the light rays 48 exiting the planar optical waveguide 40, the relationships between the angle of the light beam 36 entering the waveguide apparatus 38 and the angles of the light rays 48 exiting the planar optical waveguide 40 is well-known and predictable, and thus, the angles of the light rays 48 exiting the planar optical waveguide 40 can be easily predicted from the angle of the collimated light beam 36 entering the waveguide apparatus 38.

It can be appreciated from the foregoing that the actual angles of the light beams 36 entering the waveguide apparatus 38 from the optical fiber 24, and thus, the actual angles of the light rays 48 exiting the waveguide 40 towards the end user be identical or near identical or one-to-one in relationship to the designed angles of the exiting light rays 48, such that the locations of the pixels visualized by the end user are properly encoded in the image data generated by the display subsystem 20. However, due to manufacturing tolerances between different scanners, as well, as changing environmental conditions, such as variations in temperature that may change the consistency of bonding materials used to integrate the display subsystem 20 together, the actual angles of the exiting light rays 48, without compensation, will vary from the designed angles of the exiting light rays 48, thereby creating pixels that are in the incorrect locations within the field of view of the end user, resulting in image distortion.

In some embodiments, two waveguide apparatuses 38 of the display subsystem 20 may respectively take the form of a left eyepiece 70L and a right eyepiece 70R, as illustrated in FIG. 3. Such eyepieces 70L, 70R may be incorporated into a pair of binocularly-aligned eyepieces. Although each eyepiece 70L, 70R may be internally rigid, in such embodiments, the two eyepieces 70L, 70R may be flexible/deformable relative to one another by virtue of the form factor of a frame structure (not shown). This deformation issue becomes especially significant as the form factor of the frame structure becomes more lightweight, thin, and flexible in order to facilitate transportation, comfort, and a more aesthetically-pleasing look. In some situations, relative movement of the two eyepieces 70L, 70R may introduce distortion and other error into the virtual binocular image that is to be projected onto the user's retina.

For example, as illustrated in FIGS. 4A-4D, an exemplary representation of virtual content may be presented and perceived through the pair of eyepieces 70L, 70R to left and right eyes, respectively, as part of a virtual image generation system. As shown in FIG. 4A, the two eyepieces 70L, 70R are aligned with one another in an ideal manner. In other words, the alignment of the two eyepieces 70L, 70R has not changed since the time of manufacture of the virtual image generation system. Thus, the virtual image generation system may generate and present left and right monocular virtual content 72L, 72R as a binocularly-aligned virtual content 74 through the two eyepieces 70L, 70R to the user's eyes.

However, if the alignment of the two eyepieces 70L, 70R were to hypothetically change some point after the time of manufacture of the virtual image generation system, the alignment of the pair of eyepieces 70L, 70R in each of FIGS. 4B, 4C, and 4D may differ from that of FIG. 4A. As illustrated in FIGS. 4B, 4C, and 4D, post-factory changes in the alignment of the pair of eyepieces 70L, 70R about the Pitch-axis, the Roll-axis, and the Yaw-axis, could result in left and right virtual content 72L, 72R being presented and perceived through the pair of eyepieces 70L, 70R as binocularly misaligned virtual content 74, as respectively shown in FIGS. 4B, 4C, and 4D. Such misalignments between the left and right eyepieces 70L, 70R may result in perceived translational and/or rotational misalignments between left and right virtual content 72L, 72R. Furthermore, studies show that binocular misalignments can cause physiological strain on the human visual system, and that humans are sensitive to binocular rotational misalignment of virtual images about the Pitch, Roll, and Yaw axes down to 4, 6, and 10 arcminutes, respectively. As described in further detail below, compensation for misalignments of binocular eyepieces may be achieved by way of systems and techniques for directly tapping light intended for the left and right eyes and comparatively sensing and correcting relative misalignments in virtual images.

In accordance with a first aspect of the present inventions, a display subsystem for a virtual image generation system used by an end user is provided. The display subsystem comprises first and second waveguide apparatuses. In one embodiment, the first and second waveguide apparatuses are respectively configured for being positioned in front of the eyes of the end user. In another embodiment, the first and second waveguide apparatuses respectively have partially transparent display surfaces configured for being positioned in the field of view between the eyes of the end user and an ambient environment. In still another embodiment, the display subsystem further comprises a frame structure configured for being worn by the end user, in which case, the first and second waveguide apparatuses are left and right eyepieces carried by the frame structure.

The display subsystem further comprises first and second projection subassemblies configured for introducing first and second light beams respectively into the first and second waveguide apparatuses, such that at least a first light ray and at least a second light ray respectively exit the first and second waveguide apparatuses to display first and second monocular images as a binocular image to the end user.

In one embodiment, each of the first and second projection subassemblies comprises one or more light sources configured for generating light, and an optical coupling assembly configured for collimating the light into the respective light beam, and coupling the respective light beam into the respective waveguide apparatus. The optical coupling assembly may comprise a collimation element configured for collimating the respective light into the respective collimated light beam, and an in-coupling element (ICE) configured for optically coupling the respective collimated light beam into the respective waveguide apparatus. In this case, each of the first and second waveguide apparatuses may comprise a planar optical waveguide (e.g., a single substrate formed of a single pane of optically transparent material) into which the respective ICE is configured for optically coupling the respective collimated light beam as an in-coupled light beam, an orthogonal pupil expansion (OPE) element associated with the planar optical waveguide for splitting the respective in-coupled light beam into a plurality of orthogonal light beams, and an exit pupil expansion (EPE) element associated with the planar optical waveguide for splitting the plurality of orthogonal light beams into the light rays that exit the respective planar optical waveguide.

In this embodiment, each of the first and second projection subassemblies may further comprise a scanning device configured for scanning the light generating by the respective one or more light sources in a predetermined scan pattern in response to control signals. Each scanning device may comprise an optical fiber configured for emitting the light generated by the respective one or more light sources, and a mechanical drive assembly configured for displacing the respective optical fiber in accordance with the predetermined scan pattern. Each mechanical drive assembly may comprise a piezoelectric element to which the optical fiber is mounted, and drive electronics configured for conveying electrical signals to the piezoelectric element, thereby causing the optical fiber to vibrate in accordance with the predetermined scan pattern.

The display subsystem further comprises a light sensing assembly configured for detecting at least one parameter indicative of a mismatch between the displayed first and second monocular images as the binocular image.

In embodiment, the display subsystem further comprises a frame structure having a frame that carries the first and second waveguide apparatus as left and right eyepieces, and a bridge on which the light sensing assembly is affixed. The frame structure may further have left and right cantilevered arms extending from the bridge, in which case, the left eyepiece is affixed to the left cantilevered arm, and the right eyepiece is affixed to the right cantilevered arm. In another embodiment, the light sensing assembly is optically coupled to the first and second waveguide apparatuses, but rigidly decoupled from the first and second waveguide apparatuses.

In still another embodiment, each of the first and second waveguide apparatuses comprises an out-coupling element configured for optically coupling light from the respective first and second waveguide apparatuses to the light sensing assembly, in which case, the detected parameter(s) is derived from the light out-coupled from the first and second waveguide apparatuses. The light sensing assembly may comprise two independent sensing arrangements configured for separately detecting the light out-coupled from the first and second waveguide apparatuses. Or the light sensing assembly may comprise a single sensor configured for detecting the light out-coupled from the first and second waveguide apparatuses. In this case, the light sensing assembly may comprise an optical waveguide apparatus configured for propagating the light out-coupled from the first and second waveguide apparatuses to the single sensor.

In yet another embodiment, the light sensing assembly comprises at least one non-imaging sensor, in which case, the detected parameter(s) may be indicative of an angle at which the first light ray(s) exits the first waveguide apparatus, and an angle at which the second light ray(s) exits the second waveguide apparatus. The detected parameter(s) may comprise intensities of two light rays respectively representative of the first light ray(s) and the second light ray(s). The two representative light rays may respectively exit the first and second waveguide apparatuses outside of a field of view of the end user.

In yet another embodiment, the light sensing assembly comprises at least one imaging sensor, in which case, the detected parameter(s) may comprise first and second representative virtual monocular images respectively generated by the first and second waveguide apparatuses. The first and second representative virtual monocular images may be identical copies of the first and second virtual monocular images displayed to the end user. Or the first and second representative virtual monocular images may be test virtual monocular images separate from the first and second virtual monocular images displayed to the end user. The test virtual monocular images may be displayed by the respective first and second waveguide apparatuses outside of the field of view of the end user.

In accordance with a second aspect of the present inventions, a virtual image generation system comprises the display subsystem described above, and a control subsystem configured for correcting a mismatch between the first and second monocular images based on the parameter(s) detected by the light sensing assembly. In one embodiment, the virtual image generation system further comprises memory configured for storing a calibration profile for the first and second waveguide apparatuses, in which case, the control subsystem may be configured for correcting the mismatch between the first and second monocular images by modifying the stored calibration profile. In another embodiment, the virtual image generation system further comprises memory configured for storing a three-dimensional scene, in which case, the control subsystem may be configured for rendering a plurality of synthetic image frames of the three-dimensional scene, and the display subsystem may be configured for sequentially displaying the plurality of image frames to the end user.

In accordance with a third aspect of the present inventions, a virtual image generation system for use by an end user is provided. The virtual image generation system comprises left and right eyepieces. The left and right eyepieces may respectively have partially transparent display surfaces configured for being positioned in the field of view between the eyes of the end user and an ambient environment.

The virtual image generation system further comprises left and right projection subassemblies configured for projecting light into the left and right eyepieces, such that left and right monocular images are displayed as a binocular image to the end user.

In one embodiment, each of the left and right projection subassemblies comprises one or more light sources configured for generating light, and an optical coupling assembly configured for collimating the light into the respective light beam, and coupling the respective light beam into the respective eyepiece. Each optical coupling assembly may comprise a collimation element configured for collimating the respective light into the respective collimated light beam, and an in-coupling element (ICE) configured for optically coupling the respective collimated light beam into the respective eyepiece. Each of the left and right eyepieces may comprise a planar optical waveguide (e.g., a single substrate formed of a single pane of optically transparent material) into which the respective ICE is configured for optically coupling the respective collimated light beam as an in-coupled light beam, an orthogonal pupil expansion (OPE) element associated with the planar optical waveguide for splitting the respective in-coupled light beam into a plurality of orthogonal light beams, and an exit pupil expansion (EPE) element associated with the planar optical waveguide for splitting the plurality of orthogonal light beams into the light rays that exit the respective planar optical waveguide.

In another embodiment, each of the left and right projection subassemblies comprises a scanning device configured for scanning the light generating by the respective light sources(s) in a predetermined scan pattern in response to control signals. Each scanning device may comprise an optical fiber configured for emitting the light generated by the respective light source(s), and a mechanical drive assembly configured for displacing the respective optical fiber in accordance with the predetermined scan pattern. Each mechanical drive assembly may comprise a piezoelectric element to which the optical fiber is mounted, and drive electronics configured for conveying electrical signals to the piezoelectric element, thereby causing the optical fiber to vibrate in accordance with the predetermined scan pattern.

The virtual image generation system further comprises a light sensing assembly configured for detecting at least one parameter indicative of a mismatch between the displayed left and right monocular images as the binocular image. The virtual image generation system further comprises a frame structure configured for being worn by the end user. The frame structure is configured for respectively positioning the left and right eyepieces in front of the eyes of the end user. In one embodiment, the left and right projection subassemblies are carried by the frame structure, and the light sensing assembly is carried by the frame structure. In another embodiment, the frame structure comprises a frame that carries the left and right eyepieces, and a bridge on which the light sensing assembly is affixed. The frame structure may comprise left and right cantilevered arms extending from the bridge, the left eyepiece may be affixed to the left cantilevered arm, and the right eyepiece may be affixed to the right cantilevered arm. In another embodiment, the light sensing assembly is optically coupled to the left and right eyepieces, but rigidly decoupled from the left and right eyepieces.

In still another embodiment, each of the left and right eyepieces comprises an out-coupling element configured for optically coupling light from the respective left and right eyepieces to the light sensing assembly, in which case, the detected parameter(s) can be derived from the light out-coupled from the left and right eyepieces. The light sensing assembly may comprise two independent sensing arrangements configured for separately detecting the light out-coupled from the left and right eyepieces. Or the sensing assembly may comprise a single sensor configured for detecting the light out-coupled from the left and right eyepieces. In this case, the light sensing assembly may comprise an optical waveguide apparatus configured for propagating the light out-coupled from the left and right eyepieces to the single sensor.

In yet another embodiment, the light sensing assembly comprises at least one non-imaging sensor, and the detected parameter(s) is indicative of an angle at which a light ray exits the left eyepiece, and an angle at which a second light ray exits the right eyepiece. The detected parameter(s) may comprise intensities of two light rays respectively representative of the first light ray(s) and the second light ray(s). The two representative light rays may respectively exit the first and second waveguide apparatuses outside of a field of view of the end user.

In yet another embodiment, the light sensing assembly comprises at least one imaging sensor, in which case, the detected parameter(s) may comprise left and right representative virtual monocular images respectively generated by the left and right eyepieces. The left and right representative virtual monocular images may be identical copies of the left and right virtual monocular images displayed to the end user. Or the left and right representative virtual monocular images may be test virtual monocular images separate from the left and right virtual monocular images displayed to the end user. The test virtual monocular images may be displayed by the respective left and right eyepieces outside of the field of view of the end user.

The virtual image generation system further comprises a control subsystem configured for correcting a mismatch between the left and right monocular images based on the parameter(s) detected by the light sensing assembly. In one embodiment, the virtual image generation system further comprises memory configured for storing a calibration profile for the left and right eyepieces, in which case, the control subsystem may be configured for correcting the mismatch between the left and right monocular images by modifying the stored calibration profile. In another embodiment, the virtual image generation system further comprises memory configured for storing a three-dimensional scene, in which case, the control subsystem may be configured for rendering a plurality of synthetic image frames of the three-dimensional scene, and the display subsystem may be configured for sequentially displaying the plurality of image frames to the end user.

Additional and other objects, features, and advantages of the invention are described in the detail description, figures and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings described below are for illustration purposes only. The drawings are not intended to limit the scope of the present disclosure.

Figure 1:
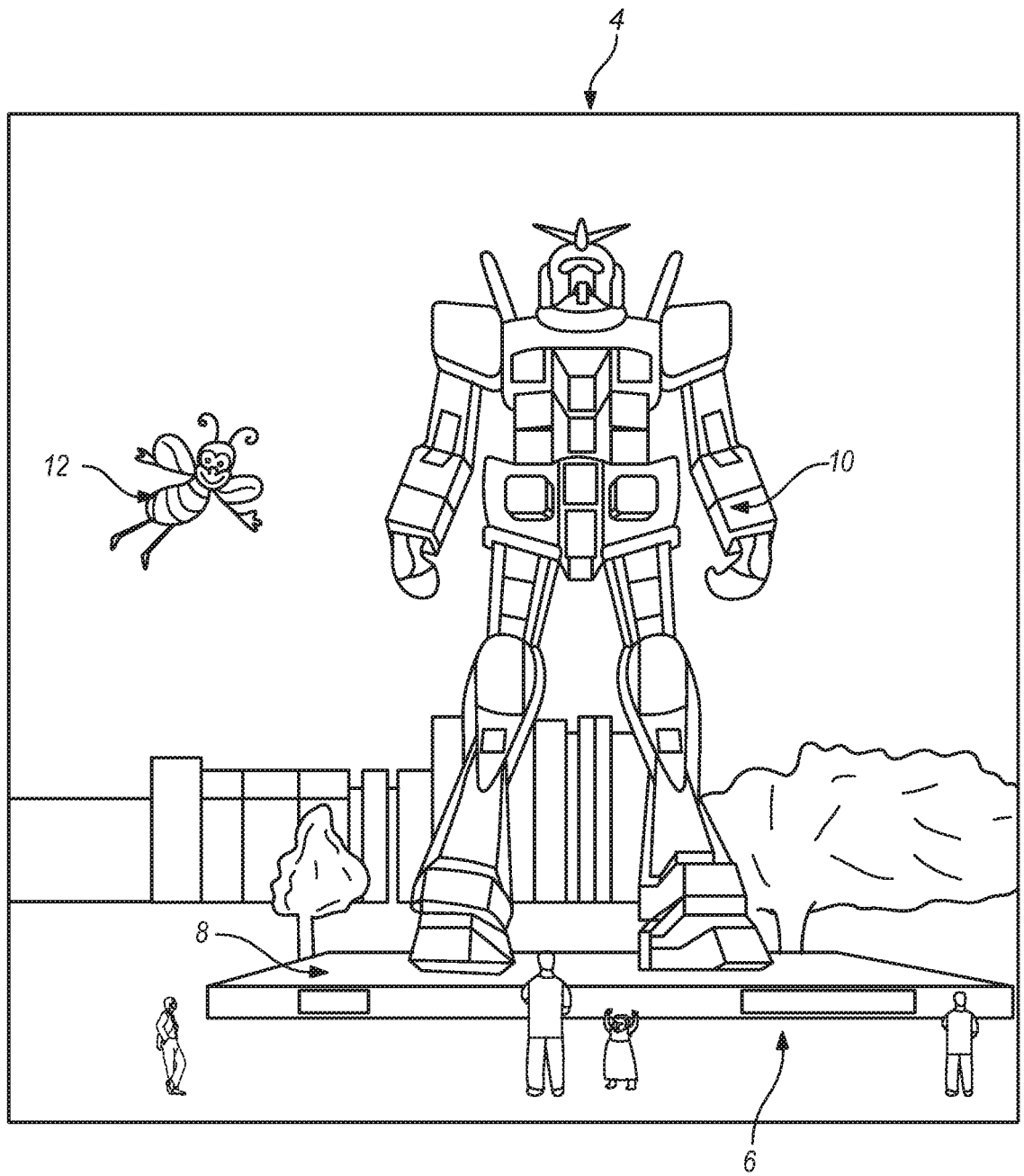

The drawings described below are for illustration purposes only. The drawings are not intended to limit the scope of the present disclosure. This patent or application file contains at least one drawing executed in color. Copies of this patent or patent application publication with color drawings will be provided by the U.S. Patent and Trademark Office upon request and payment of the necessary fee.

Figure 2:
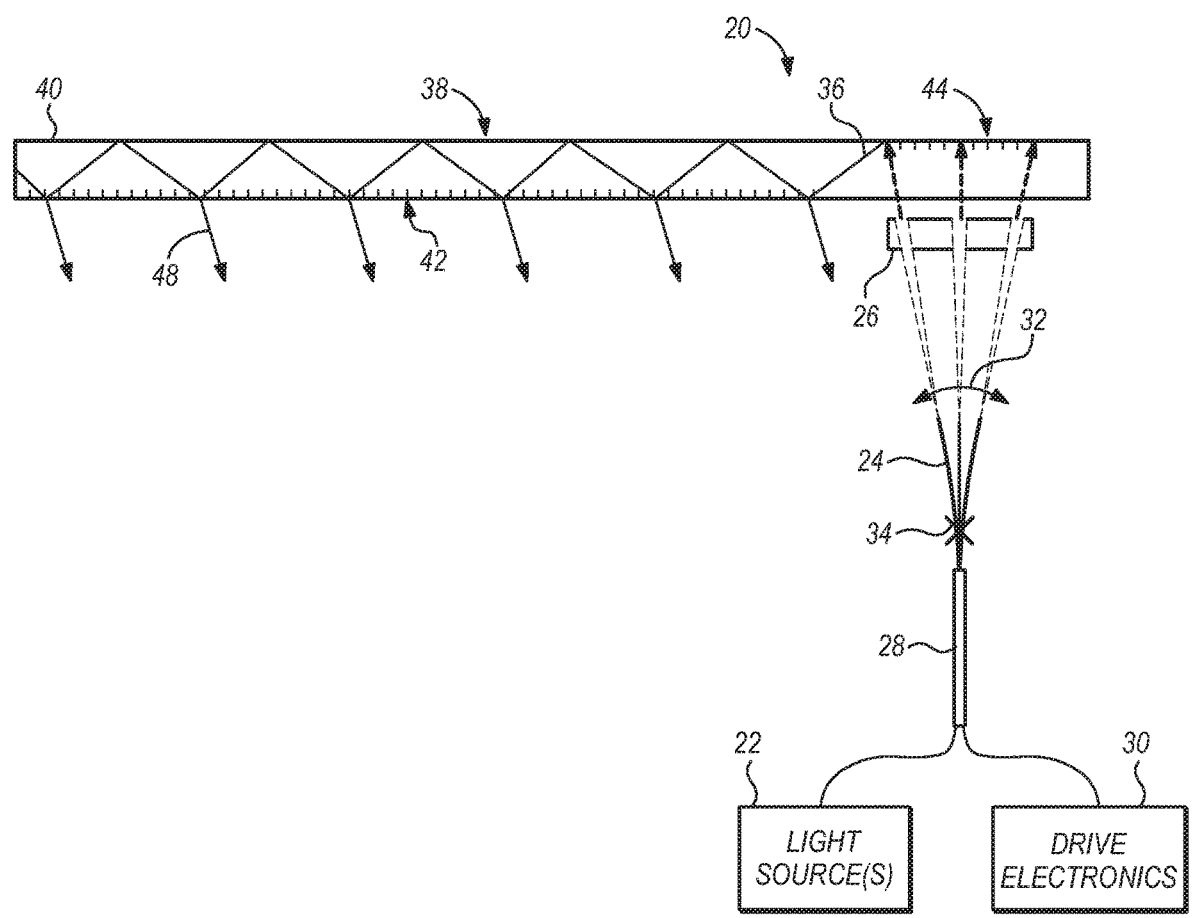
Figure 3:
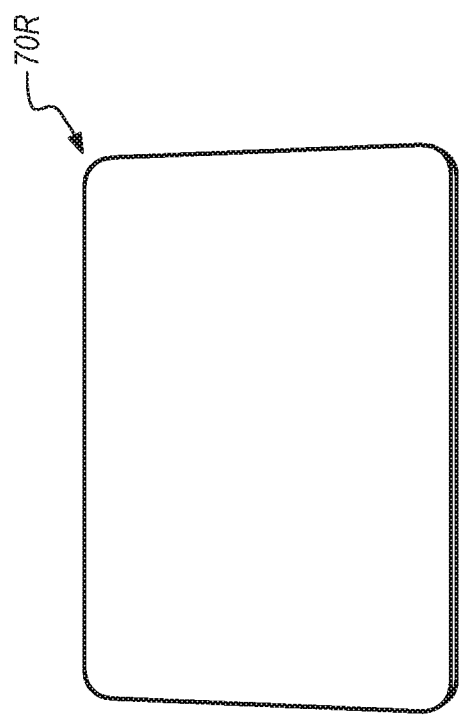
Figure 3:
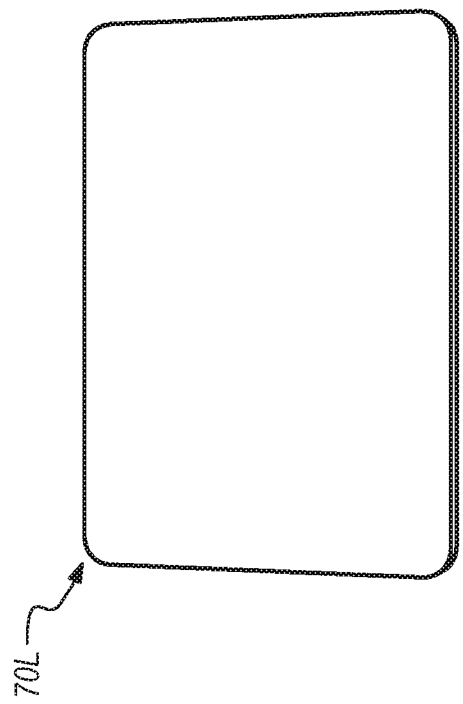
Figure 4A:
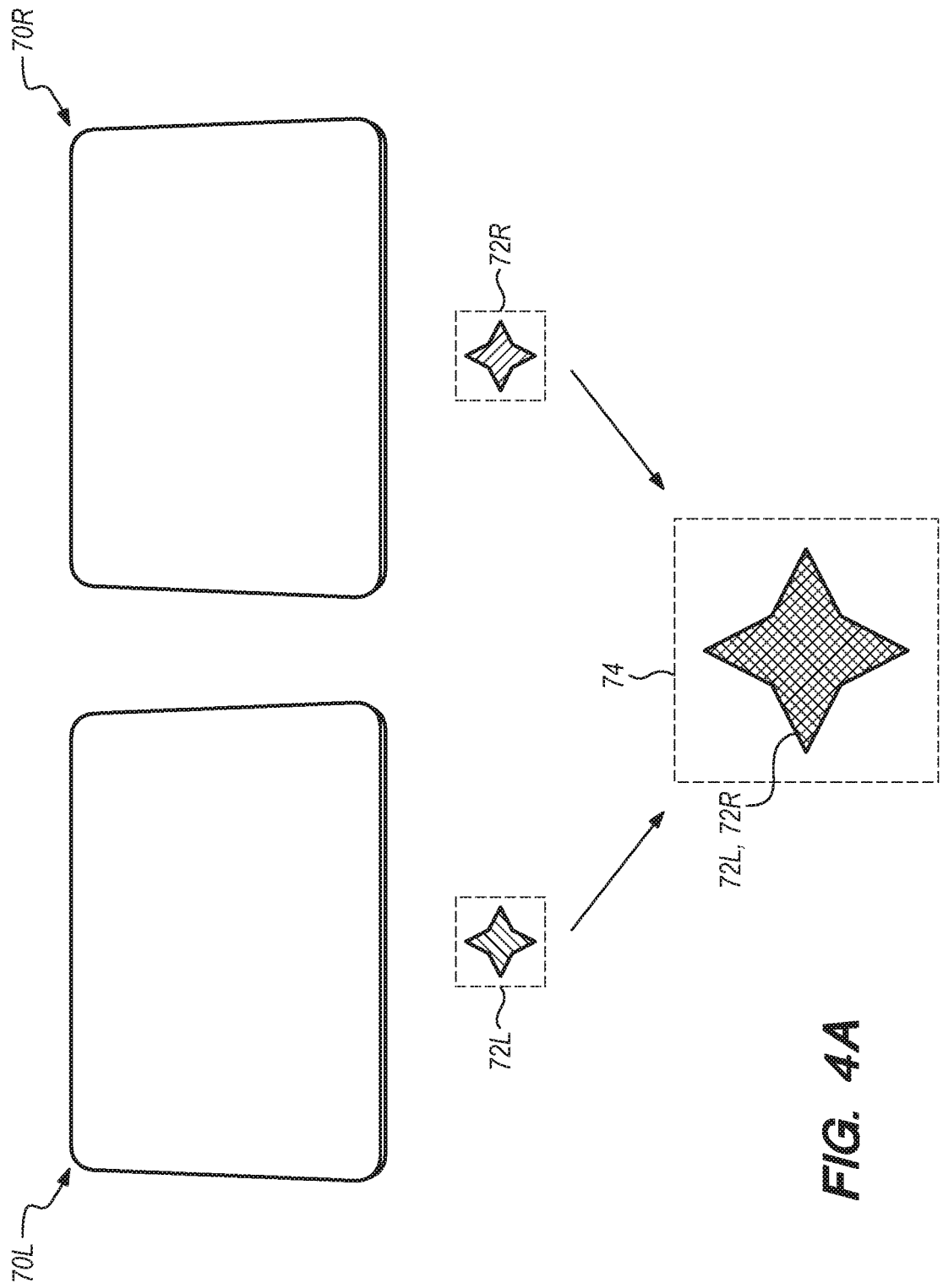
Figure 4B:
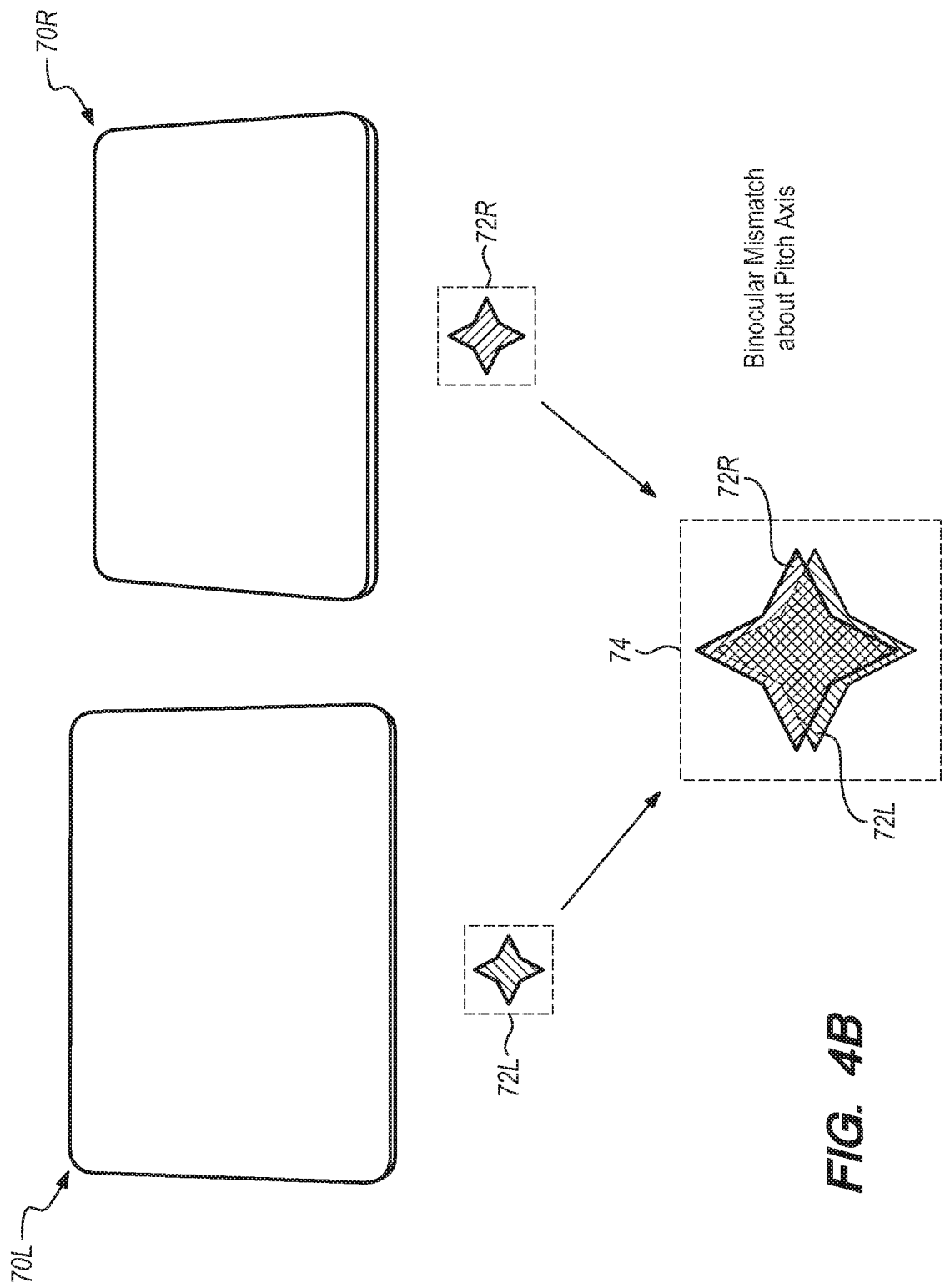
Figure 4C:
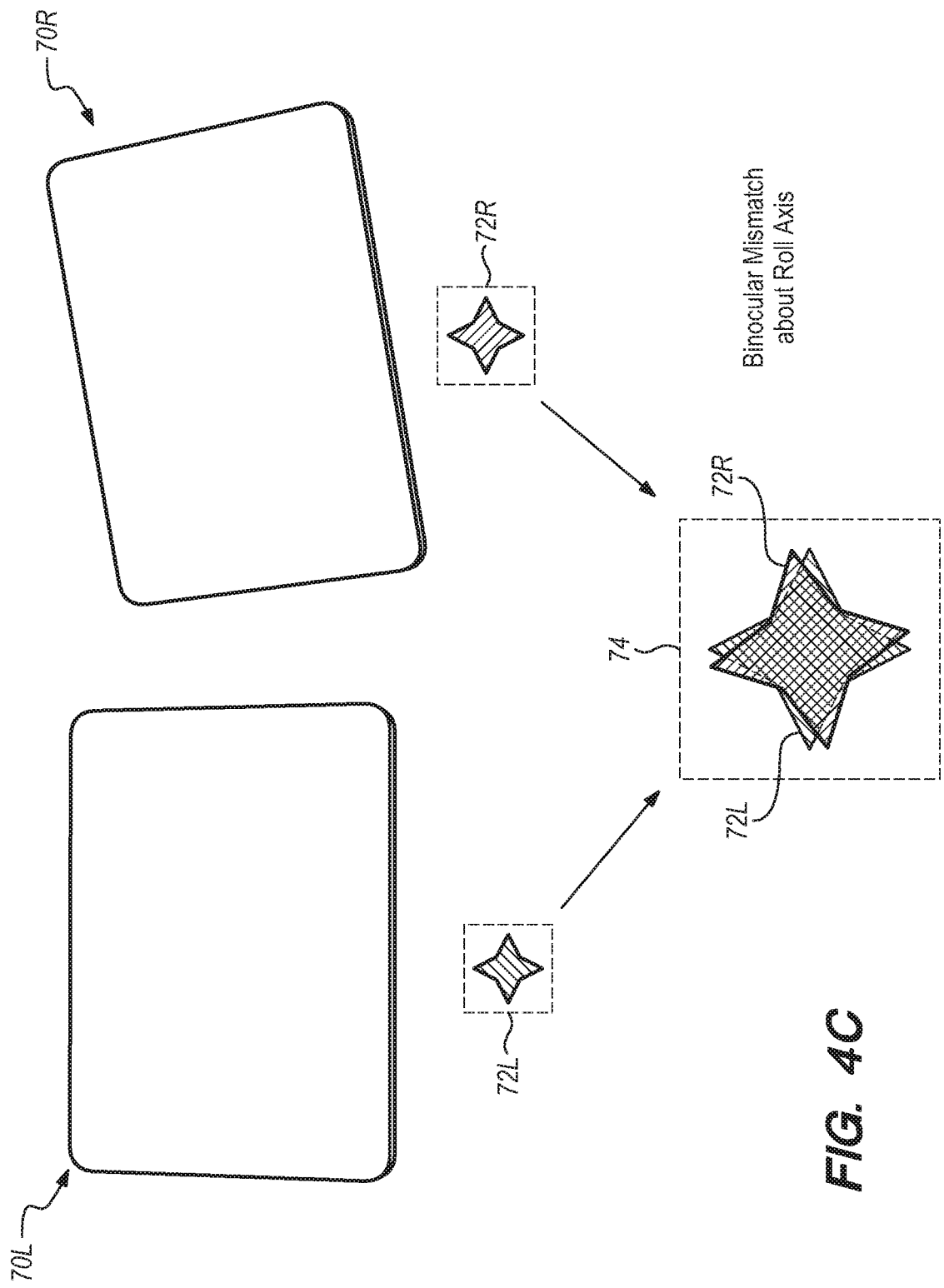
Figure 4D:
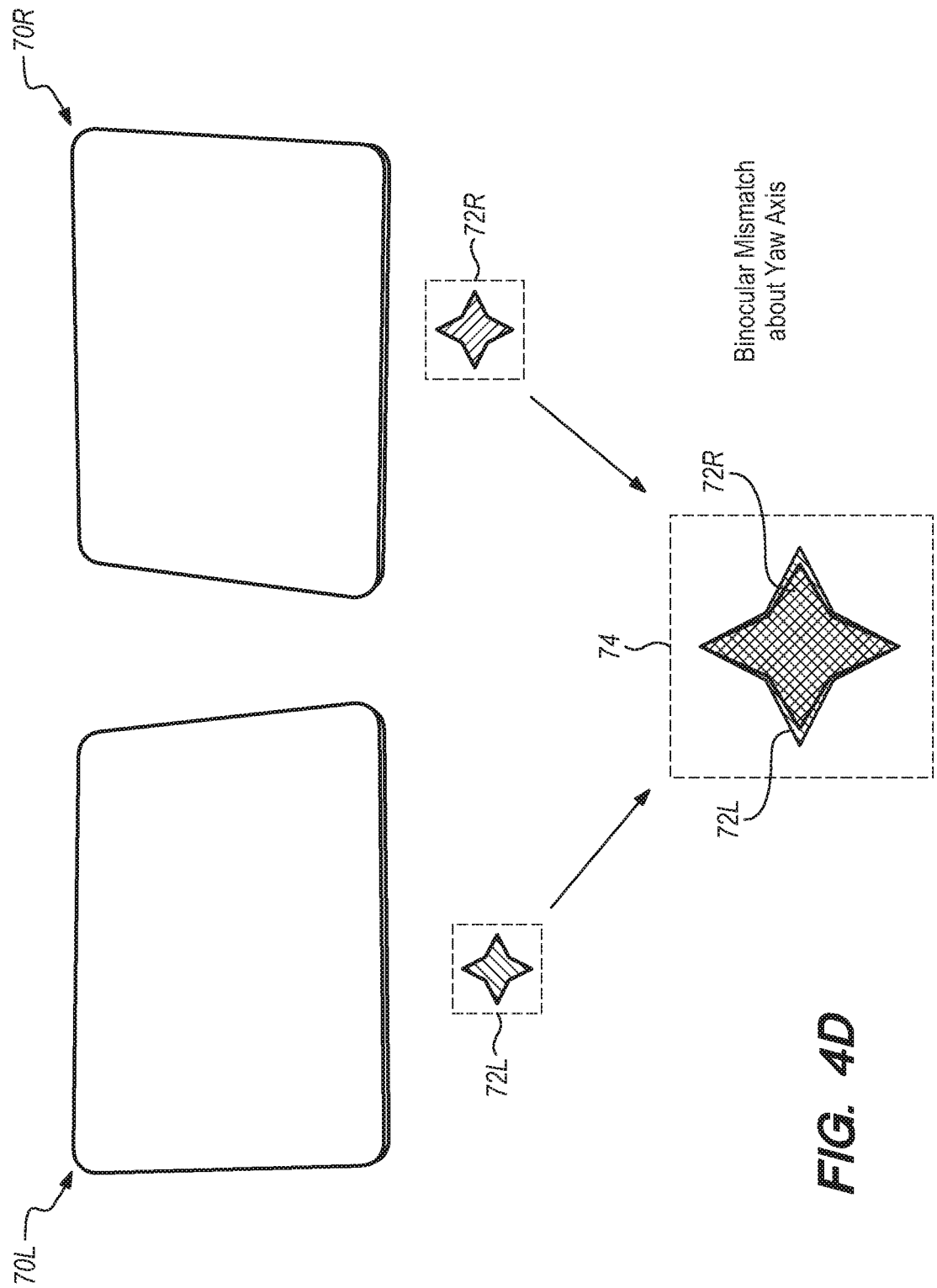
Figure 5:
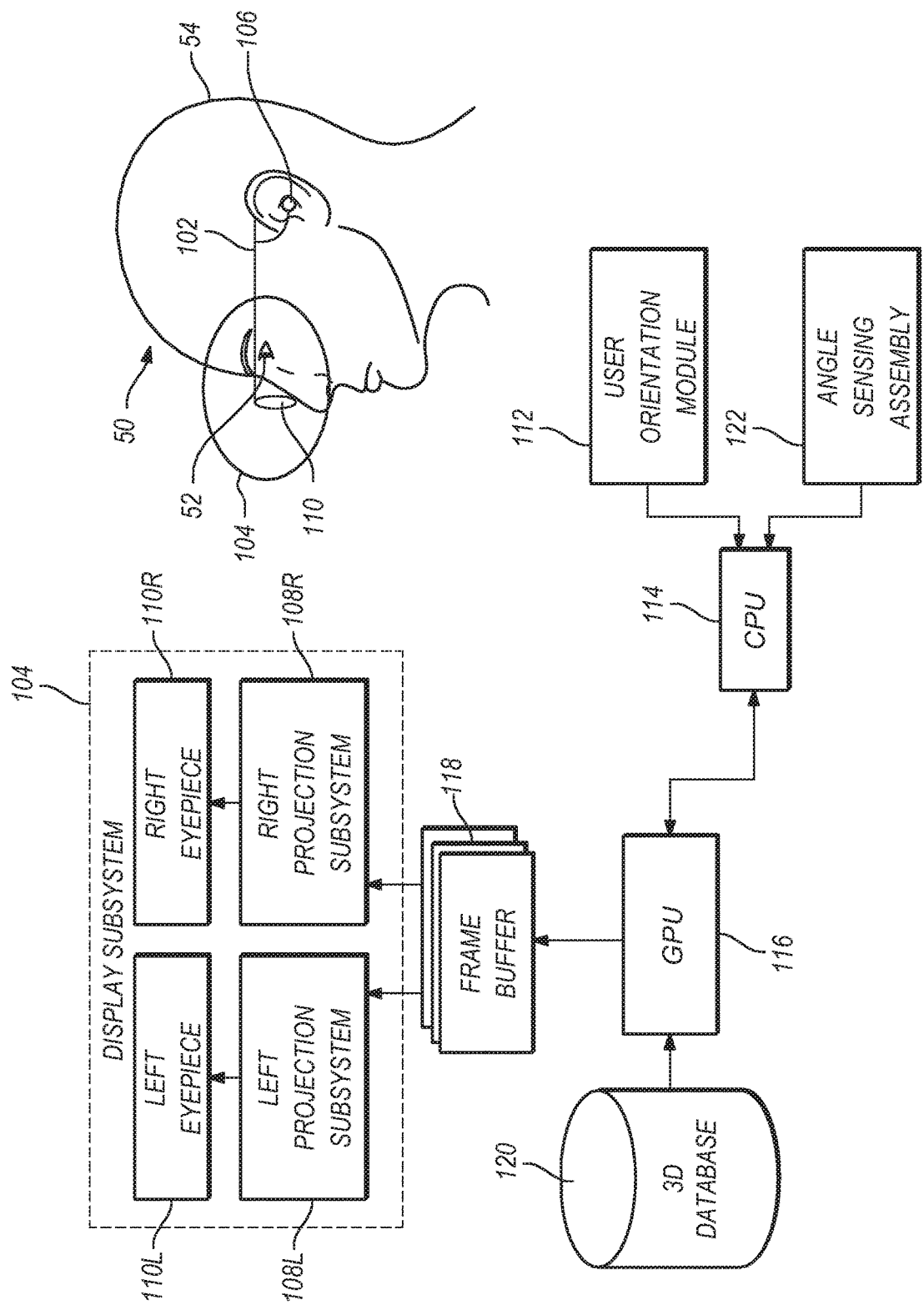
Figure 6A:
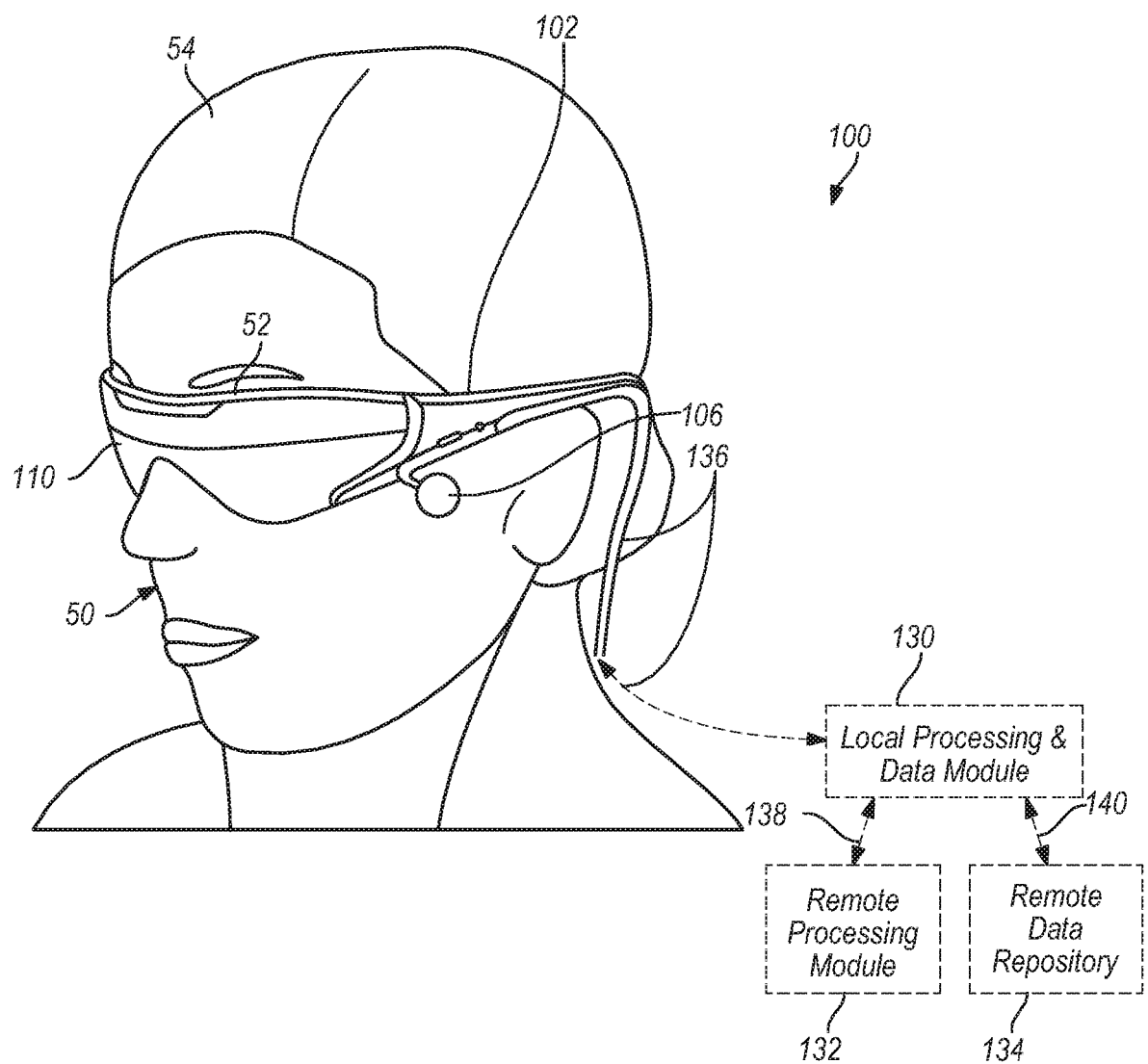
Figure 6B:
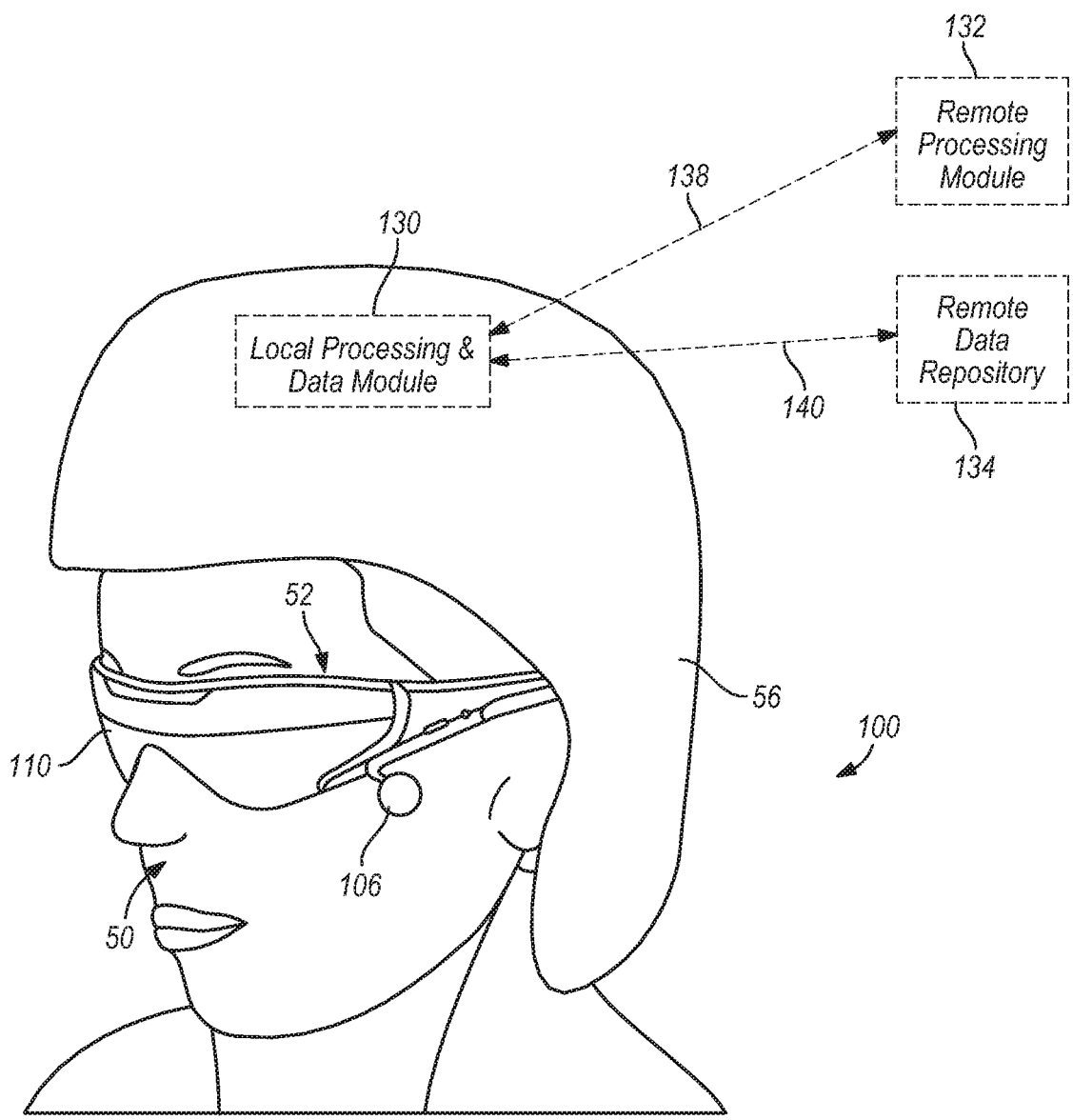
Figure 6C:
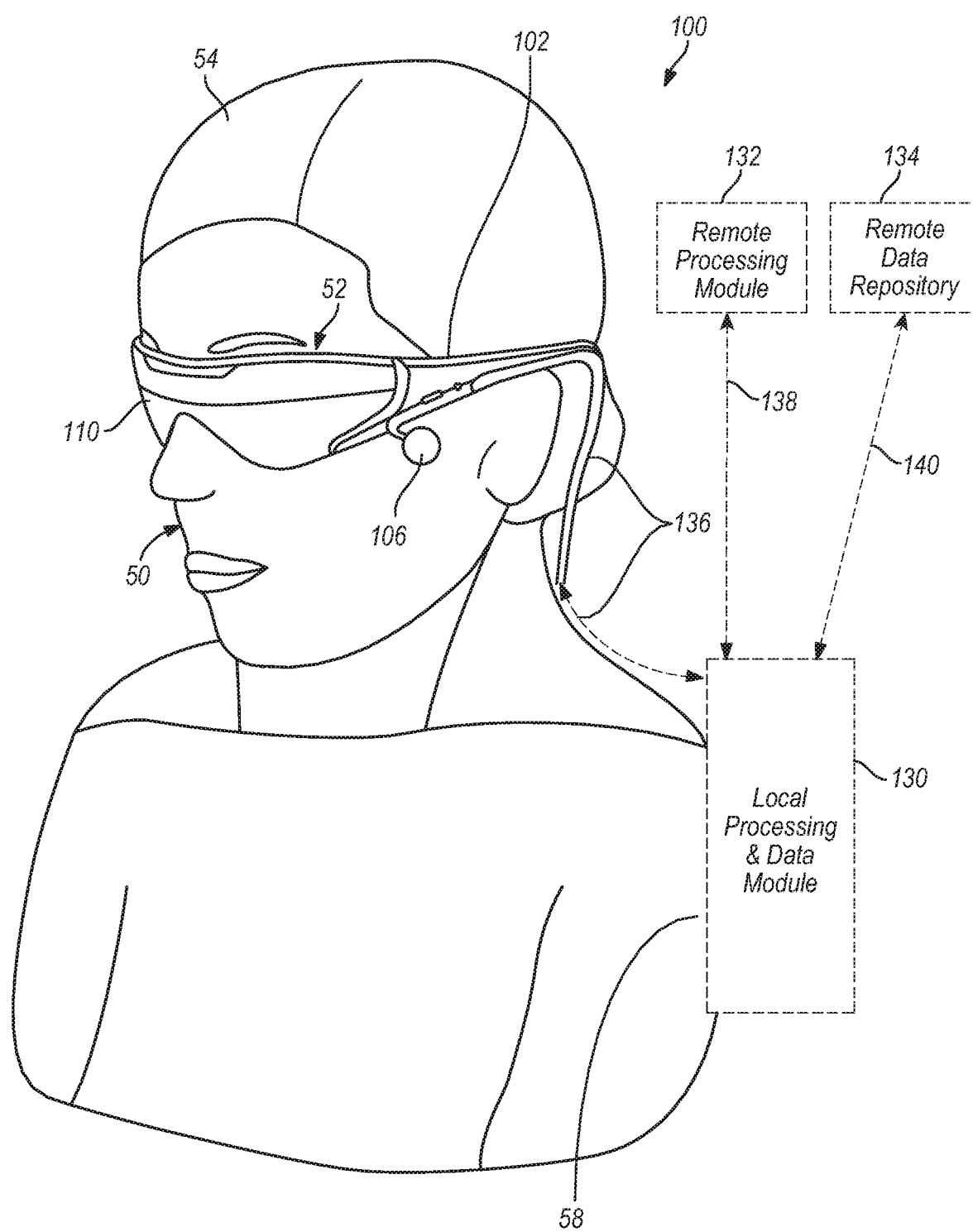
Figure 6D:
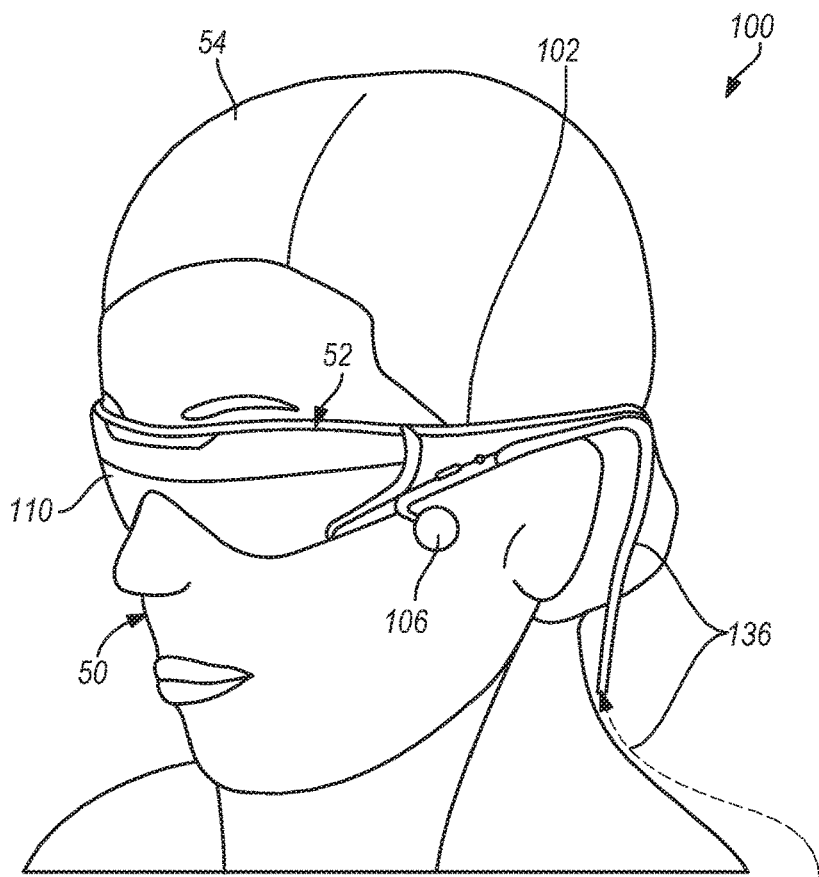
Figure 6D:
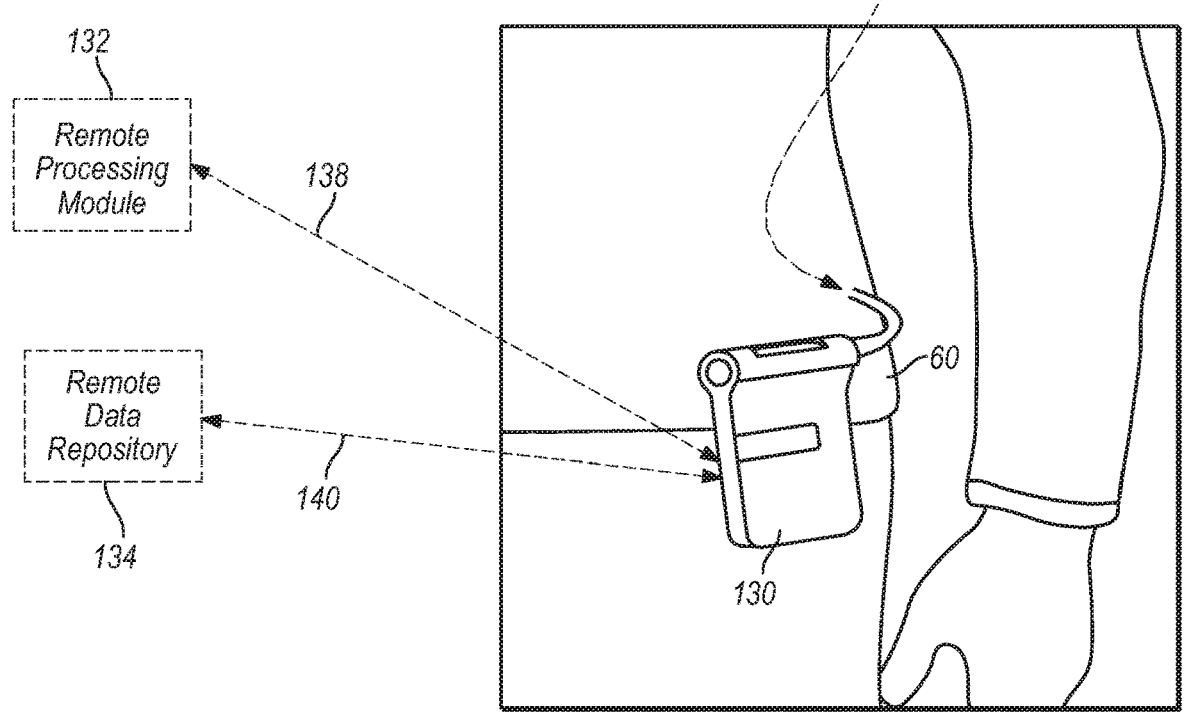
Figure 7:
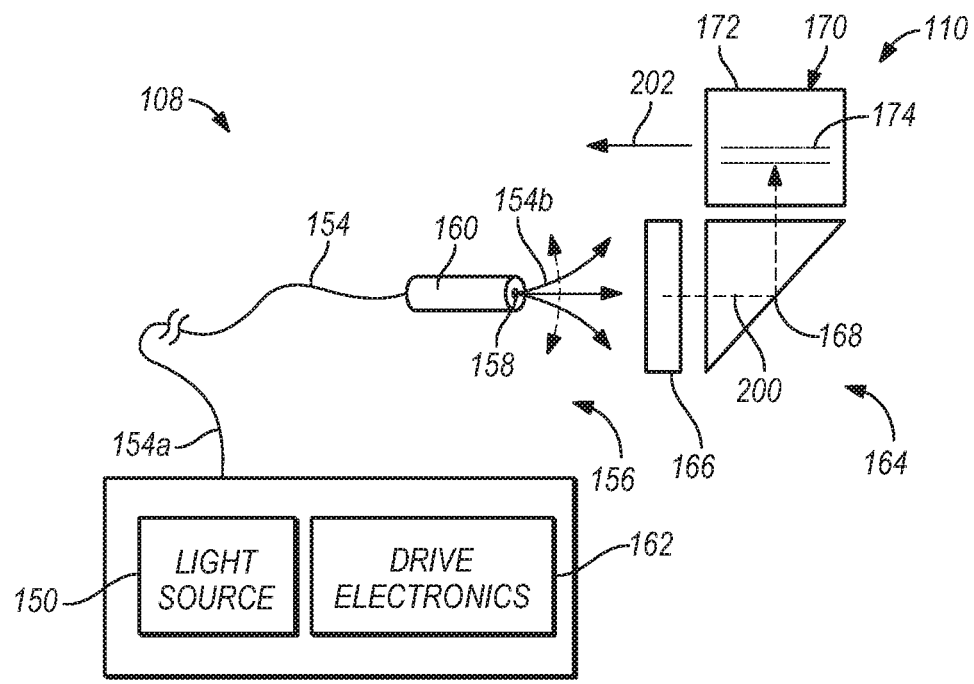
Figure 8:
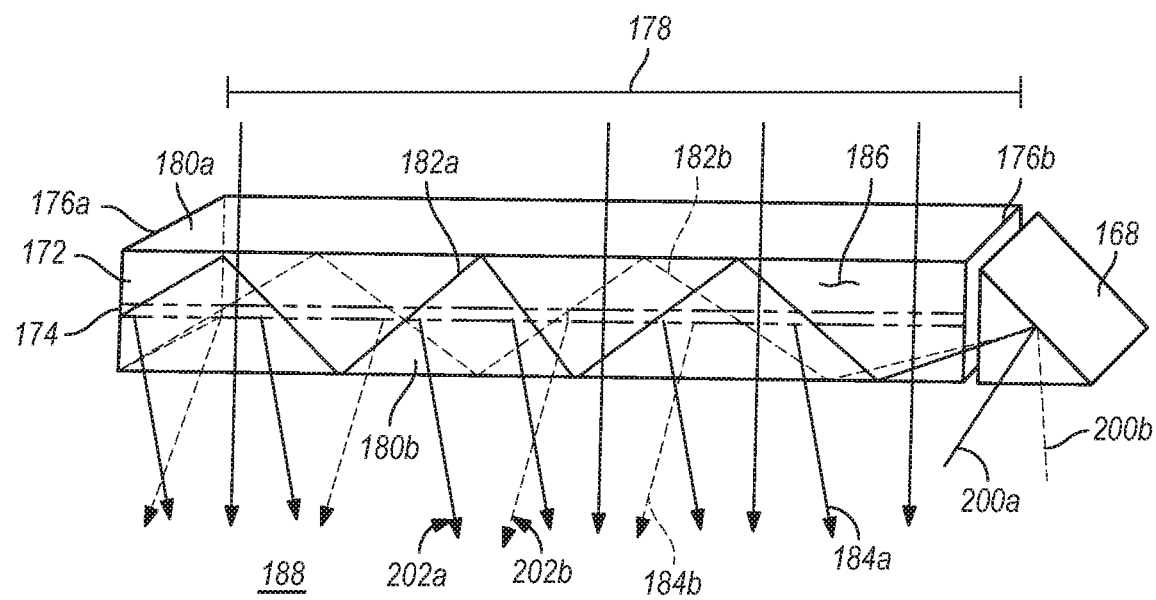
Figure 9:
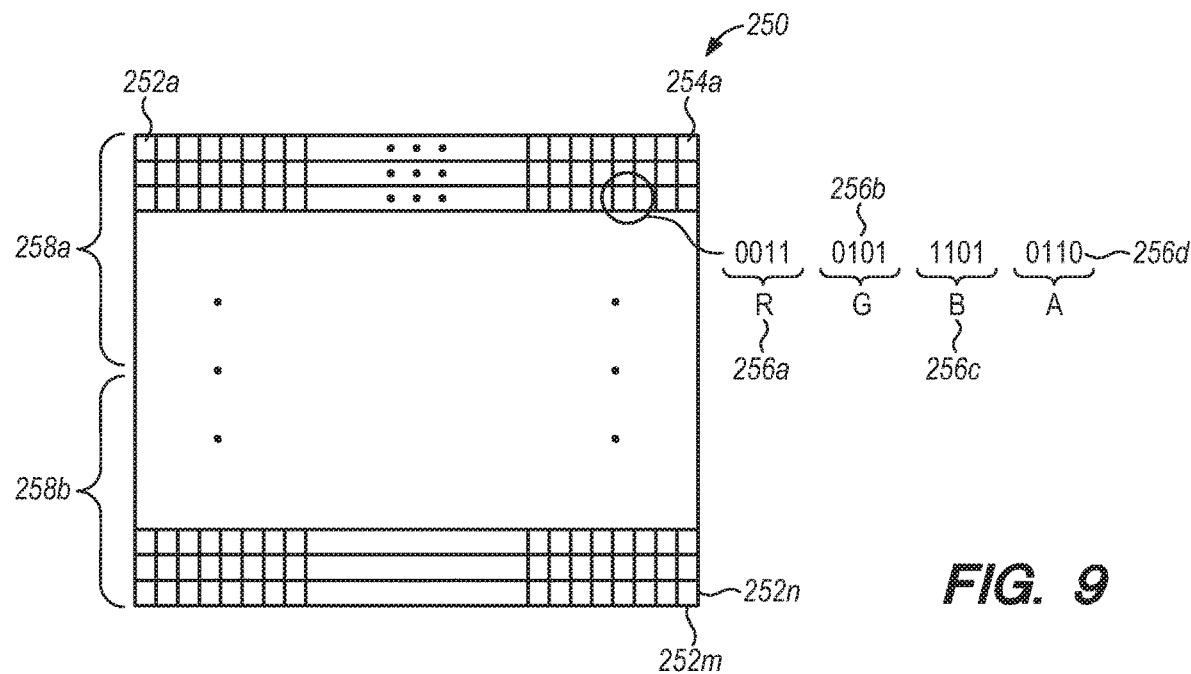
Figure 10:
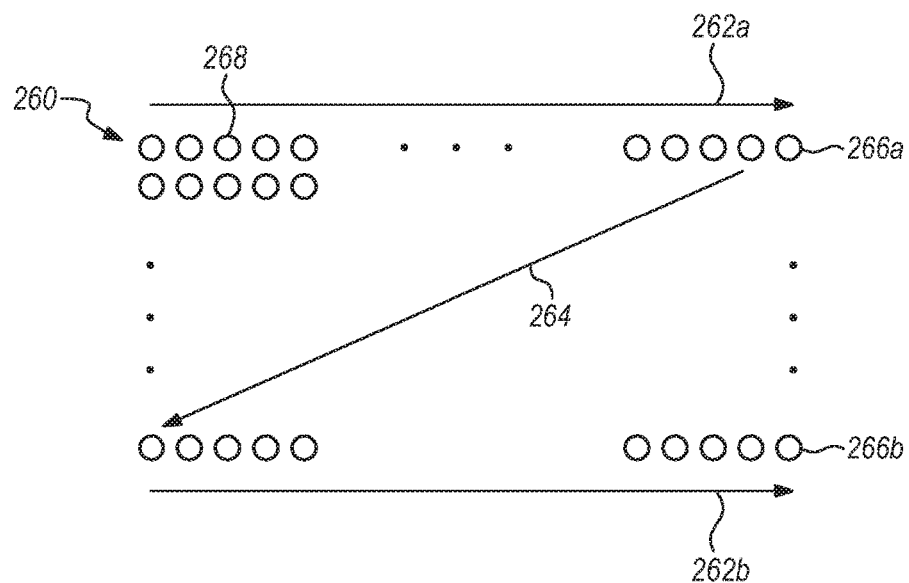
Figure 11:
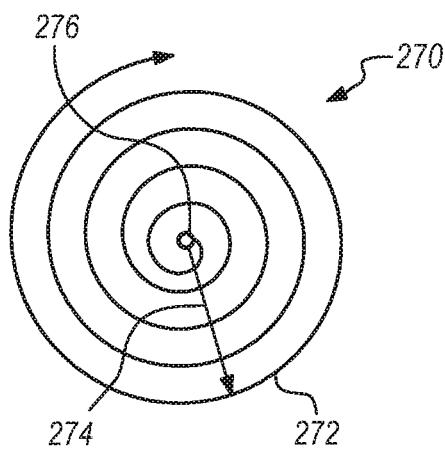
Figure 12:
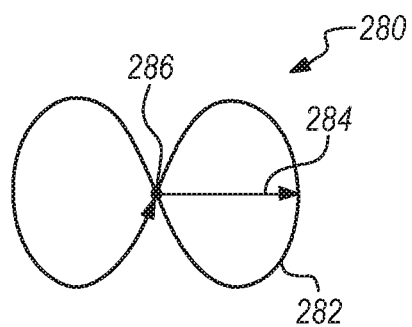
Figure 13:
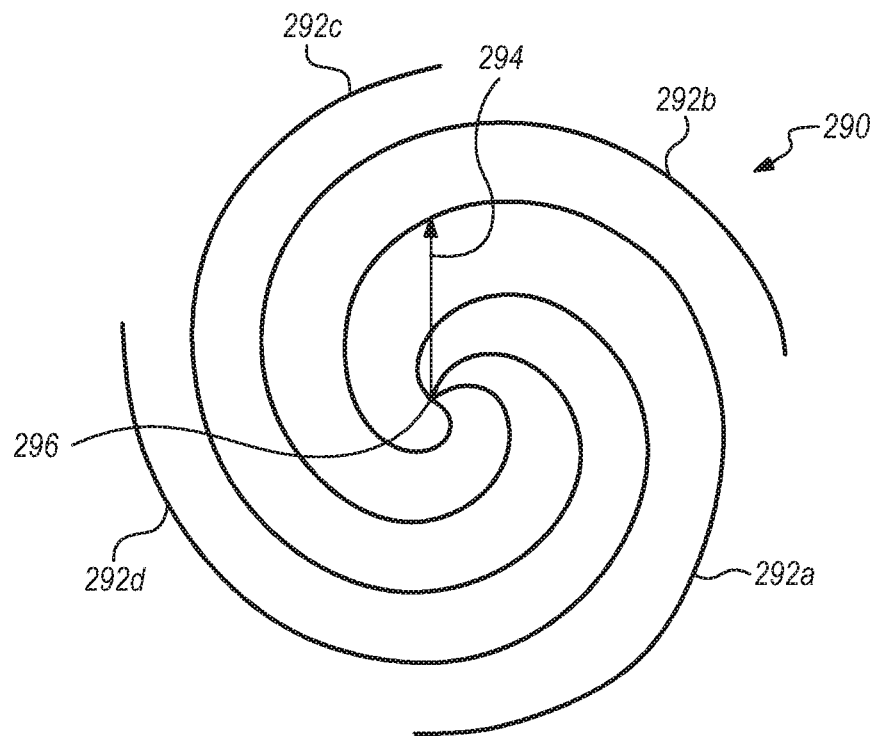
Figure 14A:
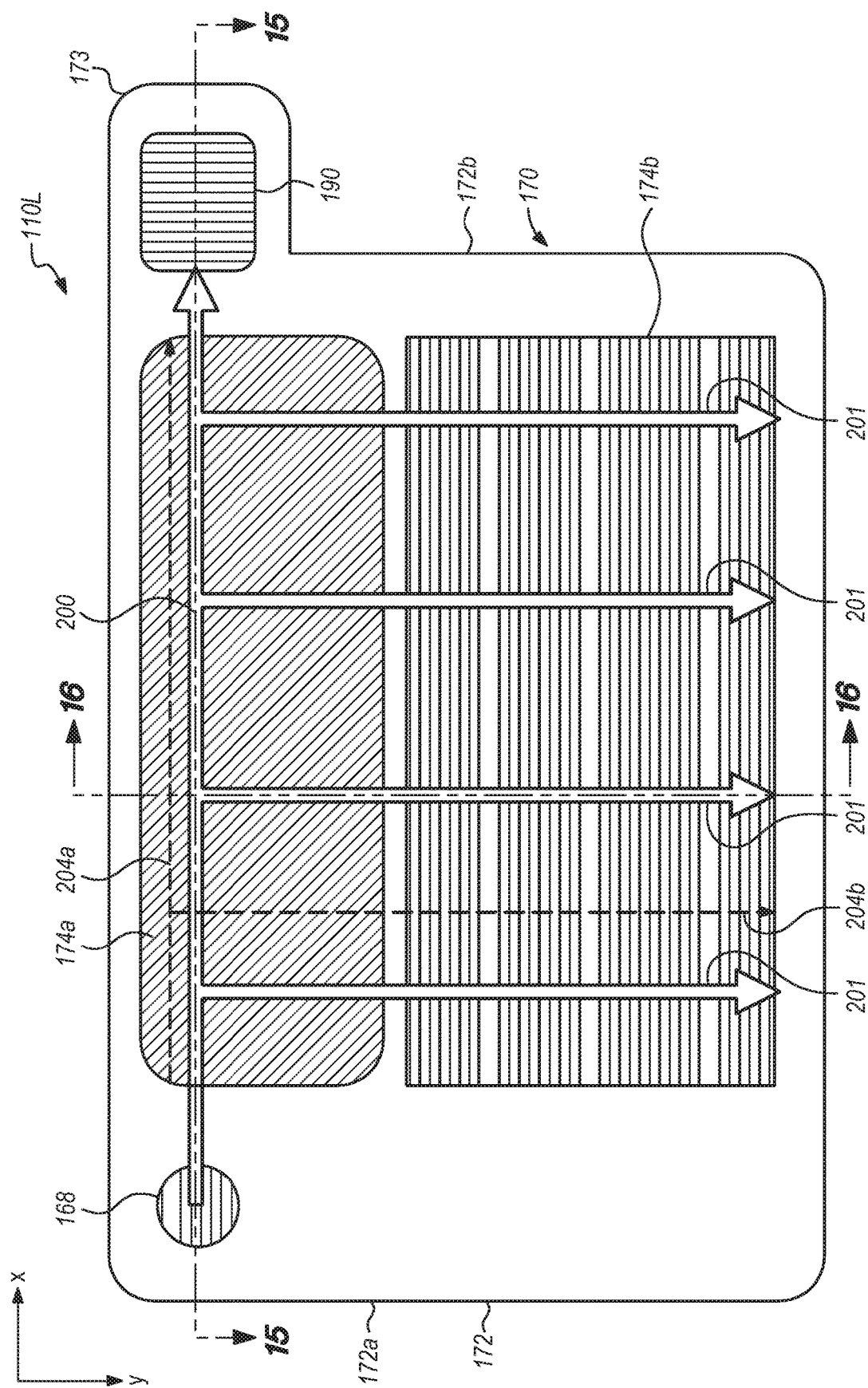
Figure 14B:
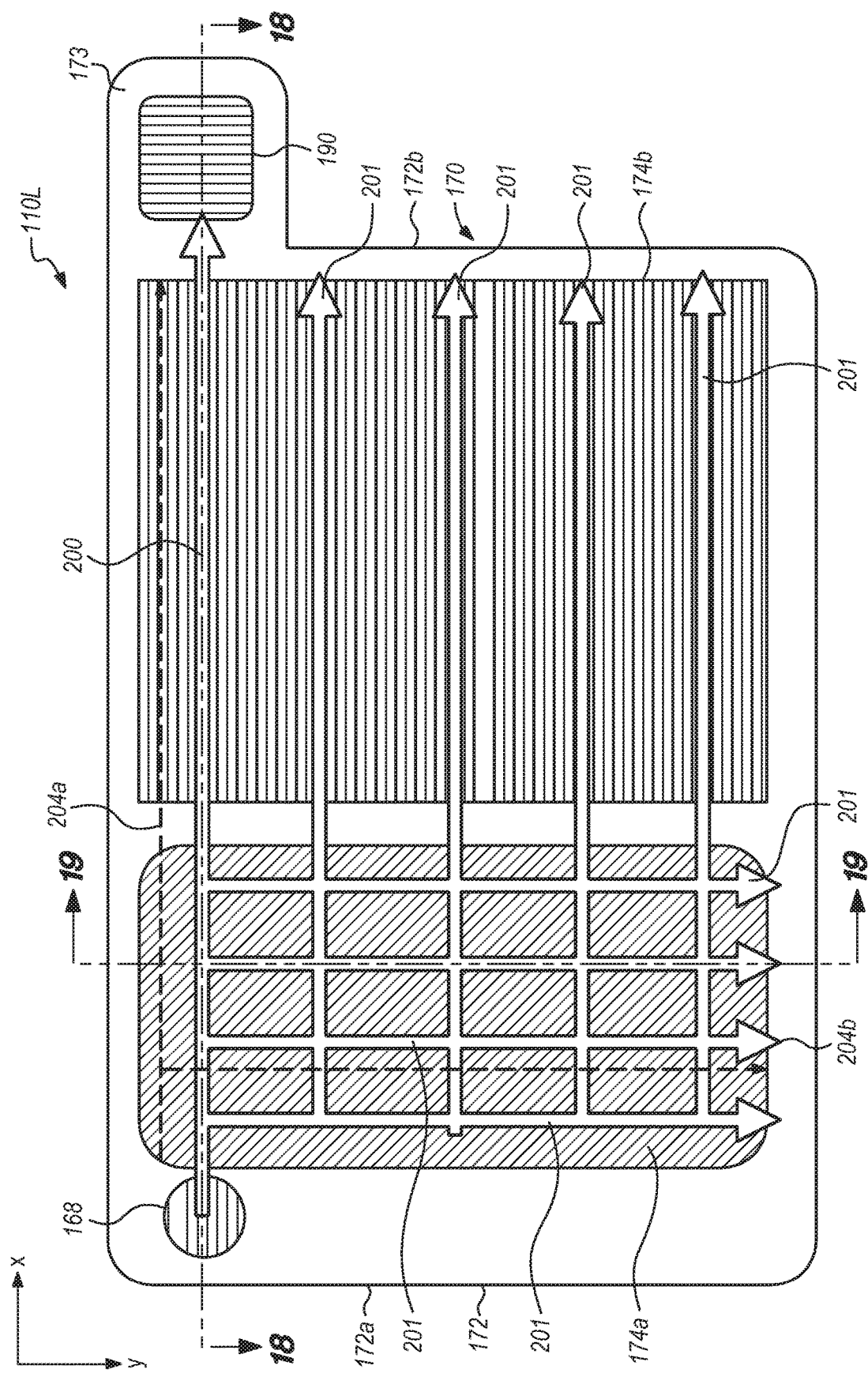
Figure 14C:
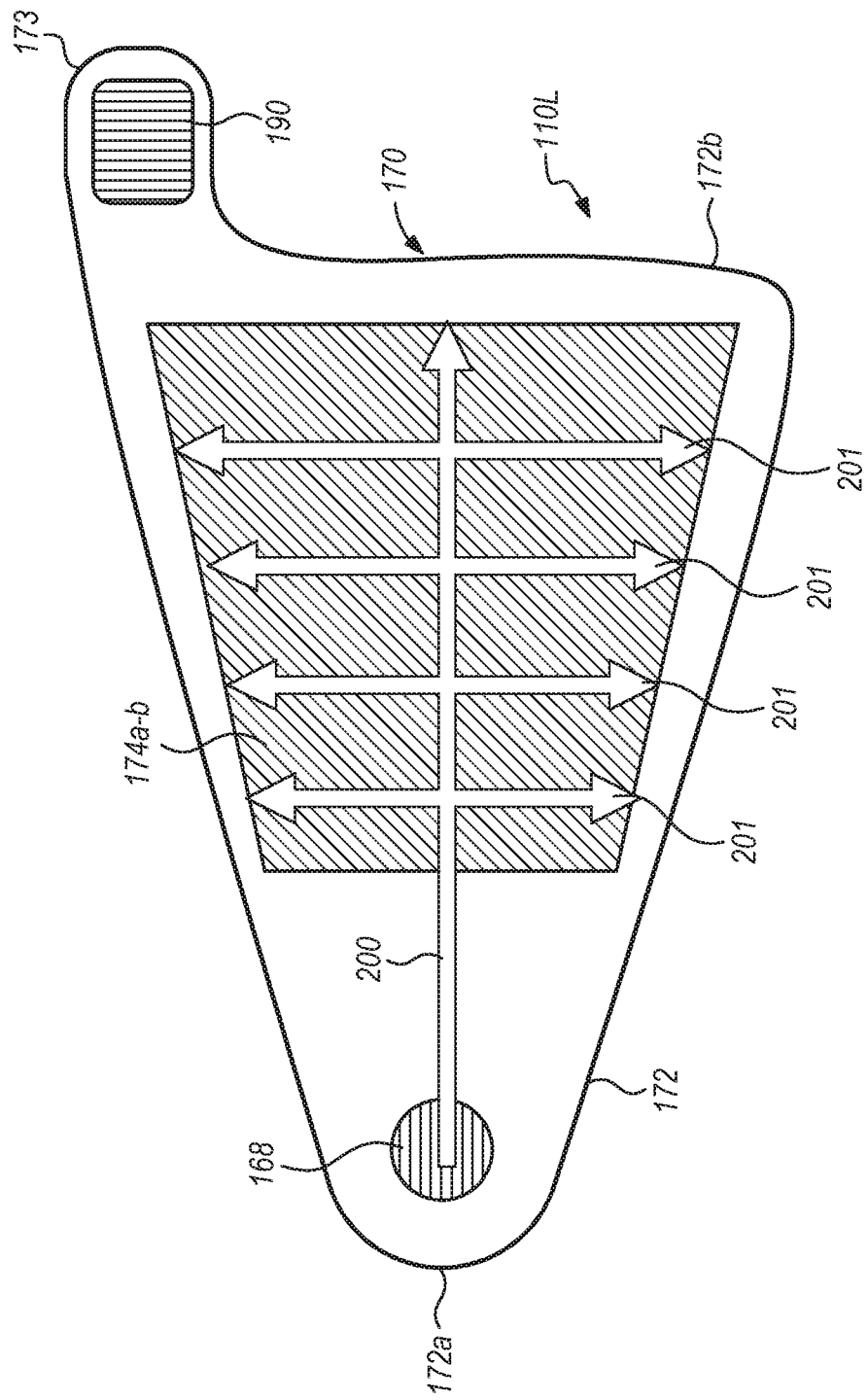
Figure 14D:
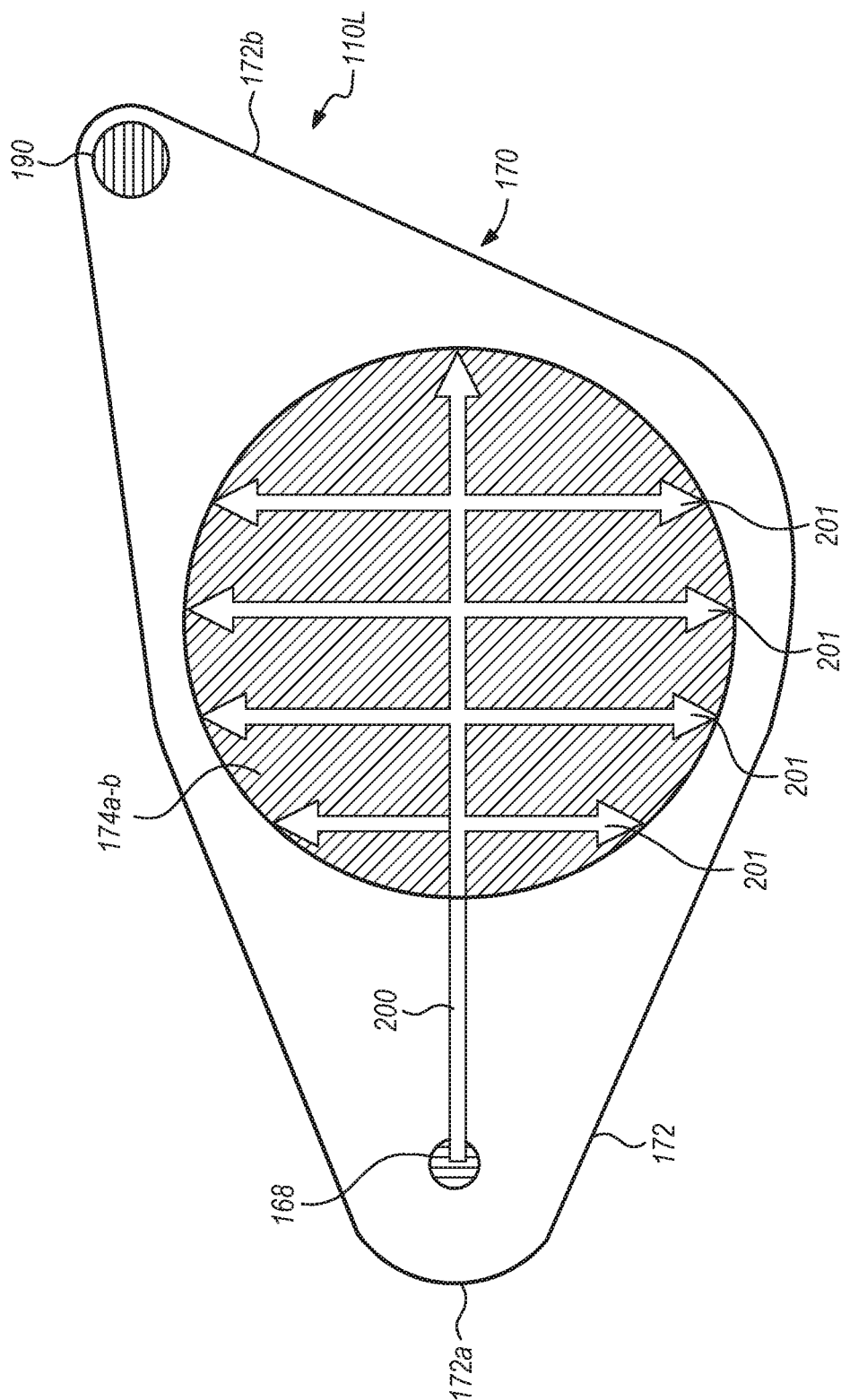
Figure 14E:
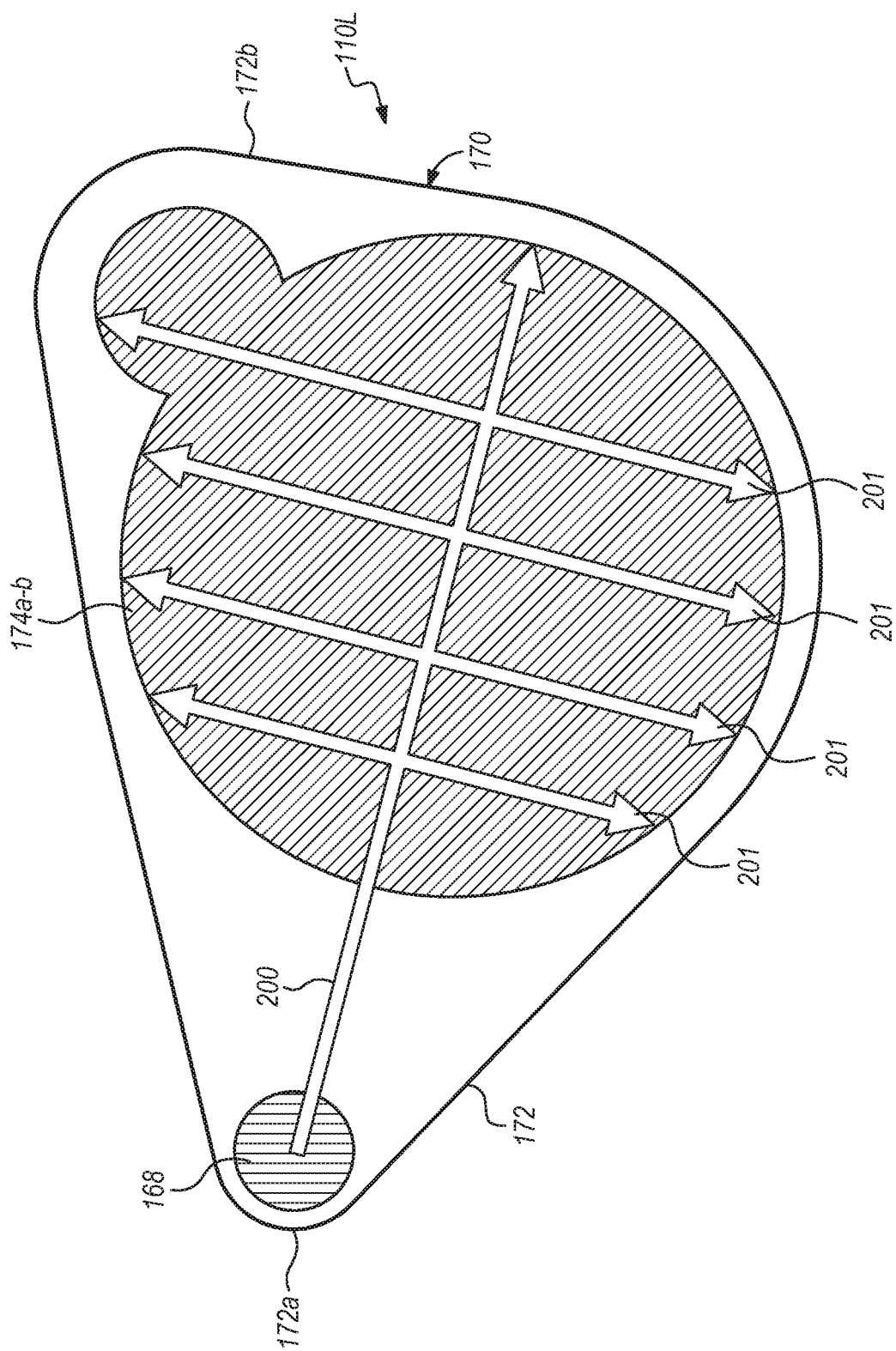
Figure 15:
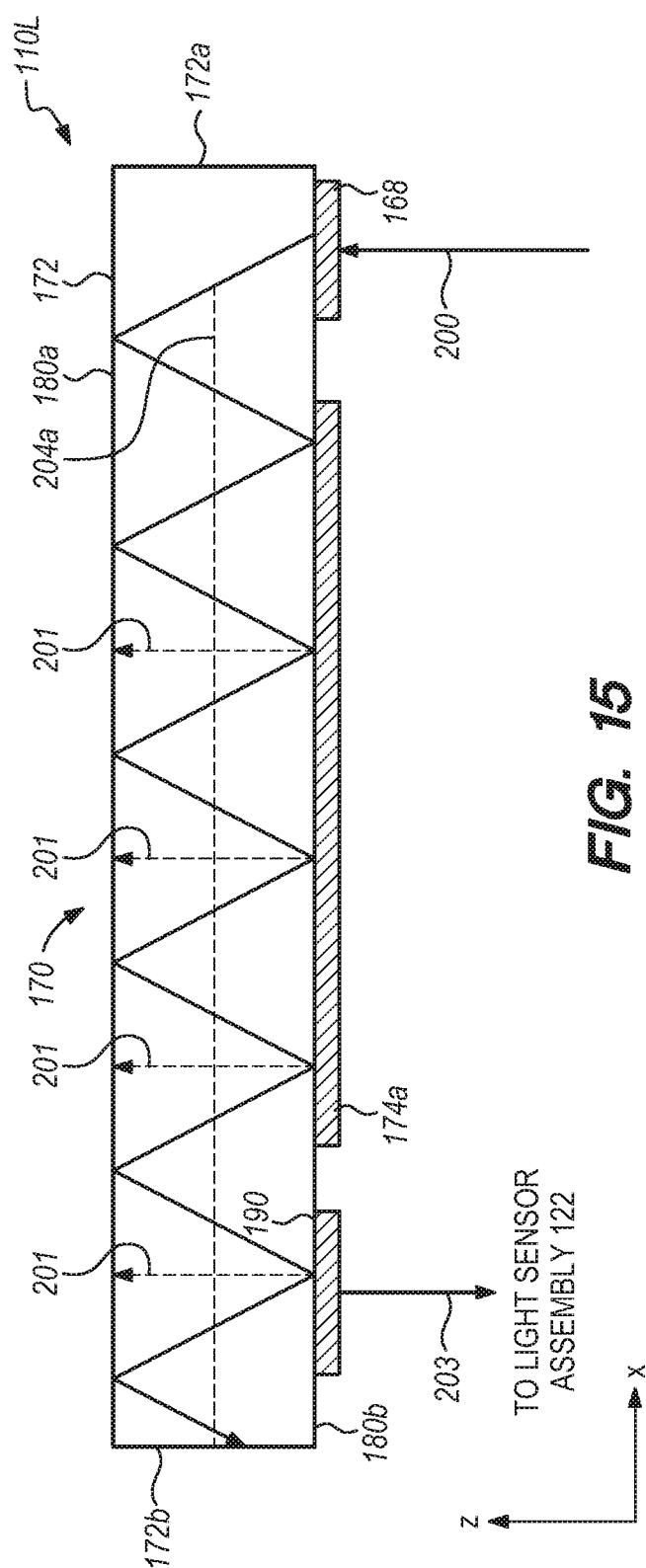
Figure 16:
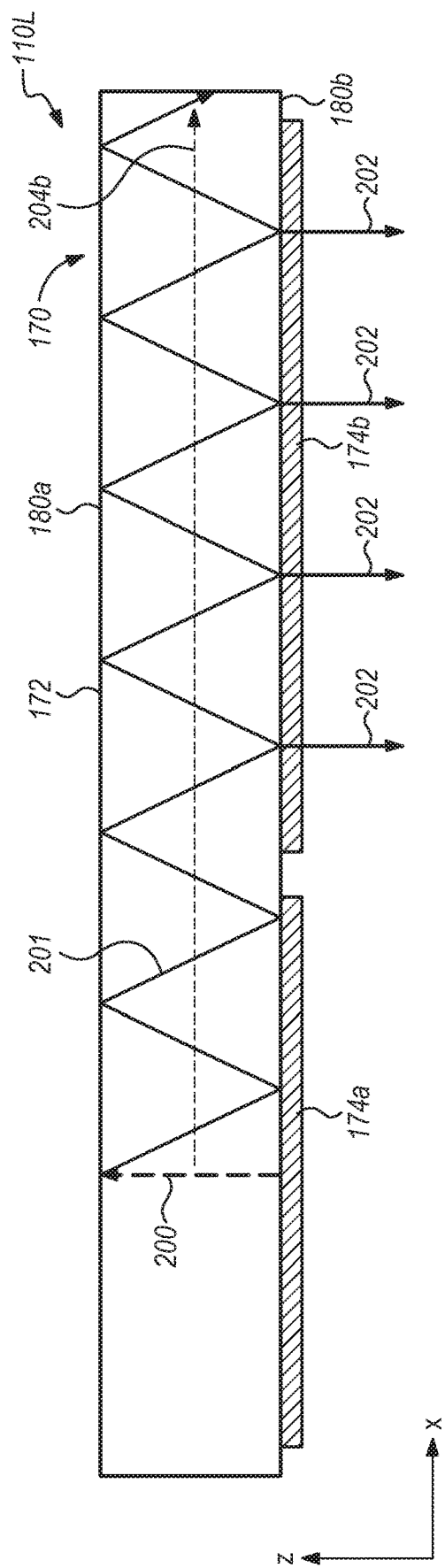
Figure 17A:
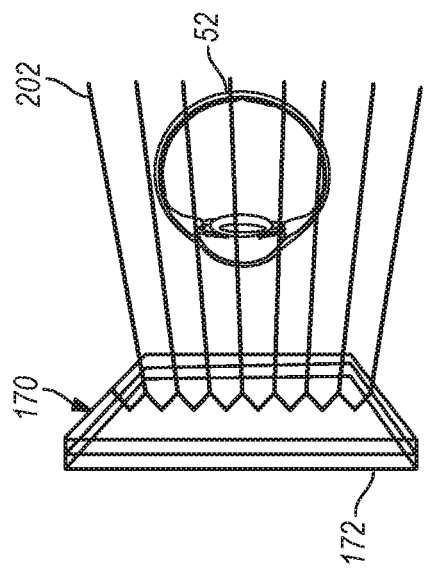
Figure 17B:
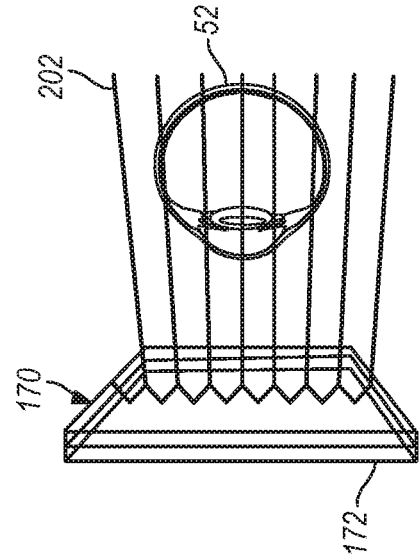
Figure 17C:
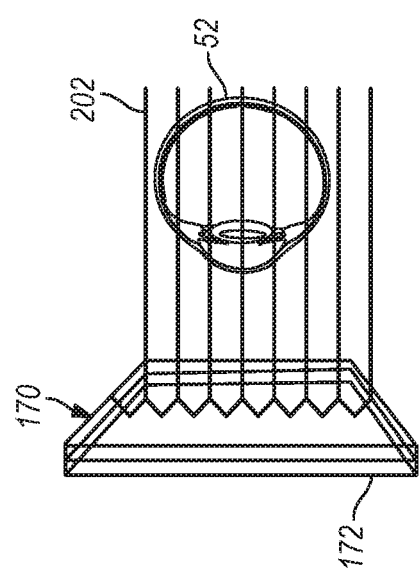
Figure 18:
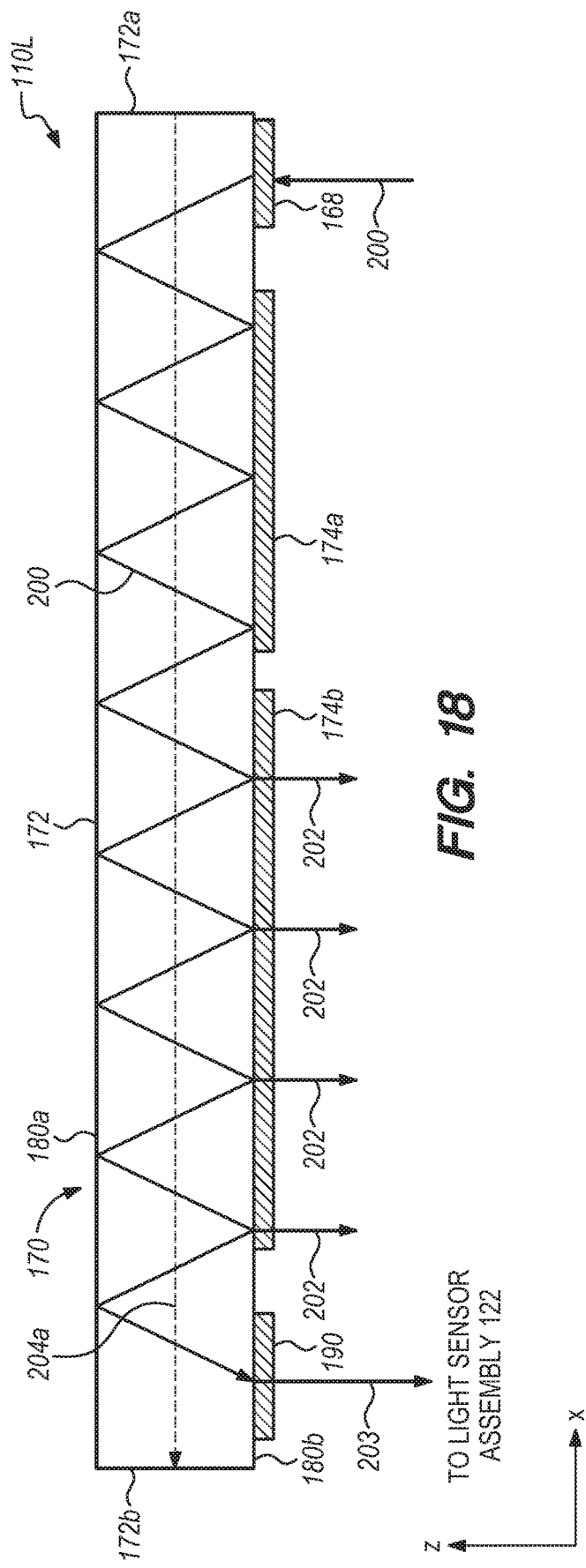
Figure 19:
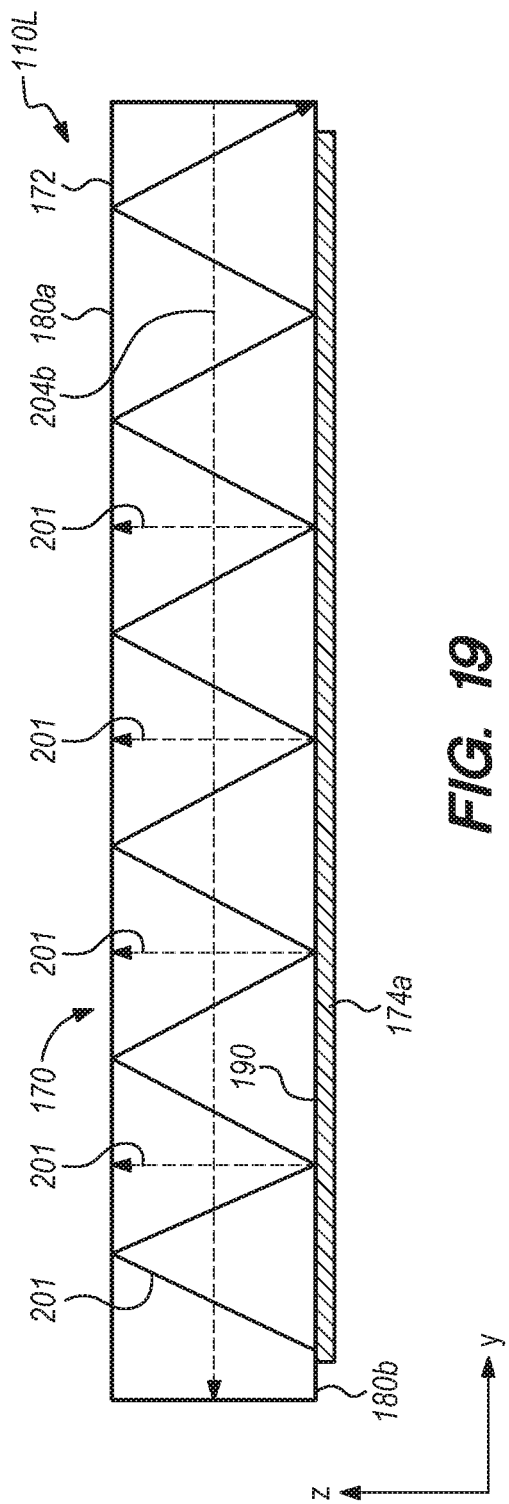
Figure 20:
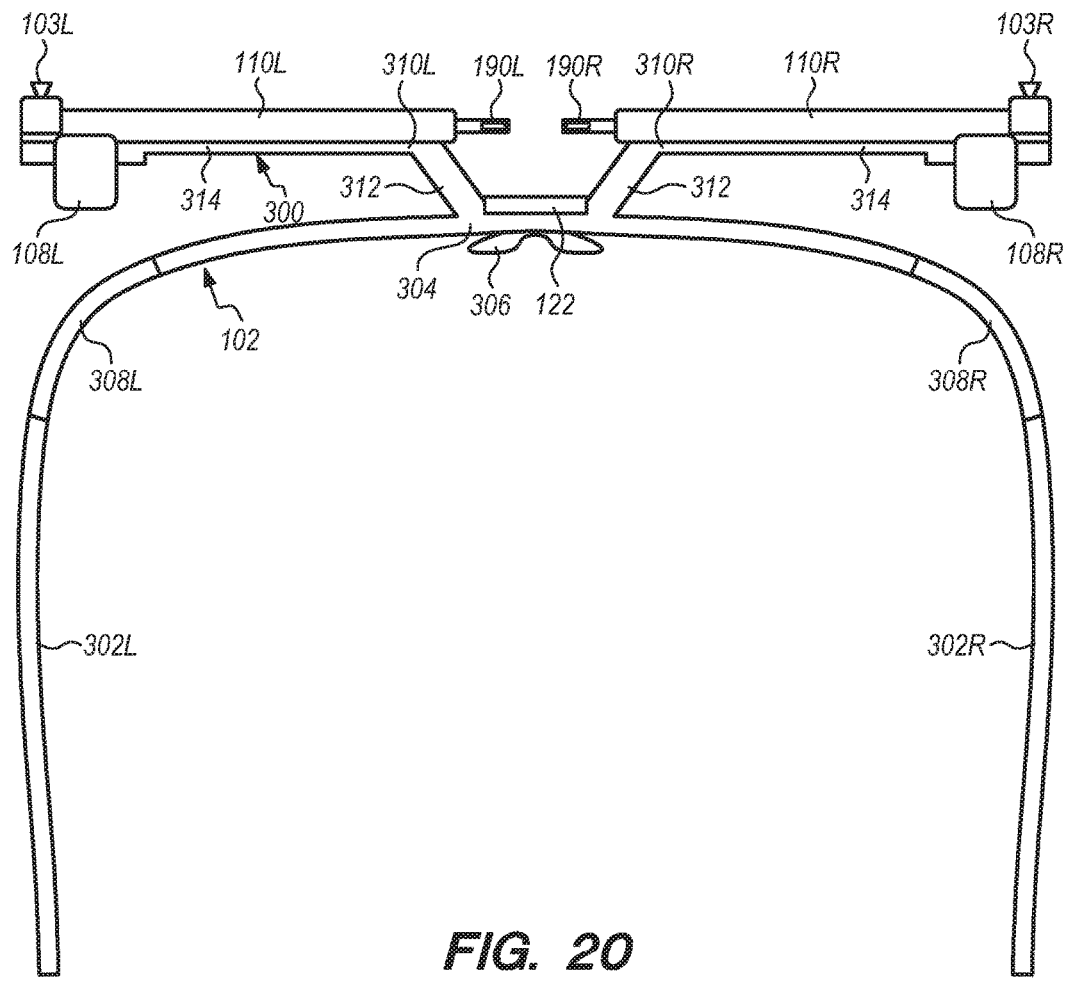
Figure 21:
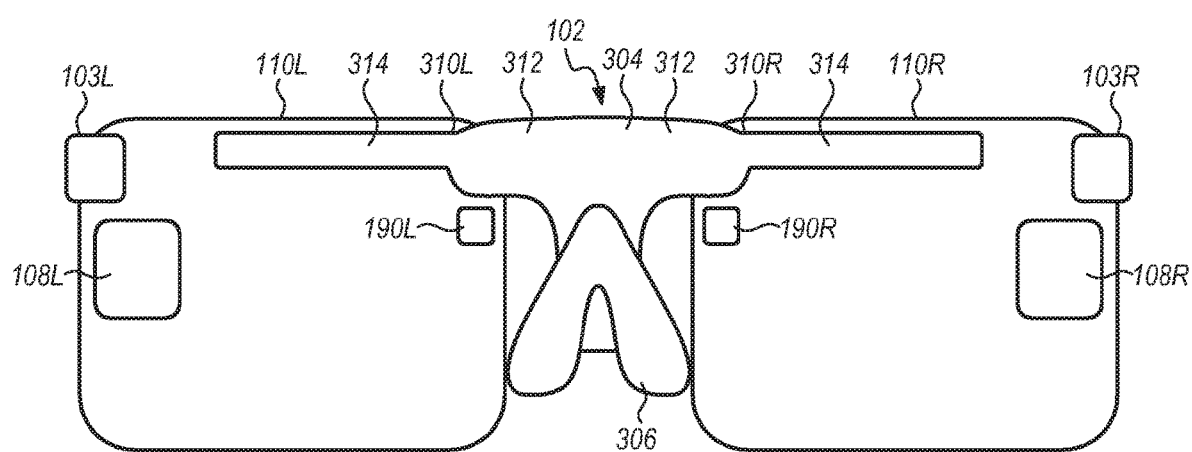
Figure 22A:
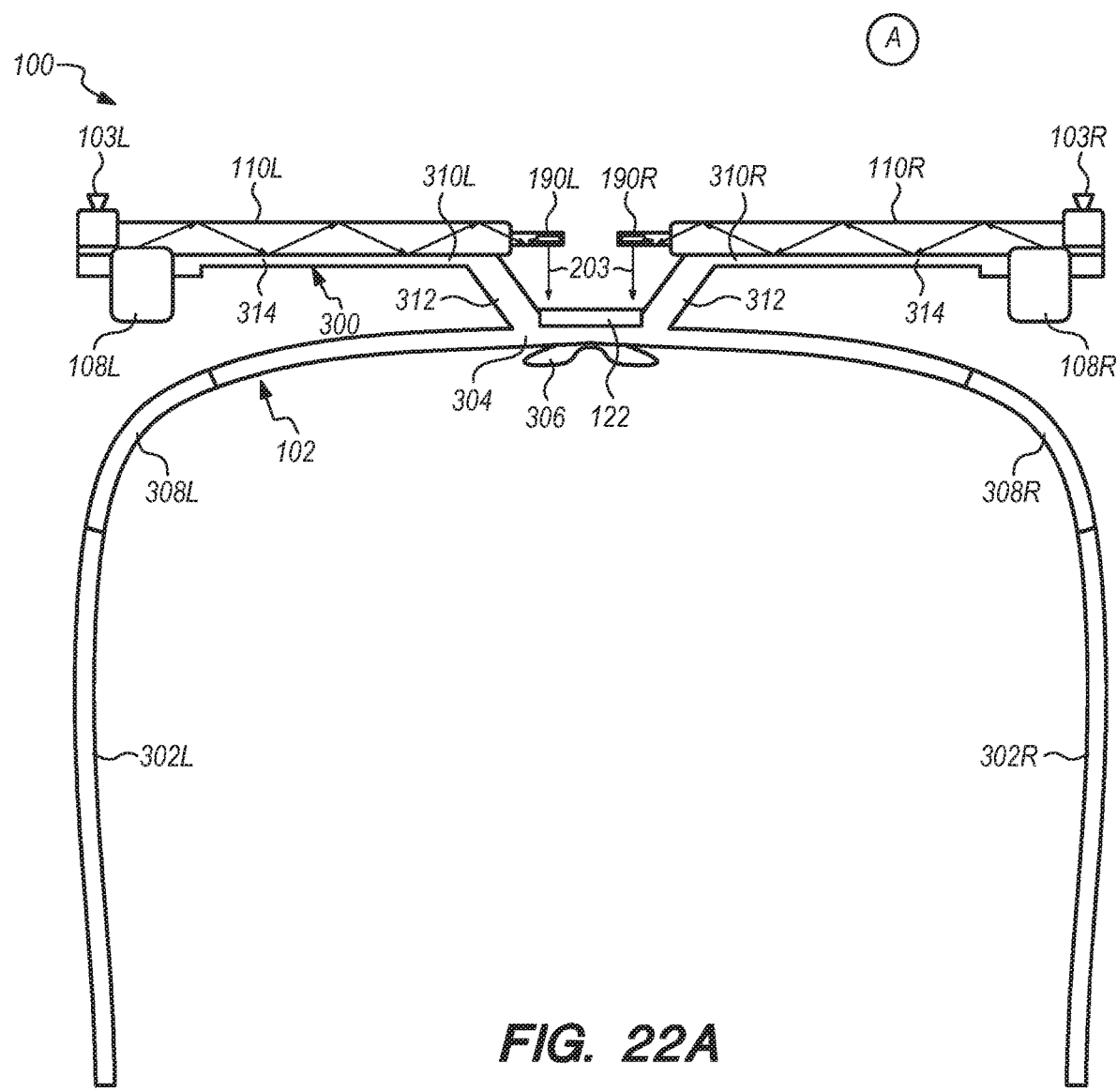
Figure 22B:
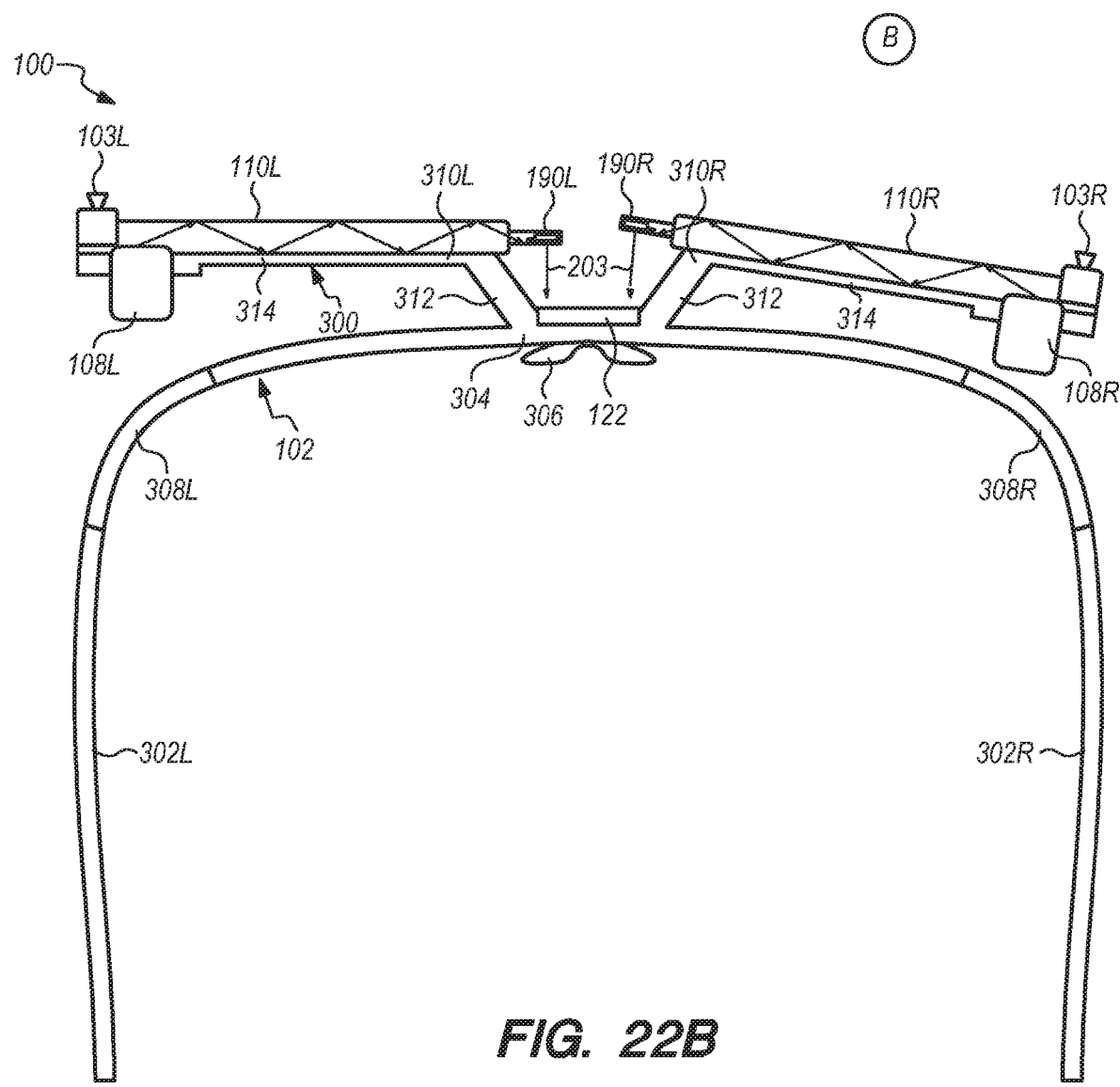
Figure 23A:
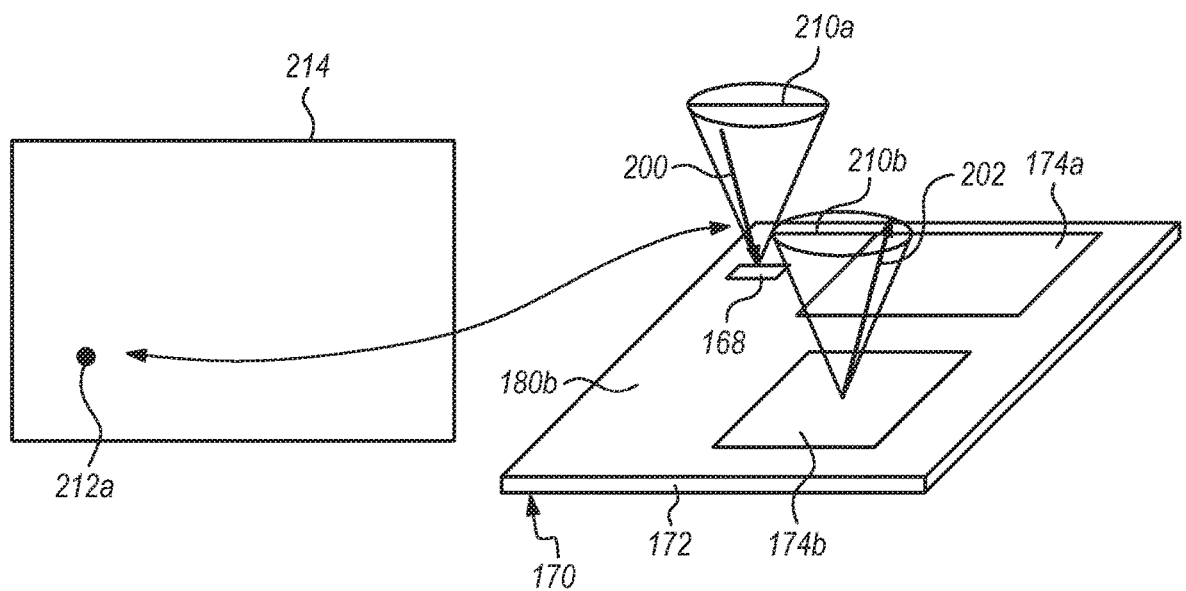
Figure 23B:
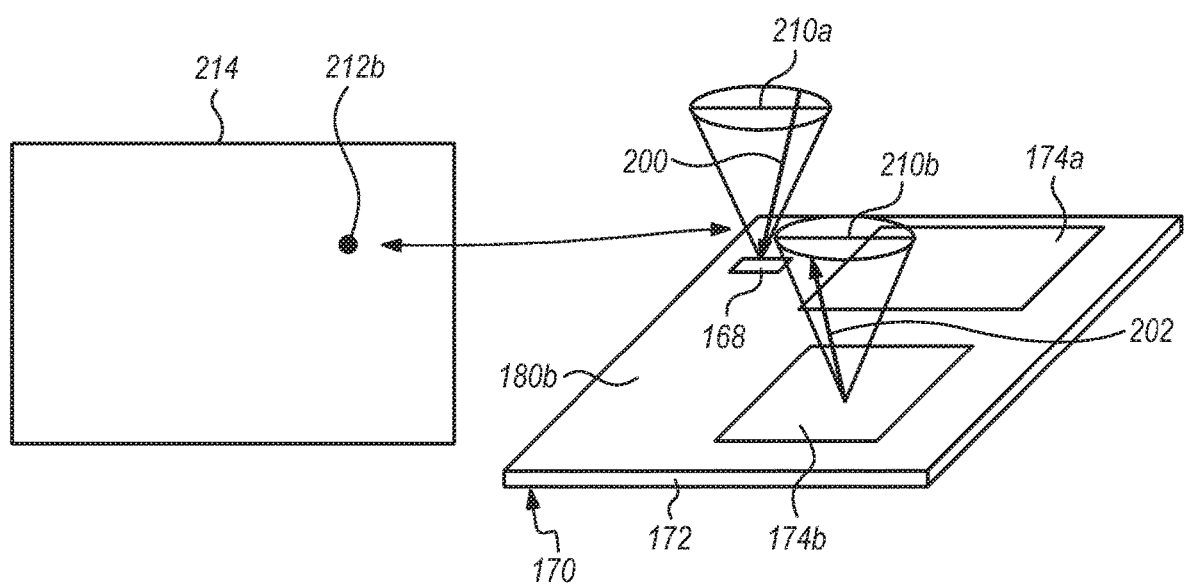
Figure 24:
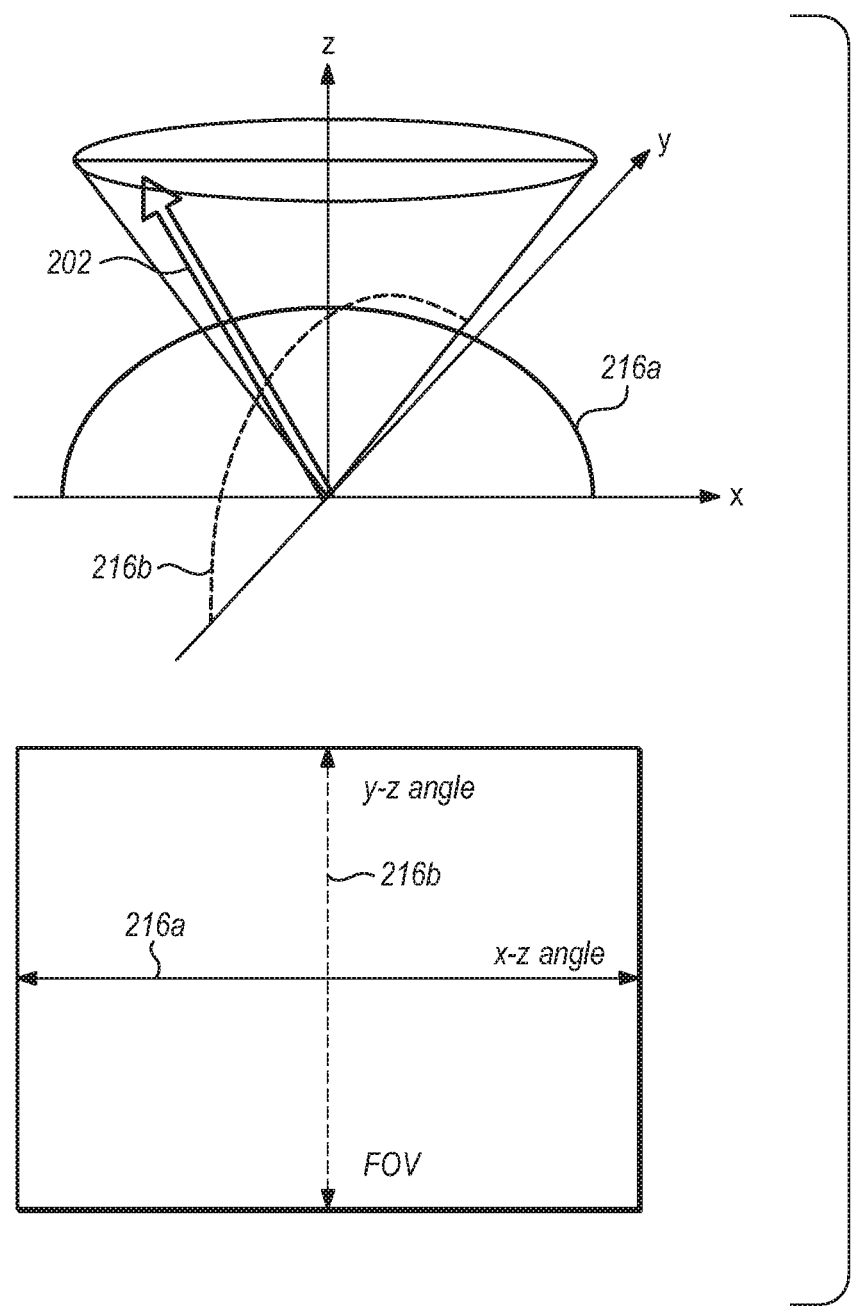
Figure 25:
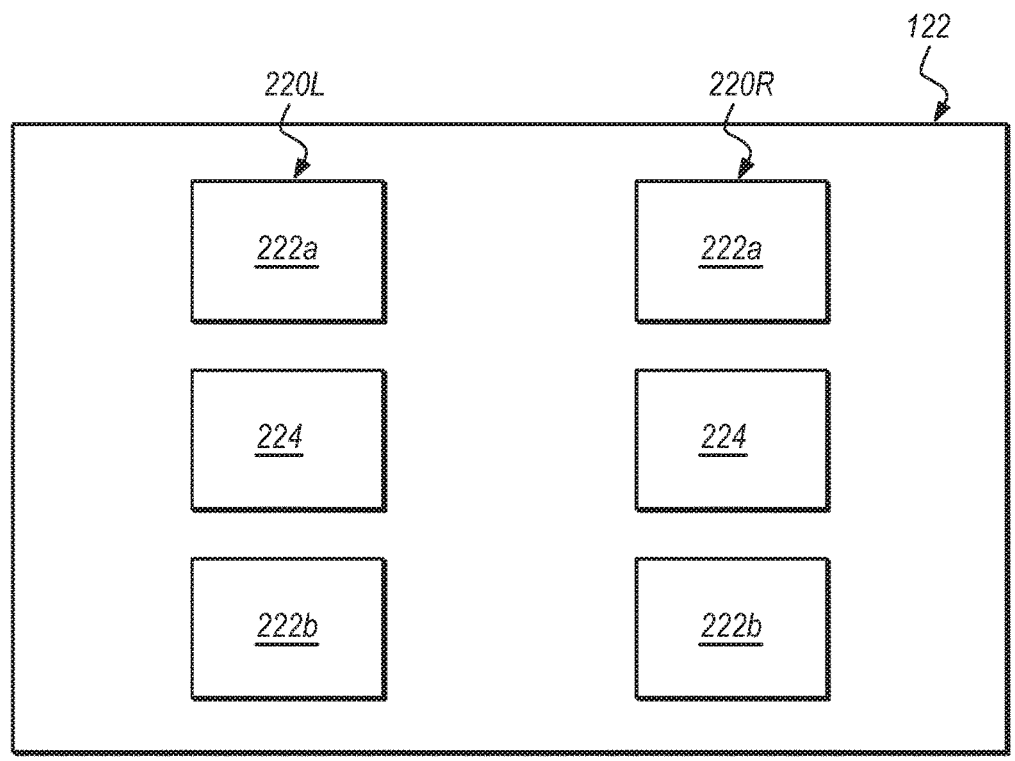
Figure 26A:
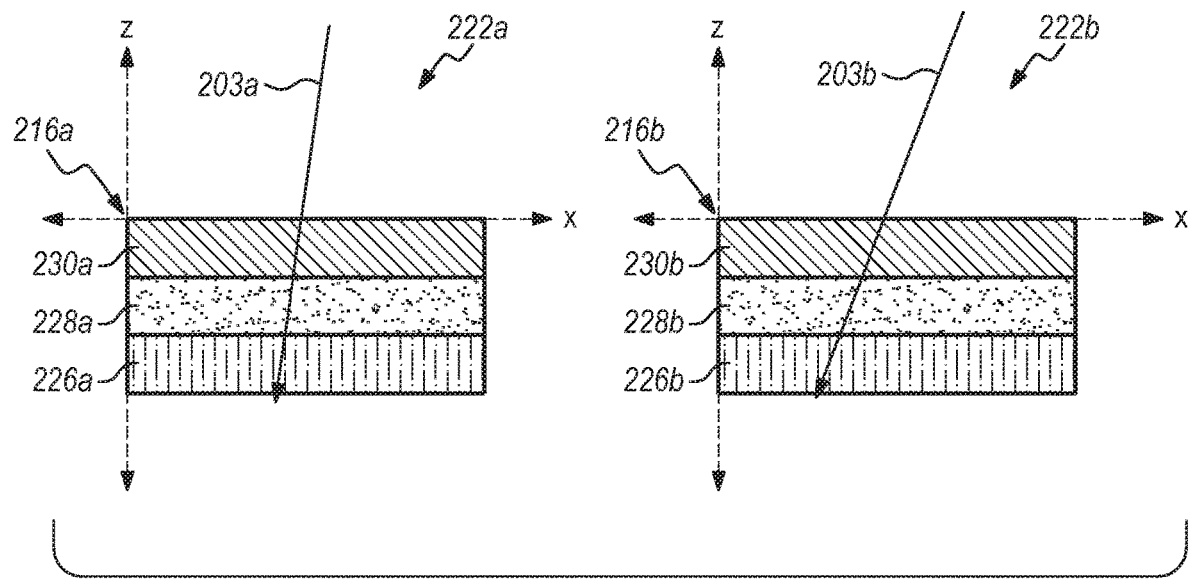
Figure 26B:
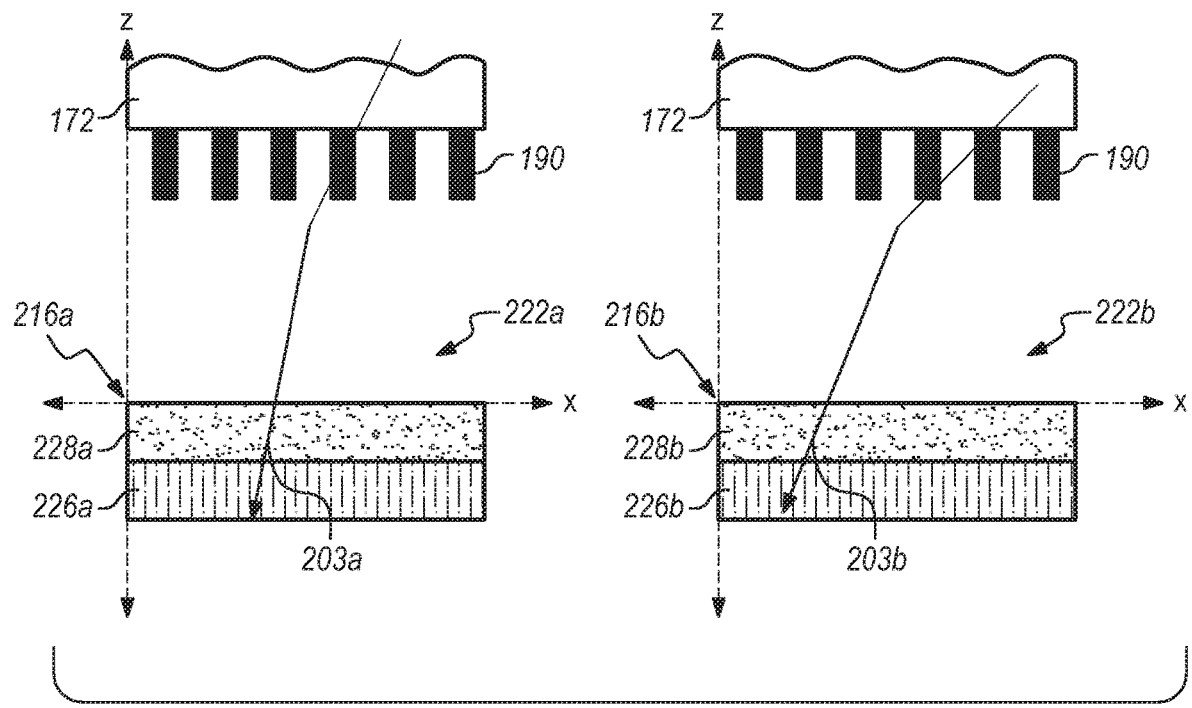
Figure 26C:
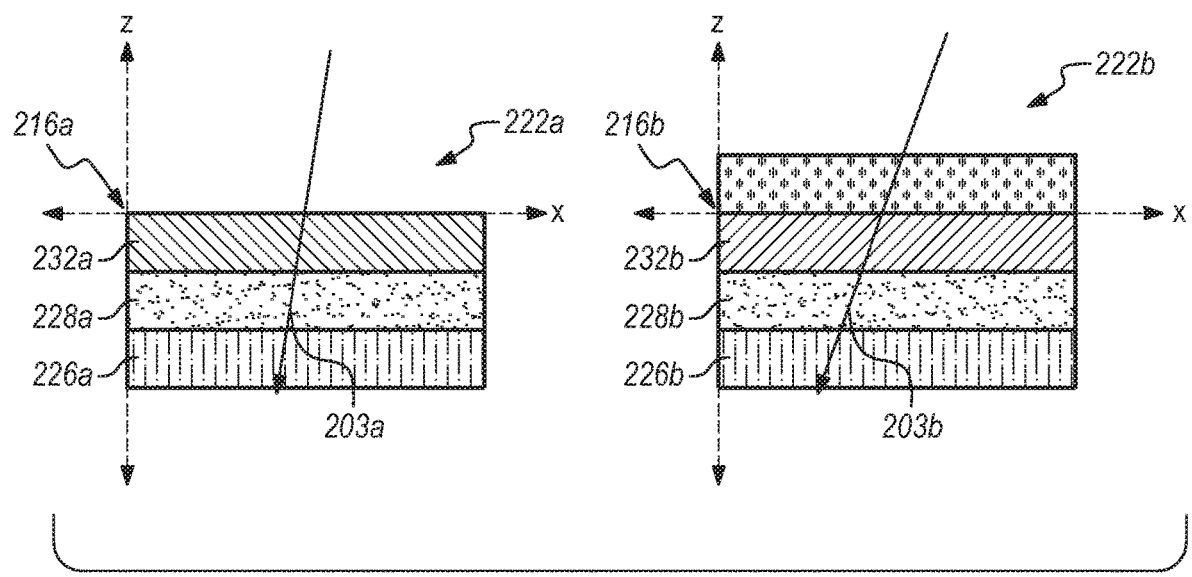
Figure 27A:
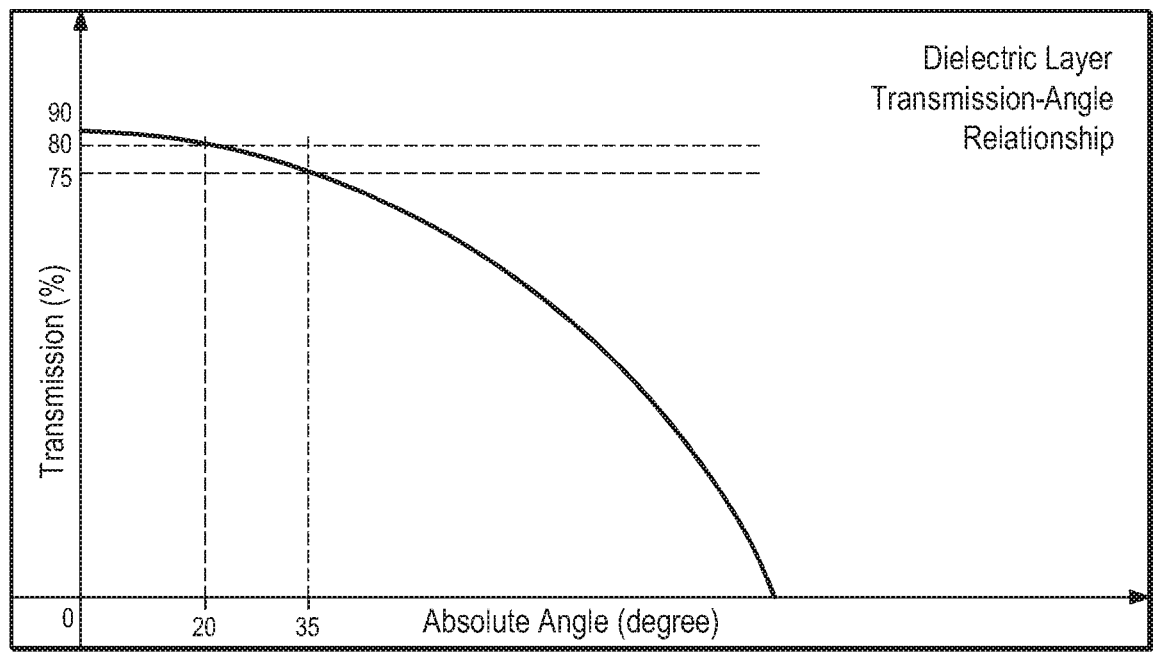
Figure 27B:
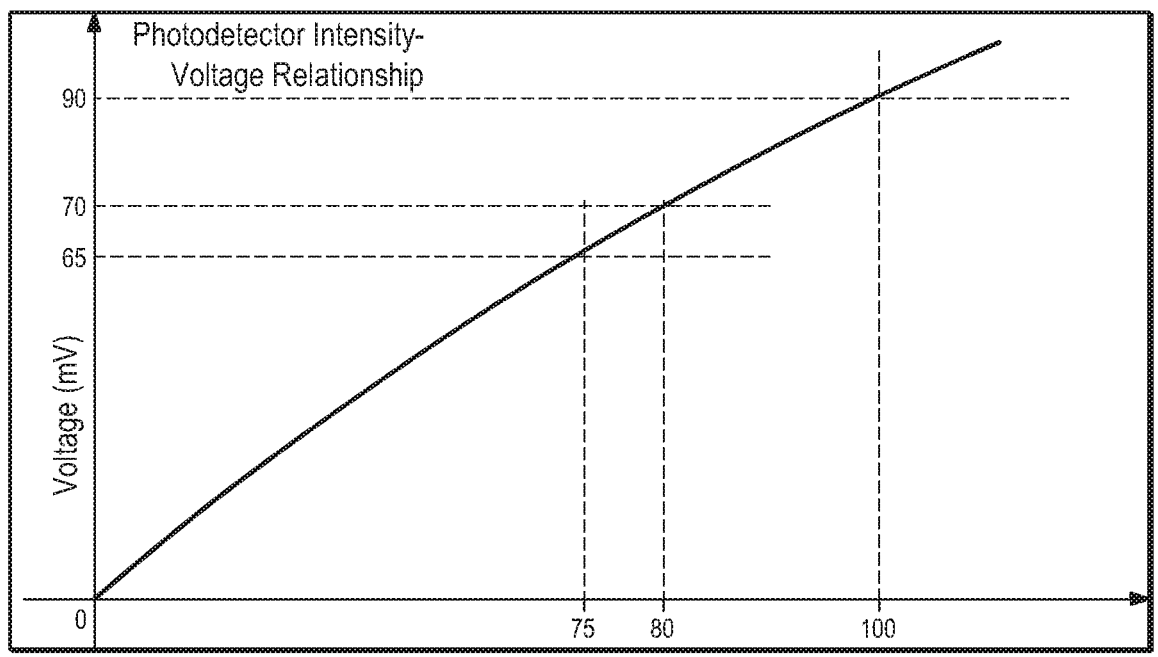
Figure 28A:
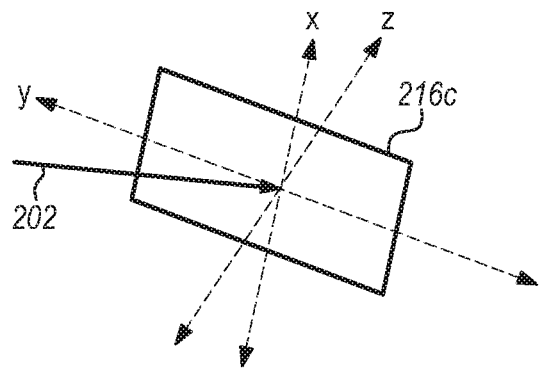
Figure 28B:
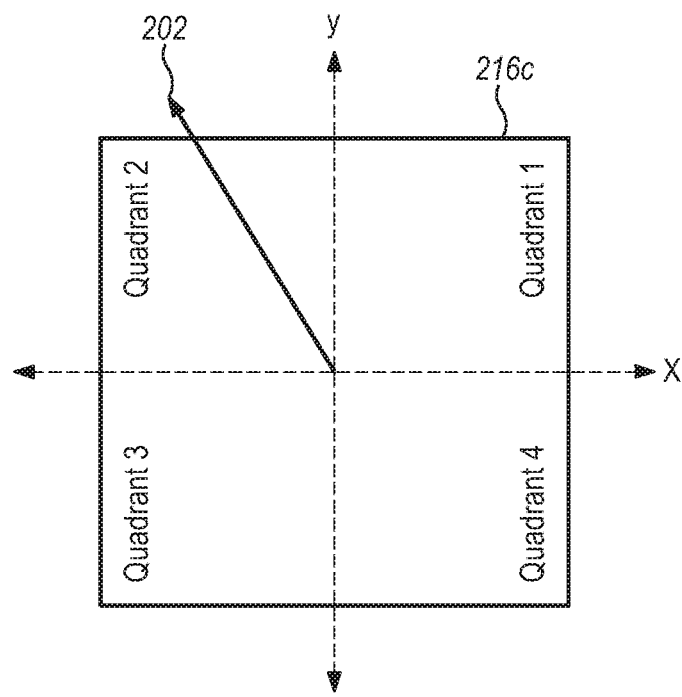
Figure 29A:
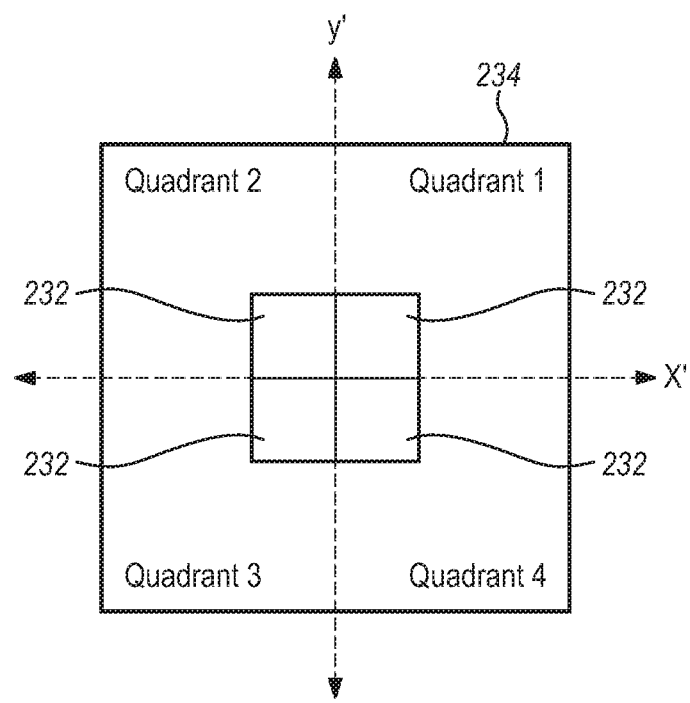
Figure 29B:
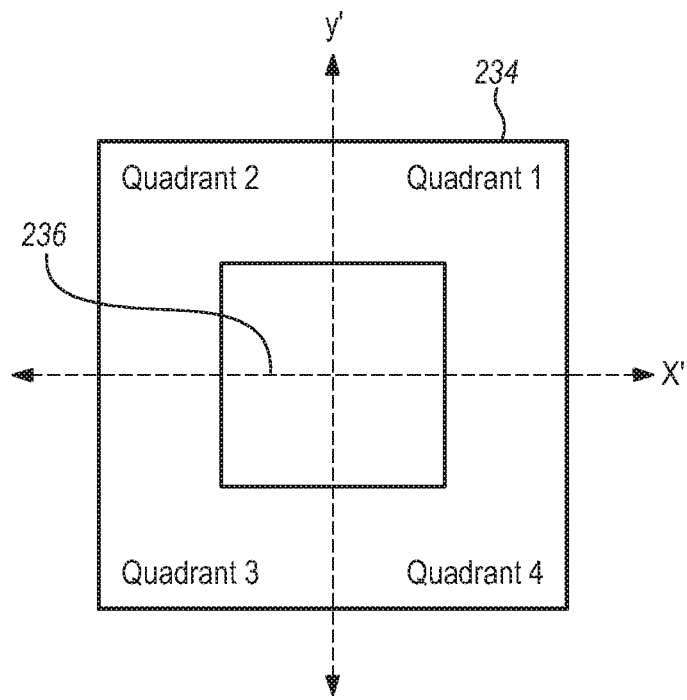
Figure 30:
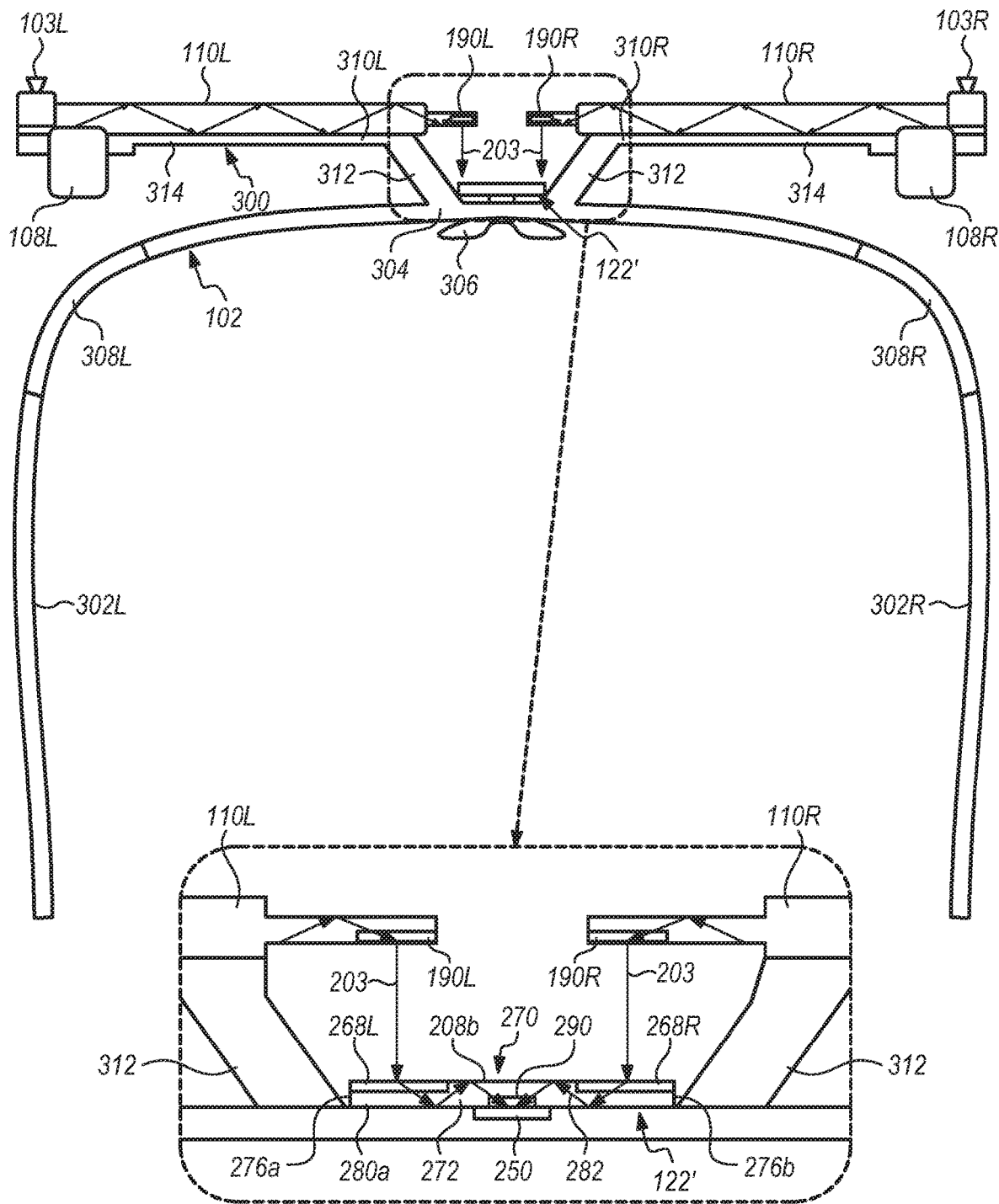
Figure 31A:
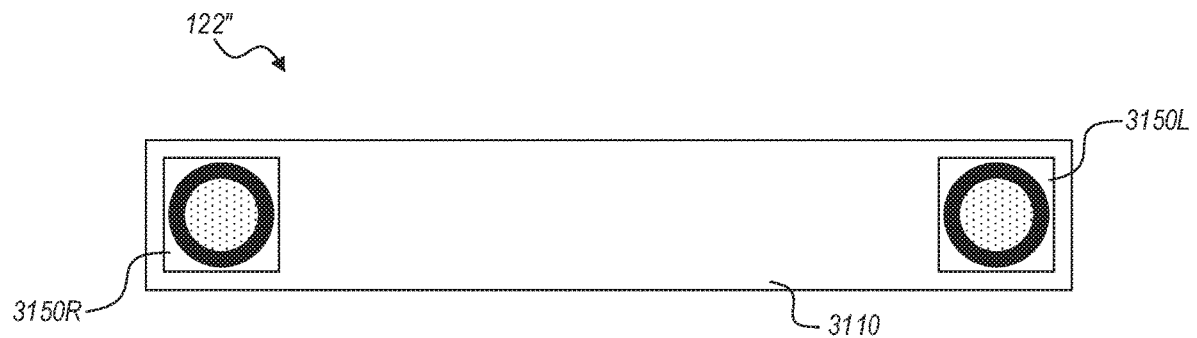
Figure 31B:
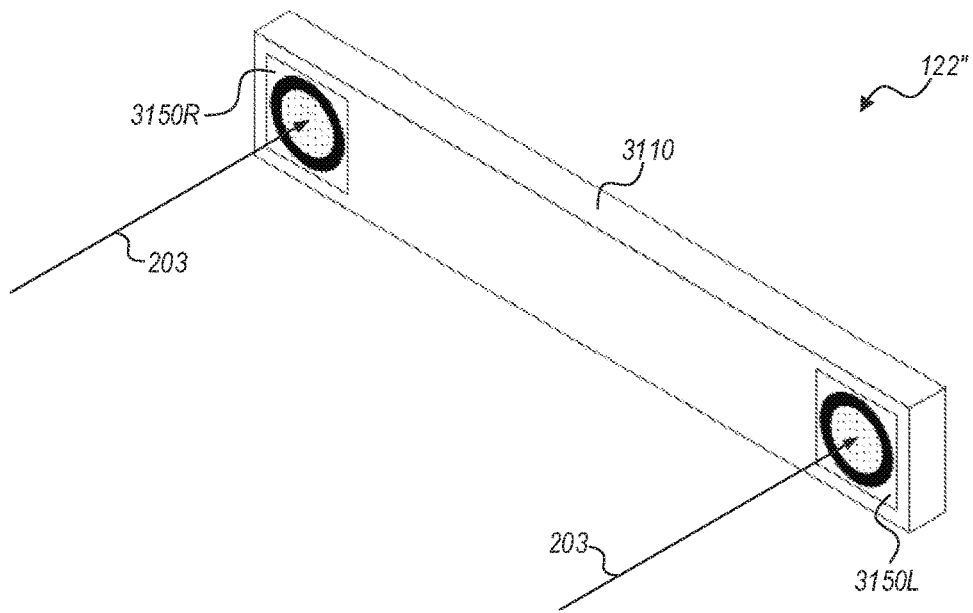
Figure 32A:
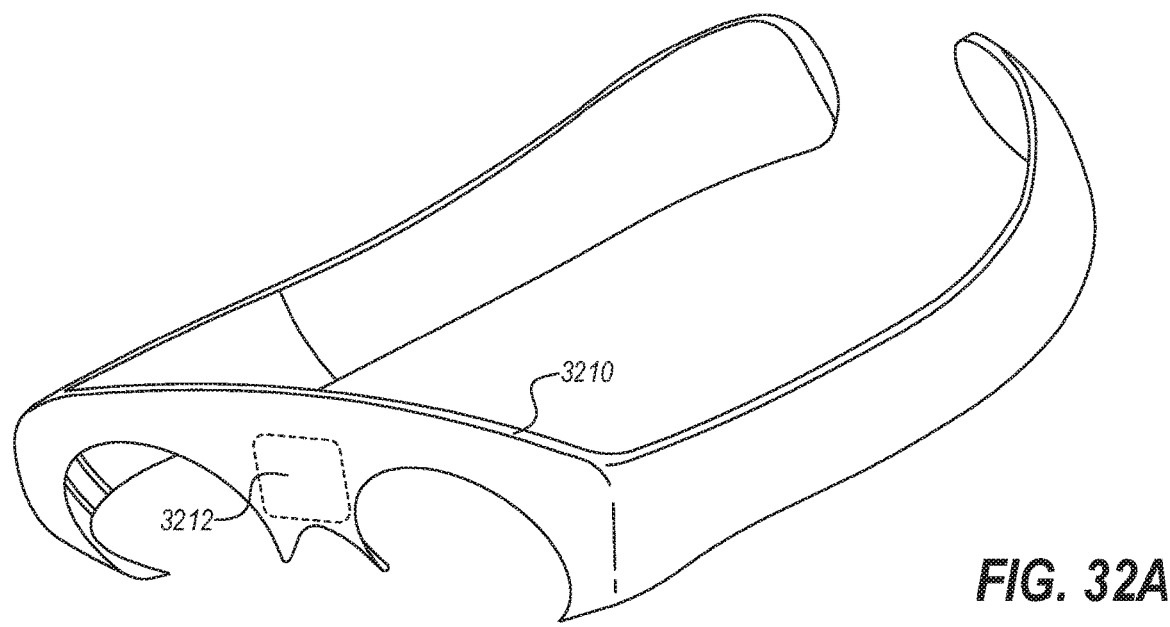
Figure 32B:
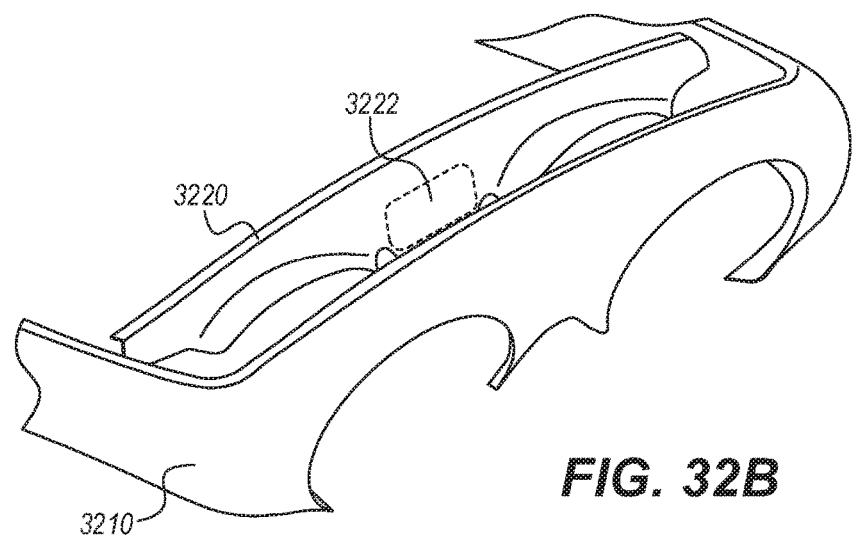

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 1 is a picture of a three-dimensional augmented reality scene that can be displayed to an end user by a prior art augmented reality generation device;

FIG. 2 is a plan view of a prior art display subsystem that can be used in an augmented reality generation device;

FIG. 3 is a plan view of left and right eyepieces that may be used in the prior art display subsystem of FIG. 2;

FIG. 4A is a plan view of the left and right eyepieces of FIG. 3, wherein the left and right eyepieces are aligned;

FIG. 4B is a plan view of the left and right eyepieces of FIG. 3, wherein the left and right eyepieces are rotationally-misaligned about the Pitch-axis;

FIG. 4C is a plan view of the left and right eyepieces of FIG. 3, wherein the left and right eyepieces are rotationally-misaligned about the Roll-axis;

FIG. 4D is a plan view of the left and right eyepieces of FIG. 3, wherein the left and right eyepieces are rotationally-misaligned about the Yaw-axis;

FIG. 5 is a block diagram of a virtual image generation system constructed in accordance with one embodiment of the present inventions;

FIG. 6A is a plan view of one technique that can be used to wear the virtual image generation system of FIG. 5;

FIG. 6B is a plan view of another technique that can be used to wear the virtual image generation system of FIG. 5;

FIG. 6C is a plan view of still another technique that can be used to wear the virtual image generation system of FIG. 5;

FIG. 6D is a plan view of yet another technique that can be used to wear the virtual image generation system of FIG. 5;

FIG. 7 is a plan view of one embodiment of a display subsystem for use in the virtual image generation system of FIG. 5;

FIG. 8 is one embodiment of a planar optical waveguide for use in the display subsystem of FIG. 7;

FIG. 9 is a plan view of an exemplary frame generated by the virtual image generation system of FIG. 5;

FIG. 10 is a plan view of one scanning pattern that can be used to generate the exemplary frame of FIG. 9;

FIG. 11 is a plan view of another scanning pattern that can be used to generate another exemplary frame;

FIG. 12 is a plan view of still another scanning pattern that can be used to generate still another exemplary frame;

FIG. 13 is a plan view of yet another scanning pattern that can be used to generate yet another exemplary frame;

FIG. 14A is a plan view of one embodiment of a left eyepiece for use in the display subsystem of FIG. 7;

FIG. 14B is a plan view of another embodiment of a left eyepiece for use in the display subsystem of FIG. 7;

FIG. 14C is a plan view of still another embodiment of a left eyepiece for use in the display subsystem of FIG. 7;

FIG. 14D is a plan view of still another embodiment of a left eyepiece for use in the display subsystem of FIG. 7;

FIG. 14E is a plan view of still another embodiment of a left eyepiece for use in the display subsystem of FIG. 7;

FIG. 15 is a cross-sectional view of the left eyepiece of FIG. 14A, taken along the line 15-15;

FIG. 16 is a cross-sectional view of the left eyepiece of FIG. 14A, taken along the line 16-16;

FIG. 17A is a perspective view of the waveguide apparatus of FIG. 14A, particularly showing the exiting light rays focused at an infinite viewing distance;

FIG. 17B is a perspective view of the waveguide apparatus of FIG. 14A, particularly showing the exiting light rays focused at a first non-infinite viewing distance;

FIG. 17C is a perspective view of the waveguide apparatus of FIG. 14A, particularly showing the exiting light rays focused at a second non-infinite viewing distance;

FIG. 18 is a cross-sectional view of the left eyepiece of FIG. 14B, taken along the line 18-18;

FIG. 19 is a cross-sectional view of the left eyepiece of FIG. 14B, taken along the line 19-19;

FIG. 20 is a top view of a frame structure in association with a display subsystem and light sensor assembly, for use in the virtual image generation system of FIG. 5;

FIG. 21 is a front view of the frame structure of FIG. 20;

FIG. 22A is a top view of the frame structure of FIG. 20, wherein the left and right eyepieces are relatively aligned;

FIG. 22B is a top view of the frame structure of FIG. 20, wherein the left and right eyepieces are relatively misaligned;

FIG. 23A is a perspective view of a display screen showing correspondence between one beam-angle of a collimated light beam and a pixel in the field of view (FOV) of the end user;

FIG. 23B is a perspective view of a display screen showing correspondence between another beam-angle of a collimated light beam and a pixel in the field of view (FOV) of the end user;

FIG. 24 is a perspective view of the projection of the angle of a light ray exiting the display screen of FIG. 23A, projected onto an x-z plane and a y-z plane;

FIG. 25 is a plan view of a light sensor assembly for use in the frame structure of FIG. 14A;

FIG. 26A is a plan view of one embodiment of orthogonal sensors of the sensing assembly of FIG. 25;

FIG. 26B is a plan view of another embodiment of orthogonal sensors of the sensing assembly of FIG. 25;

FIG. 26C is a plan view of still another embodiment of orthogonal sensors of the sensing assembly of FIG. 25;

FIG. 27A is a diagram of an exemplary dielectric layer transmission-angle relationship;

FIG. 27B is a diagram of a photodetector intensity-voltage relationship;

FIG. 28A is a perspective view of a diagram illustrating a light ray exiting the left eyepiece relative to an x-y plane;

FIG. 28B is a plan view of a diagram illustrating the light ray of FIG. 23a projected onto the x-y plane;

FIG. 29A is a plan view of one embodiment of four quadrant sensors of the sensing assembly of FIG. 25;

FIG. 29B is a plan view of one embodiment of a position sensing detector (PSD) of the sensing assembly of FIG. 25;

FIG. 30 is a top view of a frame structure in association with a display subsystem and another light sensor assembly, for use in the virtual image generation system of FIG. 5;

FIG. 31A is a front view of yet another light sensor assembly, for use in the virtual image generation system of FIG. 5;

FIG. 31B is a perspective view of the light sensor assembly of FIG. 31A;

FIG. 32A is a perspective view of a front housing structure in association with a display subsystem, for use in the image generation system of FIG. 5; and FIG. 32B is another perspective view of the front housing structure of FIG. 32A along with a corresponding rear housing structure.

DETAILED DESCRIPTION

The description that follows relates to display subsystems and methods to be used in virtual reality and/or augmented reality systems. However, it is to be understood that the while the invention lends itself well to applications in virtual or augmented reality systems, the invention, in its broadest aspects, may not be so limited.

Referring to FIG. 5, one embodiment of a virtual image generation system 100 constructed in accordance with present inventions will now be described. The virtual image generation system 100 may be operated as an augmented reality subsystem, providing images of virtual objects intermixed with physical objects in a field of view of an end user 50. There are two fundamental approaches when operating the virtual image generation system 100. A first approach employs one or more imagers (e.g., cameras) to capture images of the ambient environment. The virtual image generation system 100 inter-mixes the virtual images into the data representing the images of the ambient environment. A second approach employs one or more at least partially transparent surfaces through which the ambient environment can be seen and onto which the virtual image generation system 100 produces images of virtual objects.

The virtual image generation system 100, and the various techniques taught herein, may be employed in applications other than augmented reality and virtual reality subsystems. For example, various techniques may be applied to any projection or display subsystem, or may be applied to pico projectors where movement may be made by an end user's hand rather than the head. Thus, while often described herein in terms of an augmented reality subsystem or virtual reality subsystem, the teachings should not be limited to such subsystems of such uses.

At least for augmented reality applications, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The virtual image generation system 100 comprises a frame structure 102 worn by an end user 50, a display subsystem 104 carried by the frame structure 102, such that the display subsystem 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display subsystem 104 presents a sequence of frames at high frequency that provides the perception of a single coherent scene.

In the illustrated embodiment, the display subsystem 104 employs "optical see-through" display through which the user can directly view light from real objects via transparent (or semi-transparent) elements. The transparent element, often referred to as a "combiner," superimposes light from the display over the user's view of the real world. The display subsystem 104 comprises left and right projection subsystems 108L, 108R and left and right partially transparent display screens (or eyepieces) 110L, 110R on which the projection subsystems 108L, 108R project left and right monocular images. As will be described in further detail below, the frame structure 102 is designed to carry the two transparent eyepieces 110 in a manner that positions the eyepieces 110 respectively in front of the eyes 52 of the end user 50 for presentation of the monocular images to the end user 50 as a binocular image, as well as positions the eyepieces 110 in the end user's 50 field of view between the eyes 52 of the end user 50 and an ambient environment, such that direct light from the ambient environment is transmitted through the eyepieces 110 respectively to the eyes 52 of the end user 50.

In the illustrated embodiment, each of the projection assemblies 108L, 108R provides scanned light respectively to the partially transparent eyepieces 110L, 110R. For example, each of the projection subsystems 108L, 108R may take the form of an optical fiber scan-based projection device, and each of the eyepieces 110L, 110R may take the form of a waveguide-based display into which the scanned light from the respective projection subsystems 108L, 108R is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. In some embodiments, each of the projection subsystems 108L, 108R may comprise a spatial light modulator ("SLM"), such as a liquid crystal on silicon ("LCoS") component. In some embodiments, each of the projection subsystems 108L, 108R may comprise another type of scanning device, such as a micro-electromechanical ("MEMs") scanning mirror. Examples of other projection subsystem configurations that may be employed in one or more embodiments are provided in U.S. application Ser. No. 14/555,585, filed on Nov. 27, 2014, published on Jul. 23, 2015 as U.S. Publication No. 2015/0205126, the entirety of which is incorporated herein by reference.

These layers in the light field may be stacked closely enough together to appear continuous to the human visual subsystem (e.g., one layer is within the cone of confusion of an adjacent layer). Additionally or alternatively, picture elements may be blended across two or more layers to increase perceived continuity of transition between layers in the light field, even if those layers are more sparsely stacked (e.g., one layer is outside the cone of confusion of an adjacent layer).

The virtual image generation system 100 further comprises one or more sensors 103 (shown in FIGS. 20 and 21) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

The virtual image generation system 100 further comprises a user orientation detection module 112, which detects the instantaneous position of the head 54 of the end user 50 and may predict the position of the head 54 of the end user 50 based on position data received from the sensor(s). Detecting the instantaneous position of the head 54 of the end user 50 facilitates determination of the specific actual object that the end user 50 is looking at, thereby providing an indication of the specific textual message to be generated for that actual object and further providing an indication of the textual region in which the textual message is to be streamed. The user orientation module 112 also tracks the eyes 52 of the end user 50 based on the tracking data received from the sensor(s).

The virtual image generation system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). In some embodiments, the control subsystem includes and/or communicates with one or more processors that perform the operations described herein, e.g., through execution of executable instructions.

In the illustrated embodiment, the control subsystem of the virtual image generation system 100 comprises a central processing unit (CPU) 114, a graphics processing unit (GPU) 116, one or more frame buffers 118, and a three-dimensional data base 120 for storing three-dimensional scene data. The CPU 114 controls overall operation, while the GPU 116 renders frames (e.g., translating a three-dimensional scene into a two-dimensional image) from the three-dimensional data stored in the three-dimensional data base 120 and stores these frames in the frame buffer(s) 116. While not illustrated, one or more additional integrated circuits may control the reading into and/or reading out of frames from the frame buffer(s) 116 and operation of the projection assembly 108 of the display subsystem 104.

The virtual image generation system 100 further comprises a light sensing assembly 122 configured for sensing at least one parameter indicative of a mismatch between the displayed left and right monocular images as the binocular image. In the illustrated embodiment, the light sensing assembly 122 accomplishes this by sensing light rays exiting both eyepieces 110L, 110R. The detected parameter(s) may be used to calibrate or recalibrate binocular matching of the monocular images displayed on the eyepieces 110, as will be described in further detail below.

The various processing components of the virtual image generation system 100 may be physically contained in a distributed subsystem. For example, as illustrated in FIGS. 6a-6d, the virtual image generation system 100 comprises a local processing and data module 130 operatively coupled, such as by a wired lead or wireless connectivity 136, to the display subsystem 104 and sensors. The local processing and data module 130 may be mounted in a variety of configurations, such as fixedly attached to the frame structure 102 (FIG. 6a), fixedly attached to a helmet or hat 56 (FIG. 6b), embedded in headphones, removably attached to the torso 58 of the end user 50 (FIG. 6c), or removably attached to the hip 60 of the end user 50 in a belt-coupling style configuration (FIG. 6d). The virtual image generation system 100 further comprises a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 104 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In one embodiment, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some embodiments, all communications may be wired, while in other embodiments all communications may be wireless. In still further embodiments, the choice of wired and wireless communications may be different from that illustrated in FIGS. 6a-6d. Thus, the particular choice of wired or wireless communications should not be considered limiting.

In the illustrated embodiment, the user orientation module 112 is contained in the local processing and data module 130, while CPU 114 and GPU 116 are contained in the remote processing module 132, although in alternative embodiments, the CPU 114, GPU 124, or portions thereof may be contained in the local processing and data module 130. The 3D database 120 can be associated with the remote data repository 134.

Referring now to FIG. 7, each projection assembly 108 includes one or more light sources 150 (only one shown in FIG. 7) that produces the light (e.g., emits light of different colors in defined patterns). The light source(s) 150 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient.

Each projection assembly 108 further comprises a scanning device 152 (only one shown in FIG. 7) that scans the light in a predetermined scan pattern in response to control signals. The scanning device 152 comprises one or more optical fibers 154 (e.g., single mode optical fiber), each of which has a proximal end 154a into which light is received from the light source(s) 150 and a distal end 154b from which light is provided to the eyepiece 110. The scanning device 152 further comprises a mechanical drive assembly 156 to which the optical fiber(s) 154 is mounted. The drive assembly 156 is configured for displacing the distal end 154b of each optical fiber 154 about a fulcrum 158 in accordance with a scan pattern.

To this end, the drive assembly 156 comprises a piezoelectric element 160 to which the optical fiber(s) 154 is mounted, and drive electronics 162 configured for conveying electrical signals to the piezoelectric element 160, thereby causing the distal end 154b of the optical fiber 154 to vibrate in accordance with the scan pattern. Thus, operation of the light source(s) 150 and drive electronics 162 are coordinated in a manner that generates image data that is encoded in the form of light that is spatially and/or temporally varying. Descriptions of optical fiber scanning techniques are provided in U.S. Patent No. 2015/0309264, which is expressly incorporated herein by reference.

Each projection assembly 108 further comprises an optical coupling assembly 164 that couples the light from the respective scanning device 152 into the respective eyepiece 110. The optical coupling assembly 164 comprises a collimation element 166 that collimates the light emitted by the scanning device 152 into a collimated light beam 200. Although the collimation element 166 is illustrated in FIG. 7 as being physically separated from the optical fiber(s) 154, a collimation element may be physically mounted to the distal end 154*b* of each optical fiber 154 in a "micro-lens" arrangement, as described in U.S. patent application Ser. No. 15/286,215, entitled "Microlens Collimator for Scanning Optical Fiber in Virtual/Augmented Reality System," which is expressly incorporated herein by reference. The optical coupling subsystem 164 further comprises an in-coupling element (ICE) 168, for instance, one or more reflective surfaces, diffraction gratings, mirrors, dichroic mirrors, or prisms to optically couple light into the end of the respective eyepiece 110.

Each eyepiece 110 takes the form of a waveguide apparatus 170 that includes a planar optical waveguide 172 and one or more diffractive optical elements (DOEs) 174 associated with the planar optical waveguide 172. In alternative embodiments, waveguide apparatus 170 may comprise multiple planar optical waveguides 172 and DOEs 174 respectively associated with the planar optical waveguides 172.

As best illustrated in FIG. 8, the planar optical waveguide 172 has a first end 176*a* and a second end 176*b*, the second end 176*b* opposed to the first end 176*a* along a length 178 of the planar optical waveguide 172. The planar optical waveguide 172 has a first face 180*a* and a second face 180*b*, at least the first and the second faces 180*a*, 180*b* (collectively 180) forming an at least partially internally reflective optical path (illustrated by solid line arrow 182*a* and broken line arrow 182*b*, collectively 182) along at least a portion of the length 178 of the planar optical waveguide 172. The planar optical waveguide 172 may take a variety of forms that provide for substantially total internal reflection (TIR) for light striking the faces 180 at less than a defined critical angle.

The DOE(s) 174 (illustrated in FIGS. 7 and 8 by dash-dot double lines) may take a large variety of forms which interrupt the TIR optical path 182, providing a plurality of optical paths (illustrated by solid line arrows 184*a* and broken line arrows 184*b*, collectively 184) between an interior 186 and an exterior 188 of the planar optical waveguide 172 extending along at least a portion of the length 176 of the planar optical waveguide 172. In the illustrated embodiment, the DOE(s) 174 comprise one or more diffraction gratings, each of which can be characterized as an optical component with a periodic structure on the order of the light wavelength that splits and diffracts light into several beams travelling in different directions. The diffraction gratings can be composed of, e.g., surface nano-ridges, nano-patterns, slits, etc. that may be photolithographically printed on a substrate. The DOE(s) 174 may allow positioning of apparent objects and focus plane for apparent objects. Such may be achieved on a frame-by-frame, subframe-by-subframe, or even pixel-by-pixel basis.

As illustrated in FIG. 8, the light propagates along the planar optical waveguide 172 with at least some reflections or "bounces" resulting from the TIR propagation. It is noted that some embodiments may employ one or more reflectors in the internal optical path, for instance thin-films, dielectric coatings, metalized coatings, etc., which may facilitate reflection. Light propagates along the length 178 of the planar optical waveguide 172, and intersects with the DOE(s) 174 at various positions along the length 178. The DOE(s) 174 may be incorporated within the planar optical waveguide 172 or abutting or adjacent one or more of the faces 180 of the planar optical waveguide 172. The DOE(s) 174 accomplishes at least two functions. The DOE(s) 174 shifts an angle of the light, causing a portion of the light to escape TIR, and emerge from the interior 216 to the exterior the face 180 of the planar optical waveguide 172. The DOE(s) 174 focuses the out-coupled light at a viewing distance. Thus, someone looking through the face 180 of the planar optical waveguides 172 can see digital imagery at one or more viewing distances.

A collimated light beam 200 entering the waveguide 172 at one of two different angles will follow one of the two TIR optical paths 182*a*, 182*b*, resulting in light rays 202 exiting the planar optical waveguide 172 along one of the two sets of external optical paths. That is, a collimated light beam 200*a* that enters the waveguide 172 at an angle represented by the TIR optical path 182*a* will result in the light rays 202*a* exiting the planar optical waveguide 172 along the set of external optical paths, and a collimated light beam 200*b* that enters the waveguide 172 at an angle represented by the TIR optical path 182*b* will result in the light rays 202*b* exiting the planar optical waveguide 172 along the set of external optical paths.

It can be appreciated from the foregoing that the display subsystem 104 generates a series of synthetic image frames of pixel information that present a monocular image of one or more virtual objects from each eyepiece 100 to the user. For example, referring to FIG. 9, a synthetic image frame 250 is schematically illustrated with cells 252*a*-252*m* divided into horizontal rows or lines 254*a*-254*n*. Each cell 252 of the frame 250 may specify values for each of a plurality of colors for the respective pixel to which the cell 252 corresponds and/or intensities. For instance, the frame 250 may specify one or more values for red 256*a*, one or more values for green 256*b*, and one or more values for blue 256*c* for each pixel. The values 256 may be specified as binary representations for each of the colors, for instance, a respective 4-bit number for each color. Each cell 252 of the frame 250 may additionally include a value 256*d* that specifies an amplitude.

The frame 250 may include one or more fields, collectively 258. The frame 250 may consist of a single field. Alternatively, the frame 250 may comprise two, or even more fields 258*a*-258*b*. The pixel information for a complete first field 258*a* of the frame 250 may be specified before the pixel information for the complete second field 258*b*, for example, occurring before the pixel information for the second field 258*b* in an array, an ordered list, or other data structure (e.g., record, linked list). A third or even a fourth field may follow the second field 258*b*, assuming a presentation subsystem is configured to handle more than two fields 258*a*-258*b*.

Referring now to FIG. 10, the frame 250 is generated using a raster scan pattern 260. In the raster scan pattern 260, pixels 268 (only one called out) are sequentially presented. The raster scan pattern 260 typically presents pixels 268 from left to right (indicated by arrows 262*a*, 262*b*, then from top to bottom (indicated by arrow 264). Thus, the presentation may start at the upper right corner and traverse left across a first line 266*a* until the end of the line is reached. The raster scan pattern 260 typically then starts from the left in a next line down. The presentation may be temporarily blacked out or blanked when returning from the end of one line to the start of the next line. This process repeats line-by-line until the bottom line 266*n* is completed, for example, at the bottom right most pixel 268. With the frame 250 being complete, a new frame is started, again returning to the right of the top most line of the next frame. Again, the presentation may be blanked while returning from the bottom left to the top right to present the next frame.

Many embodiments of raster scanning employ what is termed as an interlaced scan pattern. In interlaced raster scan patterns, lines from the first and the second fields 258*a*, 258*b* are interlaced. For example, when presenting lines of the first field 258*a*, the pixel information for the first field 258*a* may be used for the odd numbered lines only, while the pixel information for the second field 258*b* may be used for the even numbered lines only. Thus, all of the lines of the first field 258*a* of the frame 250 (FIG. 9) are typically presented before the lines of the second field 258*b*. The first field 258*a* may be presented using the pixel information of the first field 258*a* to sequentially present line 1, line 3, line 5, etc. Then the second field 258*b* of the frame 250 (FIG. 9) may be presented following the first field 258*a*, by using the pixel information of the second field 258*b* to sequentially present line 2, line 4, line 6, etc.

Referring to FIG. 11, a spiral scan pattern 270 may be used instead of the raster scan pattern 260 to generate the frame 250. The spiral scan pattern 270 may consist of a single spiral scan line 272, which may include one or more complete angular cycles (e.g., 360 degrees) which may be denominated as coils or loops. As with the raster scan pattern 260 illustrated in FIG. 10, the pixel information in the spiral scan pattern 270 is used to specify the color and/or intensity of each sequential pixel, as the angle increments. An amplitude or radial value 274 specifies a radial dimension from a starting point 276 of the spiral scan line 272.

Referring to FIG. 12, a Lissajous scan pattern 280 may alternatively be used to generate the frame 250. The Lissajous scan pattern 280 may consist of a single Lissajous scan line 282, which may include one or more complete angular cycles (e.g., 360 degrees), which may be denominated as coils or loops. Alternatively, the Lissajous scan pattern 280 may include two or more Lissajous scan lines 282, each phase shifted with respect to one another to nest the Lissajous scan lines 282. The pixel information is used to specify the color and/or intensity of each sequential pixel, as the angle increments. An amplitude or radial value specifies a radial dimension 284 from a starting point 286 of the Lissajous scan line 282.

Referring to FIG. 13, a multi-field spiral scan pattern 290 may alternatively be used to generate the frame 250. The multi-field spiral scan pattern 290 includes two or more distinct spiral scan lines, collectively 160, and in specifically, four spiral scan lines 292*a*-160*d*. The pixel information for each spiral scan line 292 may be specified by a respective field of a frame. Advantageously, multiple spiral scan lines 292 may be nested simply by shifting a phase between each successive ones of the spiral scan lines 292. The phase difference between spiral scan lines 292 is a function of the total number of spiral scan lines 292 that will be employed. For example, four spiral scan lines 292*a*-292*d* may be separated by a 90-degree phase shift. An exemplary embodiment may operate at a 100 Hz refresh rate with 10 distinct spiral scan lines (e.g., subspirals). Similar to the embodiment of FIG. 9, one or more amplitude or radial values specify a radial dimension 294 from a starting point 296 of the spiral scan lines 292.

Further details describing display subsystems are provided in U.S. patent application Ser. No. 14/212,961, entitled "Display Subsystem and Method," and U.S. patent application Ser. No. 14/696,347, entitled "Planar optical waveguide Apparatus With Diffraction Element(s) and Subsystem Employing Same," which are incorporated herein by reference.

Referring now to FIGS. 14A-14E, different variations of a left eyepiece 110L will now be described. The left eyepiece 110L utilizes one or more diffractive optical elements (DOEs) for in-coupling light from the respective projection subassembly 108, and out-coupling light to the left eye 52 of the end user 50, as well out-coupling light to the light sensing assembly 122. It should be appreciated that the right eyepiece 110R operates in an identical manner as the left eyepiece 110L, and therefore, the following disclosure with respect to the left eyepiece 110L applies equally to the right eyepiece 110R.

As discussed above, the left eyepiece 110L takes the form of a waveguide apparatus 170 that includes the rectangularly-shaped planar optical waveguide 172 having a temple-facing end 172*a* and a nasal-facing end 172*b*, as illustrated in FIG. 14A. As best shown in FIGS. 15 and 16, the waveguide 172 is a single unitary substrate or plane of an optically transparent material, such as, e.g., glass, fused silica, acrylic, or polycarbonate, although in alternative embodiments, the waveguide 172 may be composed of separate distinct panes of optically transparent material that are bonded together in the same plane or in different planes.

An ICE 168 is embedded in the face 180*b* of the waveguide 172 for receiving the collimated light beam 200 from the projection assembly 108 into the waveguide 172 via the face 180*b*, although in alternative embodiments, the ICE 168 may be embedded in the other face 180*a* or even the edge of the waveguide 172 for coupling the collimated light beam 200 into the waveguide 172 as an in-coupled light beam. In the illustrated embodiment, the ICE 168 is positioned at the temple-facing end 172*a* of the eyepiece 172L.

The DOE(s) 174 are associated with the waveguide 172 (e.g., incorporated within the waveguide 172 or abutting or adjacent one or more of the faces 180*a*, 180*b* of the waveguide 172) for two-dimensionally expanding the effective exit pupil of the collimated light beam 200 optically coupled into the waveguide 172. To this end, the DOE(s) 174 comprises one or more orthogonal pupil expansion (OPE) elements 174*a* (only one shown in FIG. 14A) adjacent the face 180*b* of the waveguide 172 for splitting the in-coupled light beam 200 into orthogonal light beams 201, and an exit pupil expansion (EPE) element 174*b* associated with the waveguide 172 for splitting each orthogonal light beam 201 into the out-coupled light rays 202 that exit the face 180*b* of the waveguide 172 towards the eye(s) 52 of the end user 50. In the alternative embodiment where the waveguide 172 is composed of distinct panes, the OPE element(s) 174 and EPE element 174*b* may be incorporated into different panes of the waveguide 172.

The OPE element 174*a* relays light along a first axis (vertical or y-axis in FIG. 14A), and expands the effective exit pupil of light along a second axis (horizontal or x-axis in FIG. 14A). In particular, the ICE 168 optically in-couples the collimated light beam 200 for propagation within the waveguide 172 via TIR along an internally reflective optical path 204*a* (in this case, along the horizontal or x-axis), and in doing so, repeatedly intersects the OPE element 174*a*. In the illustrated embodiment, the OPE element 174*a* has a relatively low diffraction efficiency (e.g., less than 50%), and comprises a series of diagonal diffractive elements (forty-five degrees relative to the x-axis), such that, at each point of intersection with the OPE element 174*a*, a portion (e.g., greater than 90%) of the in-coupled light beam 200 continues to propagate within the waveguide 172 via TIR along the internally reflective optical path 204a, and the remaining portion (e.g., less than 10%) of the in-coupled light beam 200 is diffracted as an orthogonal light beam 201 that propagates within the waveguide 172 via TIR along an internally reflective optical path 204b (in this case, along the vertical or y-axis) toward the EPE element 174b. It should be appreciated that although the optical paths 204b are described as being perpendicular or orthogonal to the optical path 204a, the optical paths 204b may alternatively be obliquely oriented with respect to the optical path 204a. Thus, by dividing the in-coupled light beam 200 into multiple orthogonal beams 201 that propagate along parallel internally reflective optical paths 204b, the exit pupil of the collimated light beam 200 in-coupled into the waveguide apparatus 170 is expanded vertically along the y-axis by the OPE element 174a.

The EPE element 174b, in turn, further expands the light's effective exit pupil along the first axis (vertical or y-axis in FIG. 14A). In particular, the EPE element 174b, like the OPE element 174a, has a relatively low diffraction efficiency (e.g., less than 50%), such that, at each point of intersection with the EPE element 174b, a portion (e.g., greater than 90%) of each orthogonal light beam 201 continues to propagate along the respective internally reflective optical path 204b, and the remaining portion of each orthogonal light beam 201 is diffracted as an out-coupled light ray 202 that exits the face 180b of the waveguide 172 (along the z-axis), as illustrated in FIGS. 15 and 16. That is, every time a light beam hits the EPE element 174b, a portion of it will be diffracted toward the face 180b of the waveguide 172, while the remaining portion will continue to propagate along the respective internally reflective optical path 204b.

Thus, by dividing each orthogonal light beam 201 into multiple out-coupled light rays 202, the exit pupil of the in-coupled light beam 200 is further expanded vertically along the y-axis by the EPE element 174b, resulting in a two-dimensional array of out-coupled light rays 202 that resemble a larger version of the original in-coupled light beam 200.

In addition to the function of out-coupling the light beamlets from the face 180b of the waveguide 172, the EPE element 174b serves to focus the output set of light beam lets at along a given focal plane, such that a portion of an image or virtual object is seen by end user 50 at a viewing distance matching that focal plane. For example, if the EPE element 174b has only a linear diffraction pattern, the out-coupled light rays 202 exiting the face 180b of the waveguide 172 toward the eye(s) 52 of the end user 50 will be substantially parallel, as shown in FIG. 17a, which would be interpreted by the brain of the end user 50 as light from a viewing distance (focal plane) at optical infinity. However, if the EPE element 174b has both a linear diffraction pattern component and a radially symmetric diffraction pattern component, the out-coupled light rays 202 exiting the face 180b of the waveguide 172 will be rendered more divergent from the perspective of the eye(s) 52 of the end user 50 (e.g., a convex curvature will be imparted on the light wavefront), and require the eye(s) 52 to accommodate to a closer distance to bring the resulting image into focus on the retina and would be interpreted by the brain of the end user 50 as light from a viewing distance (e.g., four meters) closer to the eye(s) 52 than optical infinity, as shown in FIG. 17b. The out-coupled light rays 202 exiting the face 180b of the waveguide 172 can be rendered even more divergent from the perspective of the eye(s) 52 of the end user 50 (e.g., a more convex curvature will be imparted on the light wavefront), and require the eye(s) 52 to accommodate to an even closer distance to bring the resulting image into focus on the retina and would be interpreted by the brain of the end user 50 as light from a viewing distance (e.g., 0.5 meters) closer to the eye(s) 52, as shown in FIG. 17c.

Although the left eyepiece 110L has been described herein as having only one focal plane, it should be appreciated that multiple planar optical waveguides 172 with associated OPE element 174a and EPE element 174b can be used to simultaneously or concurrently generate images at multiple focal planes, as discussed in U.S. Patent Publication Nos. 2015/0309264 and 2015/0346490, which are expressly incorporated herein by reference.

Referring back to FIG. 14A, the eyepiece 110L may be leveraged for directly tapping light intended for an eye 52 of the end user 50 by including an out-coupling element (e.g., DOE) 190. Thus, the light exits the eyepieces 110 at locations outside of the field of view of the end user 50 and different from the locations at which the light rays 202 exit the eyepieces 110, and are thus representative of the light rays 202 exiting the eyepieces 110. As will be described in further detail below, the parameter(s) indicative of the mismatch between the displayed left and right monocular images are derived from the light out-coupled from the eyepieces 110. In the illustrated embodiment, the out-coupling DOE 190 is positioned at the nasal-facing end 172b of the eyepiece 172L.

In operation, some light emitted by the projection subsystem 108 intended for the left eye that is in-coupled into the eyepiece 110L (by way of the ICE 168) may propagate all the way through the region of the OPE element 174a and reach the out-coupling DOE 190. Thus, the out-coupling DOE 190 out-couples a portion of an in-coupled light beam 200 as a representative out-coupled light ray 203 that exits the face 180b of the waveguide 172 (along the z-axis) towards the light sensor assembly 122, as illustrated in FIG. 15. In the illustrated embodiment, the substrate 170 comprises a tab 173 on which the out-coupling DOE 190 is mounted. Preferably, the tab 173 of the substrate 170 is outside of the field of view of the end user 50, such that the light exiting the DOE 190 cannot be visualized by the end user 50.

Referring now to FIG. 14B, another left eyepiece 110L is similar to the left eyepiece 110L illustrated in FIG. 14A, with the exception that the OPE element 174a and EPE element 174b are clocked 90 degrees relative to each other, e.g., the EPE element 174 is located between the OPE element 174a and the nasal-facing end 172b of the substrate, instead of under the OPE element 174, as illustrated in FIG. 14A. As with the left eyepiece 110L illustrated in FIG. 14A, the OPE 174a and EPE element 174b two-dimensionally expand the effective exit pupil of the collimated light beam 200 optically coupled into the waveguide 172 via the ICE 168. That is, the OPE element 174a splits the in-coupled light beam 200 into orthogonal light beams 201, and the exit pupil expansion (EPE) element 174b splits each orthogonal light beam 201 into the out-coupled light rays 202 that exit the face 180b of the waveguide 172 towards the eye(s) 52 of the end user 50.

The OPE element 174a relays light along a first axis (horizontal or x-axis in FIG. 14B), and expands the effective exit pupil of light along a second axis (vertical or y-axis in FIG. 14B). In particular, the ICE 168 optically in-couples the collimated light beam 200 for propagation within the waveguide 172 via TIR along an internally reflective optical path 204a (in this case, along the horizontal or x-axis), and in doing so, repeatedly intersects the OPE element 174a. In the illustrated embodiment, the OPE element 174a has a relatively low diffraction efficiency (e.g., less than 50%), and comprises a series of diagonal diffractive elements (forty-five degrees relative to the x-axis), such that, at each point of intersection with the OPE element 174a, a portion (e.g., greater than 90%) of the in-coupled light beam 200 continues to propagate within the waveguide 172 via TIR along the internally reflective optical path 204a, and the remaining portion (e.g., less than 10%) of the in-coupled light beam 200 is diffracted as an orthogonal light beam 201 that propagates within the waveguide 172 via TIR along an internally reflective optical path 204b (in this case, along the vertical or y-axis), and then along the internally reflective path 204a (in this case, along the horizontal or x-axis) toward the EPE element 174b. Thus, by dividing the in-coupled light beam 200 into multiple orthogonal beams 201 that propagate along parallel internally reflective optical paths 204b, the exit pupil of the collimated light beam 200 in-coupled into the waveguide apparatus 170 is expanded vertically along the y-axis by the OPE element 174a.

The EPE element 174b, in turn, further expands the light's effective exit pupil along the first axis (horizontal or x-axis in FIG. 14B). In particular, the EPE element 174b, like the OPE element 174a, has a relatively low diffraction efficiency (e.g., less than 50%), such that, at each point of intersection with the EPE element 174b, a portion (e.g., greater than 90%) of each orthogonal light beam 201 continues to propagate along the respective internally reflective optical path 204a, and the remaining portion of each orthogonal light beam 201 is diffracted as an out-coupled light ray 202 that exits the face 180b of the waveguide 172 (along the z-axis), as illustrated in FIGS. 18 and 19. That is, every time a light beam hits the EPE element 174b, a portion of it will be diffracted toward the face 180b of the waveguide 172, while the remaining portion will continue to propagate along the respective internally reflective optical path 204b.

Thus, by dividing each orthogonal light beam 201 into multiple out-coupled light rays 202, the exit pupil of the in-coupled light beam 200 is further expanded horizontally along the x-axis by the EPE element 174b, resulting in a two-dimensional array of out-coupled light rays 202 that resemble a larger version of the original in-coupled light beam 200.

Like the eyepiece 110L in FIG. 14A, the eyepiece 110L in FIG. 15 may be leveraged for directly tapping light intended for an eye 52 of the end user 50 by including an out-coupling DOE 190 at the nasal-facing end 172b of the eyepiece 172L. However, instead of propagating only through the region of the OPE element 174, some light emitted by the projection subsystem 108 intended for the left eye that is in-coupled into the eyepiece 110L (by way of the ICE 168) may propagate all the way through the region of both the OPE element 174a and EPE element 174b and reach the out-coupling DOE 190. Thus, the out-coupling DOE 190 out-couples a portion of an in-coupled light beam 200 as a representative out-coupled light ray 203 that exits the face 180b of the waveguide 172 (along the z-axis) towards the light sensor assembly 122, as illustrated in FIG. 18. In the illustrated embodiment, the substrate 170 comprises a tab 173 on which the out-coupling DOE 190 is mounted. Preferably, the tab 173 of the substrate 170 is outside of the field of view of the end user 50, such that the light exiting the DOE 190 cannot be visualized by the end user 50. In some embodiments, the functionality of DOE 190 may be provided by way of an out-coupling prism.

It should be noted that although the OPE element 174a and EPE element 174b are illustrated in FIGS. 14A and 14B as non-overlapping in the x-y plane, the OPE element 174a and EPE element 174b may fully or at least partially overlap each other in the x-y plane. For example, as illustrated in FIG. 14C, another left eyepiece 110L is similar to the left eyepieces 110L illustrated in FIGS. 14A and 14B, with the exception that the waveguide 172 is triangularly shaped, and the OPE element 174a and EPE element 174b are respectively disposed on opposite faces of the waveguide 172. As another example, as illustrated in FIG. 14D, still another left eyepiece 110L is similar to the left eyepieces 110L illustrated in FIGS. 14A and 14B, with the exception that the waveguide 172 is irregularly shaped, and the OPE element 174a and EPE element 174b are respectively disposed on opposite faces of the waveguide 172. The arrangement of the OPE element 174a and the EPE element 174b in FIGS. 14C and 14D may be collectively referred to herein as DOE 174a-b. In some embodiments, the functionality of the OPE element 174a and EPE element 174b may be provided by way of a single DOE. And, as yet another example, as illustrated in FIG. 14E, another left eyepiece 110L is similar to the left eyepiece 110L illustrated in FIG. 14D, with the exception that DOE 174a-b is further configured to out-couple light towards the light sensor assembly 122. For this reason, the eyepiece 110L of FIG. 14E need not include a dedicated out-coupling DOE, such as the out-coupling DOE 190 described above with reference to FIGS. 14A-14D. In the example of FIG. 14E, the DOE 174a-b of the left eyepiece 110L contiguously extends into nasal-facing end 172b of the waveguide 172. As such, at least a portion of the DOE 174a-b of the left eyepiece 110L of FIG. 14E may be positioned outside of the FOV of end user 50. In some examples, such a portion of the DOE 174a-b may be physically obscured by one or more portions of a frame or housing structure, such as one or more of those described herein with reference to FIGS. 20-22B, 30, and 32A-32B.

Referring to FIG. 21, one embodiment of the frame structure 102, display subsystem 104, and light sensing assembly 122 will now be described. In the illustrated embodiment, the frame structure 102 has a relatively light-weight, thin, and flexible form factor, e.g., in the shape of reading glasses or sunglasses, to facilitate transportation, comfort, and a more aesthetically-pleasing look. The frame structure 102 comprises a frame 300 for carrying respective left and right eyepieces 110L, 110R, as well as respective left and right projection subassemblies 108L, 108R respectively associated with the left and right eyepieces 110L, 110R, a pair of left and right temple arms 302L, 302R, a bridge 304 between the temple arms 302L, 302R, and a nose piece 306 affixed to the bridge 304. The frame structure 102 also carries forward-looking left and right sensors 103L, 103R in the form of video cameras for detecting the position and movement of the head 54 of the end user 50.

In the illustrated embodiment, the frame 300, arms 302L, 302R, and bridge 304 are monolithically integrated together, although in alternative embodiments, any of these components can be composed of discrete pieces that are then integrated together using suitable interfacing components, such as bonding material or fasteners. The temple arms 302L, 302R are designed to engage the respective temples of head 54 of the end user 50 to maintain the frame 300, and thus the left and right eyepieces 110L, 110R in front of the eyes 52 of the end user 50. The temple arms 302L, 302R may respectively comprise left and right hinges 308L, 308R to facilitate flexing of the arms 302L, 302R for proper fitting the frame structure 102 to the head 54 of the end user 52. The nose piece 306 is configured for rest on the nose of the end user 52 when donning the frame structure 102 to enhance comfort of the nose and temple. The nose piece 306 may have a convex surface that conforms to the shape of the nose of the end user 52 additional comfort.

The frame 300 comprises left and right cantilevered arms 310L, 310R, each having a cantilever arm portion 312 extending away from the bridge 304, and an affixation arm portion 314 that extends from the respective cantilever arm portion 312 in a plane parallel to the plane of the eyes 52 of the end user 52. The left and right eyepieces 110L, 110R are respectively affixed to the affixation arm portions 314 in a suitable manner, and the left and right projection subassemblies 108L, 108R are respectively affixed to the outer ends of the affixation arm portions 314 to facilitate introduction of light beams respectively into the left and right eyepieces 110L, 110R, such that light rays respectively exit the left and right eyepieces 110L, 110R to display left and right monocular images as a binocular image to the end user 50. In some embodiments, the left and right hinges 308L, 308R and/or the left and right temple arms 302L, 302L may be directly affixed to the left and right distal ends of arm portion 314. The left and right eyepieces 110L, 110R, as shown in FIG. 20, may be the same as or similar to left and right eyepieces 110L, 110R as described above with reference to FIGS. 14A-14D. As such, the left and right eyepieces 110L, 110R comprise left and right ICEs (not shown in FIGS. 20 and 21) configured for respectively receiving/in-coupling light emitted from the two projection subsystems 108L, 108R, left and right out-coupling DOEs 190L, 190R configured for respectively out-coupling light toward the light sensing assembly 122, and one or more additional DOEs (not shown in FIGS. 20 and 21) configured for providing OPE and/or exit pupil expansion EPE functionality, as described above.

In some examples, the left and right eyepieces 110L, 110R, as shown in FIG. 20, may be the same as or similar to left and right eyepieces 110L, 110R as described above with reference to FIG. 14E. As such, each of the left and right eyepieces 110L, 110R may comprise an ICE configured for receiving/in-coupling light emitted from a respective one of projection subsystems 108L, 108R, and DOE 174a-b (not shown in FIGS. 20 and 21) configured for providing OPE and/or exit pupil expansion EPE functionality and for out-coupling light toward the light sensing assembly 122. As mentioned above with reference to FIGS. 14C and 14D, DOE 174a-b may take the form of one or more DOE components.

As illustrated in FIG. 20, light that is coupled out of eyepiece 110L through the out-coupling DOE 190 may propagate in free space before reaching the light sensing assembly 122. As described above, the right eyepiece 110R may be implemented with an optical architecture similar to that of left eyepiece 110L (e.g., a mirror-image version of the optical architecture of the left eyepiece 110L). As such, light that is coupled out of the eyepiece 110R through a respective out-coupling DOE may propagate in free space before reaching the abovementioned light sensing assembly 122.

The light sensing assembly 122 may be centrally-mounted, and in the illustrated embodiment, is affixed to the front surface of the bridge 304 so as to measure light from both of the left and right eyepieces 110L, 110R. Thus, the light sensing assembly 122 senses the light rays exiting left and right DOEs 190L, 190R of the respective left and right eyepieces 110L, 110R, as will be described in further detail below.

As illustrated in FIG. 20, the frame structure 102, light sensing assembly 122, and eyepieces 110L, 110R are configured such that the light sensing assembly 122 is optically coupled with both left and right eyepieces 110L, 110R, but rigidly (physically) decoupled from the left eyepiece 110L and the right eyepiece 110R. In other words, the portion of the frame structure 102 to which light sensing assembly 122 is mounted or positioned is movably or flexibly coupled with the portions of the frame structure 102 by which left and right eyepieces 110L, 110R are carried (e.g., the cantilevered arms 310L, 310R) or otherwise supported. In some examples, the portion of the frame structure 102 to which the light sensing assembly 122 is mounted or positioned is itself relatively rigid so as to minimize local deformation and form a monolithic structure with the light sensing assembly 122. By being rigidly decoupled from/flexibly coupled to eyepieces 110L, 110R in this manner, yet mounted on a portion of the frame structure 102 that resides between and physically bridges the two eyepieces 110L and 110R, the light sensing assembly 122 may essentially be agnostic to relative deformations between the two eyepieces 110L, 110R. As such, the light sensing assembly 122 is well-suited to objectively observe light coupled out of out-coupling DOEs 190L, 190R for the purposes of binocular deformation analysis and/or online virtual image calibration.

Referring to FIGS. 22A and 22B, operation of the virtual image generation system 100 when the frame structure 102 is in a mechanically-ideal condition, such that the left and right eyepieces 110L, 110R are relatively aligned and thus configured to present binocularly-reconcilable virtual images (e.g., to a user of virtual image generation system 100) ("State A"), and when the frame structure 102 is in a less-than-ideal physical (deformed) condition (e.g., as a result of user wear-and-tear, thermal effects, etc.), such that the left and right eyepieces 110L, 110R are misaligned relative to one another ("State B"). Furthermore, it has been found that the virtual content does not move predictably relative to any physical component including the eyepiece. Rather, the virtual image behavior is a function of the internals of the light generator (e.g., the projection subsystem) and the light generator-eyepiece interface (e.g., positioning of projection subsystem relative to ICE), as well as thermal and other effects.

As depicted in FIG. 22A, in state A, the virtual image generation system 100 is operating to display virtual monocular images through both left and right eyepieces 110L, 110R. That is, the projection subsystem 108L is projecting light representative of virtual content toward left eyepiece 110L, which in turn in-couples (e.g., through an ICE) and guides this light toward the DOE(s) configured to provide OPE and/or EPE functionality, such as the OPE 174a and EPE 174b described above. While a majority of the guided light may exit the eyepiece 110L as it traverses the DOE(s) (e.g., directed toward a user's left eye), some portion of this light continues on toward the out-coupling DOE 190L, where it may be coupled out of the eyepiece 110L as light (represented by the light ray 203) and at least partially intercepted by the light sensing assembly 122. The projection subsystem 108R, along with right eyepiece 110R and DOE(s) thereof (e.g., out-coupling DOE 190, ICE, OPE 174a, and EPE 174b, etc.), may operate in a similar manner in state A so as to present virtual content (e.g., to a user's right eye) and also out-couple and direct (e.g., through the out-coupling DOE 190R) light representative of said virtual content to the light sensing assembly 122.

As depicted in FIG. 22B, it can be seen that, in state B, the left and right eyepieces 110L, 110R are at least rotationally-misaligned with each other about the Yaw axis. As a result of this deformation (in this case, caused by the cantilevering of the arm portion 312 of the right cantilevered arm 310R), it can be further seen that the angle at which light (represented by the light ray 203) exits the out-coupling DOE 190R of right eyepiece 110R in state B differs from the angle at which the light (represented by the corresponding light ray 203) exits the out-coupling DOE 190R of right eyepiece 110R in state A, and also differs from the angle at which the light (represented by the light ray 203) exits the out-coupling DOE 190L of left eyepiece 110L in both states A and B. By virtue of the light capabilities of the light sensing assembly 122, the virtual image generation system 100 may be capable of detecting such a deformation/relative mismatch between the two eyepieces 110L, 110R based on data output from the light sensing assembly 122.

As briefly discussed above, by detecting the light exiting both DOE's 190L, 190R, the light sensing assembly 122 may sense at least a first parameter indicative of a mismatch between the left and right monocular images presented by the respective left and right eyepieces 110L, 110R as the binocular image. The control circuitry of the virtual image generation system 100 (e.g., the CPU 114) may receive and process data representative of such measurements taken by the light sensing assembly 122. The control circuitry of the virtual image generation system 100 may effectively compare the data derived from the light incident on the light sensing assembly 122 when the frame structure 102 is in State A with the data derived for the light incident on the light sensing assembly 122 when the frame structure 102 is in State B, and subsequently operate to quantify, characterize, or otherwise detect a relative deformational state of the left and right eyepieces 110L, 110R.

In response to detecting relative misalignment of the left and right eyepieces 110L, 110R about one or more rotational axes (e.g., Pitch axis, Roll axis, and/or Yaw axis), the virtual image generation system 100 may perform one or more online virtual image calibration operations to present binocularly-reconcilable virtual images (e.g., to a user of virtual image generation system 100) or otherwise compensate for such misalignment. As described above, such a calibration routine may include updating translation and/or rotation parameters stored for the eyepieces 110L, 110R. The virtual images may be effectively calibrated by the GPU 116 or other component of the control subsystem of the virtual image generation system 100. Specifically, such updated translation and/or rotation parameters may be utilized to translate, rotate, or otherwise transform one or more extrinsic parameters of "virtual cameras" (also referred to as "render cameras") in render space or "virtual screens" associated therewith. In some examples, one or more intrinsic parameters of render cameras may be adjusted based on detected binocular misalignment. Further details discussing the creation, adjustment, and use of render cameras in rendering processes are provided in U.S. patent application Ser. No. 15/274,823 and U.S. patent application Ser. No. 16/250,931, both of which are expressly incorporated herein by reference in their entirety for all purposes.

In some embodiments, one or more render cameras may be employed for each of a user's eyes. As such, in some of these embodiments, the virtual image generation system 100 may employ a first render camera in association with the left eyepiece 110L and a second render camera in association with the right eyepiece 110R. In order to address misalignments of the left and right eyepieces 110L, 110R about the Pitch, Roll, and/or Yaw axes, the virtual image generation system 100 may, for example, may make one or more adjustments to the orientation of one or both of the first and second render cameras about the Pitch, Roll, and/or Yaw axes, respectively. For instance, to compensate for a misalignment about the Pitch axis similar to that which is shown in FIG. 4B, the virtual image generation system 100 may make one or more adjustments to rotate or tilt the second render camera downward about the Pitch axis, rotate or tilt the first render camera upward about the Pitch axis, or a combination thereof. Alternatively or additionally, the virtual image generation system 100 may perform one or more operations to translate the virtual image presented on the right eyepiece 110R vertically downward, translate the virtual image presented on the left eyepiece 110L vertically upward, or both to compensate for a misalignment about the Pitch axis similar to that which is shown in FIG. 4B. Similarly, to compensate for a misalignment about the Roll axis similar to that which is shown in FIG. 4C, the virtual image generation system 100 may make one or more adjustments to rotate or tilt the second render camera clockwise about the Roll axis, rotate or tilt the first render camera counterclockwise about the Roll axis, or a combination thereof. Furthermore, to compensate for a misalignment about the Yaw axis similar to that which is shown in FIG. 4D, the virtual image generation system 100 may make one or more adjustments to rotate or tilt the second render camera leftward about the Yaw axis, rotate or tilt the first render camera rightward about the Yaw axis, or a combination thereof. Alternatively or additionally, the virtual image generation system 100 may perform one or more operations to translate the virtual image presented on the right eyepiece 110R horizontally leftward, translate the virtual image presented on the left eyepiece 110L horizontally rightward, or both to compensate for a misalignment about the Yaw axis similar to that which is shown in FIG. 4D. To compensate for misalignments about multiple axes, the virtual image generation system 100 may make a combination of rotational and/or translational adjustments to one or both of the first and second render cameras and/or the left and right virtual images. In some embodiments, the virtual image generation system 100 may operate on a feedback loop so as to make fine or incremental adjustments to the orientation and/or position of one or both of the first and second render cameras and/or the left and right virtual images until the desired result is achieved.

In some embodiments, the virtual image generation system 100 may store a calibration profile for the two eyepieces 110L, 110R including a relative translation parameter and a relative rotation parameter. The relative translation parameter may correspond to a relative distance between the centroid of each of the two eyepieces 110L, 110R, and the relative rotation parameter may correspond to a relative angular orientation between the two eyepieces 110L, 110R. In some examples, the relative translation parameter may correspond to a distance between the apex of the display registration volume of eyepiece 110L and the apex of the display registration volume of eyepiece 110R. Similarly, in some of these examples, the relative rotation parameter may correspond to a relative angular orientation between the display registration volume of eyepiece 110L and the display registration volume of eyepiece 110R. Additional information regarding display registration volumes and examples of systems and techniques associated therewith is provided in U.S. patent application Ser. No. 16/251,017, the entirety of which is incorporated herein by reference.

In one embodiment, the image mismatching parameter that is sensed by the light sensing assembly 122 comprises the angles at which the light rays 203 exit the respective left and right eyepieces 110L, 110R. To this end, the light sensing assembly 122 comprises two discrete sensors (not shown) for independently sensing the light rays 203 exiting the respective left and right DOEs 190L, 190R. In the illustrated embodiment, the light sensing assembly 122 senses the parameters indicative of the angles of the light rays 203 relative to one or more reference planes. For example, these reference planes may comprise the x-z plane, y-z plane, and x-y plane, as described in further detail below. Notably, these reference planes may be flat, but because the exterior surface of each left and right eyepieces 110L, 110R may alternatively be curved, these reference planes may be curved as well.

As also briefly discussed above, the angles of exiting light ray(s) are highly correlated to the positions of the pixels within the image frame. For example, as illustrated in FIGS. 23A and 23B, a collimated light beam 200 from one of the projection subsystems 108 enters the respective eyepiece 110 via the ICE 168 and propagates within the waveguide 172. The exit pupil of the propagating light beam 200 is expanded along the x-axis and y-axis by the DOE(s) 174, e.g., as described above with respect to FIGS. 14A-14E and FIGS. 15-19, a light ray 202 that exits the face 180b of the waveguide 172. It should be appreciated that although only one light ray 202 in correspondence with the collimated light beam 200 input into the eyepiece 110 is shown for purposes of brevity, there will typically be many light rays 202 that exit the eyepiece 110 in correspondence with a single collimated light beam 200, with all angles of all of the exiting light rays 202 being related to the scan angle of the collimated light beam 200.

The collimated light beam 200 is scanned by the projection subsystem 108 to produce an input cone of light 210a, with each beam-angle in this cone corresponding to a pixel 212 in the field of view (FOV) 214 of the user. As shown in FIG. 23A, if the collimated light beam 200 has one particular beam-angle, a corresponding pixel 212a is generated in the bottom-left region of the FOV 214, whereas if the collimated light beam 200 has another particular beam-angle, a corresponding pixel 212b is generated in the top-right region of the FOV 214. The eyepiece 110 presents an x-y image plane to the end user 50 by transmitting the input light cone 210a to the emission face 180b of the waveguide 172, resulting in an output cone of light 210b.

With respect to each of the two eyepieces 110L, 110R, the CPU 114 (shown in FIG. 5) generates monocular image data, which in addition to defining the colors and intensities of the pixels, defines the locations of the pixels of the monocular image for the respective eyepiece 110, and thus controls the angles of the light beams 200 generated by the projection subsystem 108 relative to the respective eyepiece 110 based on the relative designed angles of the exiting light rays 202 corresponding to the defined locations of the same pixels for both of the eyepieces 110L, 110R, as well as the actual relative angles of the exiting light rays 202 for both of the eyepieces 110L, 100R sensed by the light sensing assembly 122, thereby ensuring that the actual relative angles of exiting light rays 202 of the eyepieces 110L, 110R are as close to identical to the designed relative angles of the exiting light rays 202 of the eyepieces 110L, 110R; that is to say that the pixels of the monocular images produced by the eyepieces 110L, 110R match as closely as possible, such that the end user 50 correctly perceives the matching monocular images as a binocular image.

For example, referring to FIG. 24, the orientation of an exiting light ray 202 from an origin in three-dimensional space may be defined by two angles, one on the x-z plane 216a and another on the y-z plane 216b, which closely correspond to the respective x- and y-coordinates of the pixel 212 in the x-y plane of the FOV 214. The CPU 114 may determine the actual angles of the exiting light ray 202 in the x-z and y-z planes 216a, 216b for each of the left and right eyepieces 110L, 110R based on parameters sensed by the light sensing assembly 122, compute a deviation between the actual angles of the exiting light ray 202 and the as-designed angles of the exiting light ray 202 for the corresponding pixel 212 of each of the eyepieces 110L, 110R, and modifies the operation of the projection subsystem 108 to compensate for the discrepancy between the relative actual angles of the exiting light ray 202 and the relative as-designed angles of the exiting light ray 202 for the eyepieces 110L, 110R to match the monocular images generated by the eyepieces 110L, 110R.

To correct such discrepancy, the CPU 114 may instruct the projection subsystem 108 to adjust the scan position of the collimated light beam 200 for one or both of the eyepieces 110L, 110R. In the illustrated embodiment, the scan position of the collimated light beam 200 for the respective eyepiece 110L may be adjusted by modifying the actuation/drive profile (e.g., the drive voltages, drive signals, drive patterns, etc. provided by the drive electronics 162 to the piezoelectric element 160) of the scanning device 156 (see FIG. 7), so that the mechanical response of the scanning device 156 is more in agreement with the desired mechanical response for the desired pixel positions. As another example, the CPU 114 may modify the monocular image data (e.g., by modifying the pixel modulation/pixel synchronization) for the respective eyepiece 110 to compensate for the known mismatch between the left and right monocular images of the eyepieces 110L, 110R. In this case, the "incorrect angles" of the exiting light ray 203 are measured, but not corrected. As still another example, a combination of modifying the scan position of the collimated light beam 200 and modifying the image data may be employed by the CPU 114.

The scan position of the collimated light beam 200 and/or the monocular image data for one or both of the eyepieces 110L, 110R can be modified to compensate for the mismatch between the relative actual angles of the exiting light rays 202 of the eyepieces 110L, 100R and the desired angles of the exiting light rays 202 of the eyepieces 110L, 110R by employing a software/hardware controller (similar to, e.g., a proportional-integral-derivative (PID) that monitors the angle measurements in real-time, and effects the adjustment to one or both of the corresponding projection subsystems 108 as quickly as possible to minimize delay due to processing and causality.

Alternatively, since the display subsystem 104 is a repetitive system, where an identical target scan pattern is used to generate each image frame, angle measurements acquired for a previous image frame can be computed and stored, and then corrections can be applied to a subsequent image frame. In the case where there is a high image frame rate, a delay on the order of a few milliseconds may be incurred.

For each of the left and right eyepieces 110L, 100R, the light sensing assembly 122 detects an intensity of at least one of the light rays 202 relative to the x-z and y-z planes 216a, 216b. In the embodiments illustrated in FIGS. 14A-14E and FIGS. 15-19, the sensing assembly 122 measures the intensity of at least one light ray 203 (only one described herein) representative of the light rays 202 exiting or emitted from the respective eyepiece 110. In this embodiment, the representative light ray 203 is different from the exiting light rays 202, and exits the out-coupling DOE 190 of the respective eyepiece 110 at a different location from the exiting light rays 202, preferably outside of the FOV 214 of the end user 50.

In one embodiment, the light sensing assembly 122 comprises two separate and independent sensor arrangements for separately detecting the light exiting the left and right DOEs 190L, 190R of the left and right eyepieces 110L, 110R, respectively. In this case, it is important that the two sensor arrangements be rigidly coupled to each other, such that there is no deformation between the two sensor arrangements to provide a stable platform from which to detect any misalignment between the left and right eyepieces 110L, 110R caused by deformation of the frame 300. An example of such a two sensor arrangement is described in more detail below with reference to FIGS. 31A-31B.

For example, as illustrated in FIG. 25, the light sensing assembly 122 comprises a left non-imaging sensor arrangement 220L for detecting the angle of a representative light ray 203 exiting the left DOE 190L of the left eyepiece 110L, and a right non-imaging sensor arrangement 220R for detecting the angle of a representative light ray 203 exiting the right DOE 190R of the right eyepiece 110R. Each of the sensor arrangements 220L, 220R comprises a pair of orthogonal angle sensors 222a and 222b (collectively, 222) configured for sensing the orthogonal components of the representative light ray 203 exiting the respective DOE 190 of the eyepiece 110, and a normalization sensor 224 configured for sensing the absolute intensity of the representative light ray 203, such that the readings from the orthogonal angle sensors 222 can be normalized to the intensity of the light in the respective eyepiece 110. That is, when an image is generated, the pixel intensities are modulated corresponding to the color of different pixels. Thus, the pixel intensity modulation measured by the photo-intensity sensor 224 can be considered when interpreting the measurements of the angle sensors 222.

Referring further to FIG. 26A, the pair of angle sensors 222a, 222b respectively comprise a pair of photo-intensity sensors 226a, 226b (collectively, 226), a pair of angle selective dielectric layers 228a, 228b (collectively, 228), and a pair of cylindrical lenses (e.g., GRIN lenses) 230a, 230b (collectively, 230). The GRIN lenses 230 directly face the DOE 190 of the respective eyepiece 110, the dielectric layers 228 are respectively mounted directly to the outward facing surface of the GRIN lenses 230, and the photo-intensity sensors 226 are respectively mounted directly to the outward facing surface of the dielectric layers 228.

Significantly, the directional properties of each dielectric layer 228 transmit light energy as a known function of the angle at which the light energy is incident on the plane of the dielectric layer 228 (which is located in the x-y plane). For example, as can be seen from an exemplary dielectric layer transmission-angle relationship illustrated in FIG. 27A, the closer the angle of the representative light ray 203 is to the normal of the plane of the dielectric layer 228 (0 degrees), the greater the energy of the representative light ray 203 is transmitted to the photo-intensity sensor 226. Furthermore, each photo-intensity sensor 226 will generate a voltage that is a known function of the intensity of light energy incident at an angle normal to the plane of the respective dielectric layer 228. For example, as can be from an exemplary photodetector intensity-voltage relationship illustrated in FIG. 27B, the higher the intensity of the light energy incident on the dielectric layer 228, the greater the voltage generated by the dielectric layer 228. As a result, the angle at which the representative light ray 203 is incident on the plane of the photo-intensity sensor 226 can be determined from these relationship curves, as will be described in further detail below. It should be noted that the relationship curves illustrated in FIGS. 27A and 27B may be generated analytically, or may be generated by measuring or calibrating the relevant values per unit, thereby resulting in more accurate and calibrated relationship curves.

It should also be noted that, due to "cosine falloff," where the projection of the sensor aperture to the plane normal to the incident light decreases in area the higher the angle of incidence of the incident light, as well as the opto-physical characteristics of the light sensor, the photo-intensity sensors 226, themselves will have some degree of angular dependency, which can be utilized as a primary means of sensing the angle of the representative light ray 203, in which case, the angle sensors 222 may not include dielectric layers 228, or can be utilized as a secondary or auxiliary means of sensing the angle of the representative light ray 203 in addition to the use of the dielectric layers 228 in the angle sensors 222. In either case, a photodetector intensity-angle relationship (not shown), which correlates the voltage sensed by the respective photo-intensity sensor 226 to a range of light incident angles, may be generated. This photodetector intensity-angle relationship, by itself, can be used to determine the angle of the representative light ray 203, or may be used to confirm the angle of the representative light ray 203 determined from the dielectric layer transmission-angle relationship (FIG. 27A) and the photodetector intensity-voltage relationship (FIG. 27B).

Notably, because the dielectric layers 228 are isotropic in nature in that they will equally transmit the energy from the representative light ray 203 at the same incidence angle but different radial directions, the sensing assembly 122 breaks the circular symmetry of the dielectric layers 228, thereby allowing the orientation of the representative light ray 203 to be projected into the x-z and y-z planes 216a, 216b. To this end, the cylindrical lenses 230a, 230b are configured for respectively passing the first and second orthogonal components of the representative light ray 203 (corresponding to the x-z and y-z planes 216a, 216b) to the respective dielectric layers 228a, 228b.

Thus, one lens 230a separates the energy of the representative light ray 203a into a horizontal (x-) component, and the other lens 230b separates the energy of the representative light ray 203b into a vertical (y-) component. Thus, one photo-intensity sensor 226a will only receive the horizontal energy component of the representative light ray 203a exiting the DOE 190, and the other photo-intensity sensor 224b will only receive the vertical energy component of the representative light ray 203b via the DOE 190. The angle of the representative light ray 202 projected onto the x-z and y-z planes 216a, 216b can then be determined from these horizontal and vertical components of the representative light ray 203, as will be discussed below.

Notably, although each angle sensor 222 is described as detecting one representative light ray 203 for purposes of brevity and clarity in illustration, each of the angle sensors 222, in reality, detects many light rays, and therefore, the voltage outputs of angle sensors 222 will be representative of the composite of the horizontal component 203a or vertical component 203b of the representative light ray 203. However, the DOE 190 preferably has a linear diffraction pattern, such that the angles of the representative light ray 203 exiting the DOE 190 are uniform given a specific angle of the in-coupled collimated beam 200.

In an alternative embodiment illustrated in FIG. 26B, rather than using cylindrical lenses 230, the out-coupling DOE 190, itself, may be segmented into a portion that passes one orthogonal component to the angle sensor 222a and another portion that passes the other orthogonal component to the angle sensor 222b in the same manner that as the cylindrical lenses 230 described above. In still another alternative embodiment illustrated in FIG. 26C, the angle sensors 222 respectively comprise a pair of polarization elements 232a, 232b (collectively, 232) configured for polarizing the representative light ray 203 into orthogonally polarized light rays, which are then passed to the respective photo-intensity sensors 226a, 226b via the dielectric layers 228a, 228b.

In yet another alternative embodiment, instead of cylindrical lenses or any of the other devices described above, the dielectric layers 228a, 228b, themselves, can be strained in orthogonal orientations, such that the dielectric layers 228 are no longer isotropic, but rather are anisotropic, and tend to pass the representative light ray 203 in one orthogonal direction more than in the other orthogonal direction, and vice versa. Although the anisotropic dielectric layers 228 do not perfectly transmit the representative light ray 203 in orthogonal manners, the angle of the representative light ray 203, when projected onto the x-z and y-z planes 216a, 216b, can still be determined in view of the known orthogonal transmission coefficient of the dielectric layers 228 (i.e., the ratio of light energy transmitted by each dielectric layer 228 in one orthogonal direction relative to the other orthogonal direction).

Notably, the angle sensors 220, as disclosed, are only capable of sensing information from which an absolute angle of the exiting light rays 203 in the x-z plane 216a or y-z plane 216b can be obtained (e.g., an absolute angle of 30° may be +30° or −30°). Thus, the sensing assembly 122 senses another parameter indicative of the relative angle of the exiting light rays 203 in the x-z plane 216a or y-z plane 216b. In the illustrated embodiment, this detected parameter comprises a quadrant in which the collimated light beam 200 is projected in a plane, so that the sign of the angles of the light rays 203 projected onto the x-z and y-z planes 216a, 216b can be determined.

For example, as illustrated in FIG. 28A, one exiting light ray 203 forms an angle relative to the x-y plane 216c. That is, when projected onto the x-y plane 216c, the exiting light ray 203 may form an angle in the x-y plane 216c, as illustrated in FIG. 28B. As there shown, the angle of the exiting light ray 203 projected within second quadrant of the x-y plane 216c, and therefore, it can be determined that the angle that the exiting light ray 203 makes in the x-z plane 216a has a negative sign, and the angle that the exiting light ray 203 makes in the y-z plane 216b has a positive sign.

The sensing assembly 122 is configured for indirectly detecting the quadrant in which the exiting light ray 203 is projected by detecting a quadrant that the collimated light beam 200 that enters the ICE 168 from the collimation element 274 is pointed (shown in FIG. 7). In particular, the sensing assembly 122 comprises one or more quadrant sensors (not shown) may be mounted to ICE 168 shown in FIGS. 14A-14E and FIGS. 15-19. As illustrated in FIG. 29A, four quadrant sensors 232 are spaced apart in quadrants of a reference plane 234, such that activation of one of the sensors 232 by the collimated light beam 200 will indicate the quadrant at which the light beam 200 is currently pointed. Alternatively, as illustrated in FIG. 29B, the sensing assembly 122 may comprise a quadrant position sensing detector (PSD) 236 centered at the intersection of the quadrants. In any event, because the angular position of the collimated light beam 200 is correlateable to the angle of the light rays 203 exiting the respective eyepiece 110, the quadrant in which the light rays 203 are projected into the x-y plane 216c can be derived from the quadrant of the reference plane 234 at which the collimated light beam 200 is pointed.

In an alternative embodiment, the quadrant in which the light rays 203 are projected into the x-y plane 216c can simply be inferred from the quadrant of the current scan position in the scan pattern when the intensity of the exiting light rays 203 is sensed by the sensing assembly 122.

One method of determining the angles of a light ray 203 projected onto the x-z plane 216a and y-z plane 216b will now be described. Assume that the photo-intensity sensor 222 measures a voltage of 90 mV. In accordance with the exemplary photodetector intensity-voltage relationship illustrated in FIG. 22b, the absolute intensity of the representative light ray 203 can then be determined to be 100 nits.

Assume that the angle sensor 220a measures a voltage of 70 mV. In accordance with the exemplary photodetector intensity-voltage relationship illustrated in FIG. 27B, the intensity of the representative light ray 203 transmitted by the angle selective dielectric layer 226a to the photo-intensity sensor 224a can then be determined to be 80 nits. Thus, based on the known intensity of the light ray of 100 nits, it can be determined that the dielectric layer 226a transmits 80/100=80% of the light energy to the photo-intensity sensor 224a. In accordance with the exemplary dielectric layer transmission-angle relationship illustrated in FIG. 27A, the absolute angle of the representative light ray 203 projected in the x-z plane 216a can then be determined to be 20 degrees.

Similarly, assume the angle sensor 220b measures a voltage of 65 mV. In accordance with the exemplary photodetector intensity-voltage relationship illustrated in FIG. 27B, the intensity of the representative light ray 203 transmitted by the angle selective dielectric layer 226b to the photo-intensity sensor 224b can then be determined to be 75 nits. Thus, based on the known intensity of the light ray of 100 nits, it can be determined that the dielectric layer 226b transmits 75/100=75% of the light energy to the photo-intensity sensor 224b. In accordance with the exemplary dielectric layer transmission-angle relationship illustrated in FIG. 27A, the absolute angle of the representative light ray 203 projected in the y-z plane 216a can then be determined to be 35 degrees.

If the sensors 232 or PSD 236 detect that the angle of the representative light ray 203 projected on the x-y plane 216c is in the third quadrant, or it is otherwise known that the angle of the representative light ray 203 projected on the x-y plane 216c is in the third quadrant derived from information of the known scan angle of the collimated beam 200, it can be determined that the angles of the representative light ray 203 respectively projected into the x-z plane 216a and y-z plane 216b should both be negative, and thus, be −20 degrees and −35 degrees.

Although the light sensing assembly 122 has been described as having two separate and independent sensor arrangements for detecting the light exiting the respective left and right DOEs 170L, 170R of the left and right eyepieces 110L, 110R, in other embodiments, the light sensing assembly 122 may have a single sensor arrangement for detecting the light exiting both left and right DOEs 170L, 170R of the left and right eyepieces 110L, 110R.

For example, referring now to FIG. 30, another light sensing assembly 122' carried by the frame structure 102 will be described. The light sensing assembly 122' comprises a single sensor 250 and a waveguide apparatus 270 that includes a planar optical waveguide 272 and left and right in-coupling elements (ICEs) 268L, 268R and an out-coupling DOE 290 associated with the planar optical waveguide 272. In some examples, the light sensing assembly 122' may be implemented as the light sensing assembly 122 in one or more of the examples described above with reference to FIGS. 22A-22B. The planar optical waveguide 272 has a first end 276a and a second end 276b, the second end 276b opposed to the first end 276a along a length 278 of the planar optical waveguide 272. The planar optical waveguide 272 has a first face 280a and a second face 280b (collectively 280) forming an internally reflective optical path (illustrated by solid line arrow 282) along at least a portion of the length 278 of the planar optical waveguide 272. The planar optical waveguide 272 may take a variety of forms that provide for substantially total internal reflection (TIR) for light striking the faces 280 at less than a defined critical angle.

The left and right ICEs 268L, 268R are embedded in the face 280b of the waveguide 272 at opposite ends 276a, 276b of the waveguide 272 for respectively receiving the representative light rays 203 from the left and right out-coupling DOEs 170L, 170R of the left and right eyepieces 110L, 110R, although in alternative embodiments, the ICEs 268L, 268R may be embedded in the other face 180a or even the edge of the waveguide 272 for coupling the representative light rays 203 into the waveguide 272 as in-coupled light beams. The light propagates along the planar optical waveguide 272 with at least some reflections or "bounces" resulting from the TIR propagation. The out-coupling DOE 290 is embedded in the face 280a of the waveguide 272 opposite to the ICEs 268L, 268R for out-coupling the light as representative light rays 203 that exit the face 180a of the waveguide 272 towards the single sensor 250.

The single sensor 250 can take the form of one of the sensor arrangements 220 illustrated in FIGS. 25-26 for sensing, in three dimensions, the angle of the representative light rays 203 that respectively exit the left and right DOEs 190L, 190R of the left and right eyepieces 110L, 110R. In this case, the angle detection can be time-multiplexed, such that the angles of the representative light rays 203 exiting the left and right DOEs 190L, 190R of the left and right eyepieces 110L, 110R can be alternately detected.

In another embodiment, the representative light rays 203 exiting the left and right eyepieces 170L, 170R may form an interference pattern (Fourier transform of the projected image) on a surface of the sensor 250 that is a function of the angular location of the point sources (e.g., pixels). Sensing such an interference pattern, estimating the observed points from that and comparing them to the intended angular location of points will give relative pitch and yaw between left and right eyepieces 170L, 170R. Roll can be recovered by using three or more points from each of the two eyepieces 170L, 170R.

In other embodiments, imaging-based approaches could also be employed by the virtual image generation system 100, in which case, the sensor 250 of the central sensing assembly 122' illustrated in FIG. 30 may include or take the form of one or more imaging devices (e.g., cameras, photodiodes, etc.), and one or more lensing elements (not shown), such that the light exiting the left and right DOEs 190L, 190R of the left and right eyepieces 110L, 110R is lensed to form an image on the imaging sensor 250. Imaging-based approaches can employ traditional camera and refractive lensing or "wafer" cameras integrated on glass substrates. In such embodiments, the virtual image generation system 100 may be capable of detecting deformation/relative mismatch between the two eyepieces 110L, 110R based on images captured by one or more imaging devices.

In some embodiments, the virtual image generation system 100 may detect deformation/relative mismatch between the two eyepieces 110L, 110R by evaluating images captured by the one or more imaging devices against the virtual image as it was intended to be perceived through the left eyepiece 110L, the virtual image as it was intended to be perceived through the right eyepiece 110R, the fusion of the two aforementioned virtual images as it was intended to be perceived, or a combination thereof. In some examples, such imaging devices may also be configured to double as a forward-facing image sensor (e.g., the cameras 103) capable of capturing images of the "real world" (e.g., environment in front of a user of virtual image generation system 100).

Thus, the imaging sensor of the sensing assembly 122' acquires identical copies of the left and right monocular virtual images that are presented to the end user 50 via the left and right eyepieces 110L, 110R. Alternatively, the virtual image generation system 100 may project test monocular virtual images into the left and right eyepieces 110L, 110R (e.g., a few pixels outside of the field of view of the end user 50) separately from the actual virtual images presented to the end user 50.

In any event, the control circuitry of the virtual image generation system 100 (e.g., the CPU 114) may receive and compare the monocular virtual images detected by the sensing assembly 122' (as a representation of the monocular virtual images presented by the eyepieces 110L, 110R as the binocular image to the end user 50 to determine if there is a mismatch between the monocular images. In response to detecting relative misalignment of the left and right eyepieces 110L, 110R about one or more rotational axes (e.g., Pitch axis, Roll axis, and/or Yaw axis), the virtual image generation system 100 may perform one or more online virtual image calibration operations to present binocularly-reconcilable virtual images (e.g., to a user of virtual image generation system 100) or otherwise compensate for such misalignment, as discussed above.

As mentioned above, in some embodiments, the light sensing assembly 122 described herein may include a pair of sensing devices for detecting the light exiting the respective left and right DOEs 170L, 170R of the left and right eyepieces 110L, 110R. For example, FIG. 31A depicts a front view of yet another light sensor assembly 122", for use in the virtual image generation system of FIG. 5. In some examples, the light sensing assembly 122" may be implemented as the light sensing assembly 122 in one or more of the examples described above with reference to FIGS. 22A-22B. The light sensing assembly 122" includes left and right sensors 3150L, 3150R that are disposed upon or within a body 3110.

The left and right sensors 3150L, 3150R may be optically coupled to left and right eyepieces 110L, 110R, respectively, and may be rigidly coupled to one another by way of body 3110. The left and right sensors 3150L, 3150R may, for example, take the form of cameras or other imaging devices configured to capture images. As such, in some embodiments, the left and right sensors 3150L, 3150R may be configured to receive and image light out-coupled by the left and right eyepieces 110L, 110R, respectively, which may include light representative of monocular virtual images. For example, FIG. 31B depicts a perspective view of the light sensor assembly 122" of FIG. 31A, in which the left and right sensors 3150L, 3150R are receiving and imaging light rays 203 as out-coupled from the left and right eyepieces 110L, 110R. As mentioned above, the images captured by the left and right sensors 3150L, 3150R may be evaluated against the left and right virtual images as they were intended to be perceived through the left and right eyepieces 110L, 110R, respectively, the fusion of the two aforementioned virtual images as it was intended to be perceived, or a combination thereof to detect or measure deformation/relative mismatch between the two eyepieces 110L, 110R. In some examples, the virtual image generation system 100 may make rotational and/or translational adjustments to one or both of two render cameras associated with the two eyepieces 110L, 110R, respectively, and/or one or both of the two virtual images to be presented through the two eyepieces 110L, 110R, respectively, based on such an evaluation of the images captured by the left and right sensors 3150L, 3150R. More specifically, the virtual image generation system 100 may evaluate the images captured by the left and right sensors 3150L, 3150R to identify and quantify discrepancies between one or both of the images captured by the left and right sensors 3150L, 3150R and one or both of the left and right virtual images as they were intended to be perceived through the left and right eyepieces 110L, 110R. The virtual image generation system 100 may, for example, make one or more of the aforementioned adjustments based on determined discrepancies in images. In some embodiments, the virtual image generation system 100 may perform one or more image processing operations to fuse or otherwise combine images captured by the left and right sensors 3150L, 3150R, and may then perform one or more operations to identify and quantify discrepancies between the resulting combined image and the fusion of the left and right virtual images as it was intended to be perceived through the left and right eyepieces 110L, 110R. In such embodiments, the virtual image generation system 100 may, for example, make one or more of the aforementioned adjustments based on determined discrepancies in images. In some examples, the left and right virtual images may correspond to test virtual monocular images. Such test virtual monocular images may, for example, correspond to a checkered pattern or other predetermined spatially-varying pattern.

The body 3110 of the light sensor assembly 122" may be designed to minimize deformation between the left and right sensors 3150L, 3150R and serve as a stable platform from which to detect misalignment between the left and right eyepieces 110L, 110R. As such, in some examples, the body 3110 of the light sensor assembly 122" may be made out of a relatively rigid and/or high-strength material, such as metal (e.g., aluminum), ceramic, glass, carbon fiber, or a composite thereof. Furthermore, the left and right sensors 3150L, 3150R may be disposed upon and/or within the body 3110 of the light sensor assembly 122" such that the left sensor 3150L is positioned in the same plane as the right sensor 3150R, and vice versa. That is, the left and right sensors 3150L, 3150R may be laterally aligned with one another, and body 3110 may serve to maintain such alignment. As such, in some embodiments, one or more surfaces of the body 3110 of the light sensor assembly 122" may be geometrically planar. In some examples, the left and right distal portions of the body 3110 of the light sensor assembly 122" may feature a pair of holes or recessed regions configured to receive and/or engage the left and right sensors 3150L, 3150R, respectively. In some embodiments, the left and right sensors 3150L, 3150R may be secured upon or within the body 3110 of the light sensor assembly 122" with one or more layers of adhesive, one or more other mounting hardware components, or a combination thereof. In this way, the left and right sensors 3150L, 3150R and body 3110 may be monolithically integrated together. As depicted in FIGS. 31A and 31B, in some examples, the shape of the body 3110 may correspond to that of a rectangular prism. However, it is to be understood that the body 3110 of the light sensor assembly 122" may take on any of a variety of different elongated geometries.

In some embodiments, the body 3110 of the light sensor assembly 122" may further include one or more features configured to enable or otherwise facilitate the mounting or attachment of the light sensor assembly 122" to the frame 300, such as brackets, through-holes, standoffs, threaded sockets, and the like. In some examples, one or more separate mounting hardware components may be utilized to enable or otherwise facilitate the mounting or attachment of the light sensor assembly 122" to the frame 300, such as brackets, standoffs, spacers, adhesive layers, nuts, bolts, and the like. In some embodiments, circuitry components associated with one or more both the left and right sensors 3150L, 3150R may be disposed upon and/or within the body 3110 of the light sensor assembly 122". In some examples, one or more optical components (e.g., prisms, beamsplitters, mirrors, lenses, freeform optical elements, etc.) may be disposed upon and/or within one or more of the left and right sensors 3150L, 3150R and the body 3110 so as to reroute light toward the left and right sensors 3150L, 3150R or otherwise condition light for capture by the left and right sensors 3150L, 3150R.

In some embodiments, the light sensing assembly 122" may be mounted to a portion of a housing structure of the display subsystem of the virtual image generation system 100. For example, FIGS. 32A and 32B depict perspective views of a front housing structure 3210 in association with a display subsystem, for use in the image generation system of FIG. 5. In some examples, the light sensing assembly 122" may be mounted or otherwise attached to the inward-facing side of a central portion 3212 of the front housing structure 3210. In other examples, the light sensing assembly 122" may be mounted or otherwise attached to the outward-facing side of a central portion 3222 of a rear housing structure 3220, as shown in FIG. 32B. In either case, the light sensing assembly 122" may be enclosed between the front and rear housing structures 3210, 3220. In some embodiments, portions one or both of the front and rear housing structures 3210, 3220 may be made out of plastic, metal, carbon fiber, or a composite thereof. Additional examples of housing structures that may be employed in one or more of the systems described herein are provided in U.S. patent application Ser. No. 16/225,961, the entirety of which is incorporated herein by reference.

In some embodiments, one or more additional components of the display subsystem of the virtual image generation system 100 may be at least partially positioned or housed between the front and rear housing structures 3210, 3220. Such one or more components may, for example, include left and right projection subsystems 108L, 108R, left and right eyepieces 110L, 110R, and any of a variety of other electronic and/or optical components. In some examples, one or more components that are functionally equivalent or similar to the frame 300, as described above, may also be at least partially positioned or housed between the front and rear housing structures 3210, 3220. In at least some of these examples, left and right eyepieces 110L, 110R may be carried by such one or more components. In some embodiments, the left and right eyepieces 110L, 110R may be arranged between the front and rear housing structures 3210, 3220 in a manner such that DOE(s) 174 or 174a-b of the left and right eyepieces 110L, 110R may be exposed to a wearer of the display subsystem, while DOE(s) 190 of the left and right eyepieces 110L, 110R are positioned between or proximate to portions 3212 and 3222 of front and rear housing structures 3210, 3220. As such, in these embodiments, DOE(s) 190 of the left and right eyepieces 110L, 110R may be obscured by the front and rear housing structures 3210, 3220, and thus outside of the FOV of a wearer of the display subsystem. Similarly, for embodiments in which the eyepiece of FIG. 14E is utilized, the left and right eyepieces 110L, 110R may be arranged between the front and rear housing structures 3210, 3220 in a manner such that a first portion of each DOE 174*a-b* is exposed to a wearer of the display subsystem and a second portion of each DOE 174*a-b* is positioned outside of the wearer's FOV at a location between or proximate to portions 3212 and 3222 of front and rear housing structures 3210, 3220. Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims.

What is claimed is:

1. A display subsystem for a virtual image generation system used by an end user, comprising:
    a frame structure having a frame;
    first and second waveguide apparatuses carried by the frame;
    first and second projection subassemblies configured for introducing first and second light beams respectively into the first and second waveguide apparatuses, such that at least a first light ray and at least a second light ray respectively exit the first and second waveguide apparatuses to display first and second monocular images as a binocular image to the end user; and
    a light sensing assembly configured for detecting at least one parameter indicative of a mismatch between the displayed first and second monocular images as the binocular image, wherein the light sensing assembly is stably mounted on a portion of the frame structure that is flexibly coupled to the frame, such that deformation of the frame may cause the first and second waveguide apparatuses to misalign relative to each other without moving the light sensing assembly, thereby rigidly decoupling the light sensing assembly from the first and second waveguide apparatuses.

2. The display subsystem of claim 1, wherein each of the first and second projection subassemblies comprises one or more light sources configured for generating light, and an optical coupling assembly configured for collimating the light into the respective light beam, and coupling the respective light beam into the respective waveguide apparatus.

3. The display subsystem of claim 2, wherein each optical coupling assembly comprises a collimation element configured for collimating the respective light into the respective collimated light beam, and an in-coupling element (ICE) configured for optically coupling the respective collimated light beam into the respective waveguide apparatus.

4. The display subsystem of claim 3, wherein each of the first and second waveguide apparatuses comprises a planar optical waveguide into which the respective ICE is configured for optically coupling the respective collimated light beam as an in-coupled light beam, an orthogonal pupil expansion (OPE) element associated with the planar optical waveguide for splitting the respective in-coupled light beam into a plurality of orthogonal light beams, and an exit pupil expansion (EPE) element associated with the planar optical waveguide for splitting the plurality of orthogonal light beams into the light rays that exit the respective planar optical waveguide.

5. The display subsystem of claim 4, wherein the respective planar optical waveguide comprises a single substrate formed of a single pane of optically transparent material.

6. The display subsystem of claim 1, wherein the first and second waveguide apparatuses respectively have partially transparent display surfaces configured for being positioned in a field of view between the eyes of the end user and an ambient environment.

7. The display subsystem of claim 1, wherein the frame structure is configured for being worn by the end user, and the first and second waveguide apparatuses are left and right eyepieces carried by the frame structure.

8. The display subsystem of claim 7, wherein the portion of the frame structure on which the light sensing assembly is stably mounted is a bridge on which the light sensing assembly is affixed.

9. The display subsystem of claim 8, wherein the frame structure comprises left and right cantilevered arms extending from the bridge, the left eyepiece being affixed to the left cantilevered arm, and the right eyepiece being affixed to the right cantilevered arm, such that the bridge is flexibly coupled to the frame.

10. The display subsystem of claim 9, wherein each of the left and right cantilevered arms has a cantilever arm portion extending at an angle away from the bridge and away from the eyes of the end user, and an affixation arm portion that extends from the respective cantilever arm portion in a plane parallel to the plane of the eyes of the end user and to which a respective one of the left and right eyepieces is affixed.

11. The display subsystem of claim 10, wherein the first and second projection subassemblies are affixed to outer ends of the respective affixation arm portions of the left and right cantilevered arms.

12. The display subsystem of claim 10, wherein the frame structure further comprises left and right temple arms affixed directly to the bridge.

13. The display subsystem of claim 10, wherein the cantilever arm portion each of the left and right cantilevered arms extends in a direction away from the eyes of the end user.

14. The display subsystem of claim 8, wherein the light sensing assembly is directly affixed to the bridge.

15. The display subsystem of claim 8, wherein the light sensing assembly has a planar surface that is carried by a planar surface of the bridge.

16. The display subsystem of claim 7, wherein the mismatch indicative of the at least one parameter detected by the light sensing assembly is caused by relative movement between the left and right eyepieces.

17. The display subsystem of claim 1, wherein the light sensing assembly is optically coupled to the first and second waveguide apparatuses.

18. The display subsystem of claim 1, wherein each of the first and second waveguide apparatuses comprises an out-coupling element configured for optically coupling light from the respective first and second waveguide apparatuses to the light sensing assembly, wherein the at least one detected parameter is derived from the light out-coupled from the first and second waveguide apparatuses.

19. The display subsystem of claim 18, wherein the light sensing assembly comprises two independent sensing arrangements configured for separately detecting the light out-coupled from the first and second waveguide apparatuses.

20. The display subsystem of claim 18, wherein the light sensing assembly comprises a single sensor configured for detecting the light out-coupled from the first and second waveguide apparatuses.

21. The display subsystem of claim 20, wherein the light sensing assembly comprises an optical waveguide apparatus configured for propagating the light out-coupled from the first and second waveguide apparatuses to the single sensor.

22. The display subsystem of claim 1, wherein the light sensing assembly comprises at least one non-imaging sensor, and the at least one detected parameter is indicative of an angle at which the at least first light ray exits the first waveguide apparatus, and an angle at which the at least second light ray exits the second waveguide apparatus.

23. The display subsystem of claim 22, wherein the at least one detected parameter comprises intensities of two light rays respectively representative of the at least first light ray and the at least second light ray.

24. The display subsystem of claim 23, wherein the two representative light rays respectively exit the first and second waveguide apparatuses outside of a field of view of the end user.

25. The display subsystem of claim 1, wherein the light sensing assembly comprises at least one imaging sensor, and the at least one detected parameter comprises first and second representative virtual monocular images respectively generated by the first and second waveguide apparatuses.

26. The display subsystem of claim 25, wherein the first and second representative virtual monocular images are identical copies of the first and second virtual monocular images displayed to the end user.

27. The display subsystem of claim 25, wherein the first and second representative virtual monocular images are test virtual monocular images separate from the first and second virtual monocular images displayed to the end user.

28. The display subsystem of claim 27, wherein the test virtual monocular images are displayed by the respective first and second waveguide apparatuses outside of the field of view of the end user.

29. A virtual image generation system, comprising:
the display subsystem of claim 1; and
a control subsystem configured for correcting the mismatch between the first and second monocular images based on the at least one parameter detected by the light sensing assembly.

30. The virtual image generation system of claim 29, further comprising memory configured for storing a calibration profile for the first and second waveguide apparatuses, and the control subsystem is configured for correcting the mismatch between the first and second monocular images by modifying the stored calibration profile.

31. The virtual image generation system of claim 29, further comprising memory configured for storing a three-dimensional scene, wherein the control subsystem is configured for rendering a plurality of synthetic image frames of the three-dimensional scene, and the display subsystem is configured for sequentially displaying the plurality of image frames to the end user.

32. The display subsystem of claim 1, wherein the first and second projection subassemblies are carried by the frame.

33. The display subsystem of claim 1, wherein the portion of the frame structure on which the light sensing assembly is stably mounted is laterally flexibly coupled to the frame.

34. The display subsystem of claim 1, wherein the light sensing assembly is immovably mounted on the portion of the frame structure.

35. The display subsystem of claim 1, wherein the light sensing assembly is stably mounted on a portion of the frame structure that is flexibly coupled to the frame, such that deformation of the frame may cause the first and second waveguide apparatuses to misalign relative to each other without decreasing an accuracy of the at least one detected parameter indicative of the mismatch between the displayed first and second monocular images as the binocular image, thereby rigidly decoupling the light sensing assembly from the first and second waveguide apparatuses.

* * * * *